US008219214B1

(12) United States Patent
Mimlitz

(10) Patent No.: US 8,219,214 B1
(45) Date of Patent: Jul. 10, 2012

(54) SUPERVISORY CONTROL AND DATA ACQUISITION PROTOCOL CONVERTER

(76) Inventor: James E. Mimlitz, Eureka, MO (US)

( * ) Notice: Subject to any disclaimer, the term of this patent is extended or adjusted under 35 U.S.C. 154(b) by 585 days.

(21) Appl. No.: 12/381,807

(22) Filed: Mar. 17, 2009

Related U.S. Application Data

(60) Provisional application No. 61/069,855, filed on Mar. 18, 2008.

(51) Int. Cl.
*G05B 15/02* (2006.01)
*G05B 19/18* (2006.01)

(52) U.S. Cl. .......... 700/9; 700/12; 700/19; 700/20; 702/60; 702/61; 702/62; 709/230; 710/11; 710/314; 340/3.1; 340/3.9

(58) Field of Classification Search ........... 700/9, 12, 700/19–20; 304/3.1, 3.9; 702/1, 60–62, 702/187–188; 709/230; 710/11, 314–315; 340/3.1, 3.9
See application file for complete search history.

(56) References Cited

U.S. PATENT DOCUMENTS

| | | | | |
|---|---|---|---|---|
| 4,573,115 | A * | 2/1986 | Halgrimson | 700/9 |
| 5,627,759 | A * | 5/1997 | Bearden et al. | 702/62 |
| 6,088,659 | A * | 7/2000 | Kelley et al. | 702/62 |
| 6,963,817 | B2 * | 11/2005 | Ito et al. | 702/138 |
| 7,424,399 | B2 * | 9/2008 | Kahn et al. | 702/188 |
| 7,950,464 | B2 * | 5/2011 | Atencio et al. | 166/360 |
| 2003/0040897 | A1 * | 2/2003 | Murphy et al. | 703/18 |
| 2006/0052099 | A1 * | 3/2006 | Parker | 455/426.1 |
| 2006/0075009 | A1 * | 4/2006 | Lenz et al. | 708/160 |
| 2008/0313006 | A1 * | 12/2008 | Witter et al. | 705/9 |
| 2009/0164126 | A1 * | 6/2009 | Floyd et al. | 702/6 |
| 2009/0204266 | A1 * | 8/2009 | Lovmand et al. | 700/287 |
| 2009/0240449 | A1 * | 9/2009 | Gibala et al. | 702/62 |
| 2009/0254224 | A1 * | 10/2009 | Rasmussen | 700/287 |
| 2009/0281675 | A1 * | 11/2009 | Rasmussen et al. | 700/287 |
| 2010/0158251 | A1 * | 6/2010 | Risley | 380/255 |
| 2010/0250497 | A1 * | 9/2010 | Redlich et al. | 707/661 |
| 2010/0268849 | A1 * | 10/2010 | Bengtson et al. | 709/248 |
| 2011/0125412 | A1 * | 5/2011 | Salzer et al. | 702/22 |
| 2011/0196512 | A1 * | 8/2011 | Johnson et al. | 700/9 |

* cited by examiner

*Primary Examiner* — Ramesh Patel
(74) *Attorney, Agent, or Firm* — Kevin L. Klug

(57) ABSTRACT

A supervisory control and data acquisition protocol converter having encoded meter register input ports which are able to interrogate, read, and retain data stored in viscous fluid or gas meter registers which communicate with the Automatic Meter Reading (AMR) protocols and convert that data upon request to an industrial monitoring and control system protocol such as MODBUS®, DF1, EtherNet/IP™, or ADAM 4000. The present art further provides serial RS-232C and RS-485, and Ethernet ports whereby said data may be transmitted and/or the apparatus may be setup according to user defined specifications. The present art apparatus also provides industrial standard pulse (0-5 volts) and current (4-20 milliamps) inputs. The present art further provides a user configurable display which may display any or only a portion of the aforesaid data along with other user desired data. The apparatus further serves a web page over the Ethernet port with the aforesaid data populating a table.

20 Claims, 55 Drawing Sheets

SENSUS ENCODED REGISTER

|  | ASCII-MODE | RTU-MODE |
|---|---|---|
| ENCODING | 7-BIT HEX/ASCII | 8-BIT BINARY |
| START DELIMITER | : (0x3A) | ANY DATA AFTER 3.5 BYTE SILENT TIME MARKS MSG START |
| STOP DELIMITER | <CR><LF> | NONE. 1.5 BYTE SILENT TIME MARKS MSG END |
| TIMING | RELAXED. 1 SEC. INTER-CHAR DELAYS TOLERATED | TIGHT. 1.5 BYTE SILENT TIME TERMINATES MSG |

FIG. 23

FUNCTION: 03(READ)

| REGISTERS | DESCRIPTORS |
|---|---|
| 40001,40002* | METER 1 TOTAL (UNSCALED) |
| 40003,40004* | METER 2 TOTAL (UNSCALED) |
| 40005,40006** | FLOW 1 X 1000 |
| 40007,40008** | FLOW 2 X 1000 |
| 40009 | ROLLOVERS – METER 1 |
| 40010 | ROLLOVERS – METER 2 |
| 40011 | AIN 1 (0-10000) |
| 40012 | AIN 2 (0-10000) |
| 40013 | SUPPLY VOLTS X 10 |
| 40014 | AUXILIARY DIGITAL I/O 1 |
| 40015 | AUXILIARY DIGITAL I/O 2 |
| 40016 | METER 1 READ FAULT |
| 40017 | METER 2 READ FAULT |
| 40018,40019* | SYSTEM UPTIME (MINUTES) |
| 40020 | METER 1 nDIGITS |
| 40021 | METER 2 nDIGITS |
| 40022 | METER 1 EXPONENT |
| 40023 | METER 2 EXPONENT |
| 40024 | METER 1 UNITS |
| 40025 | METER 2 UNITS |
| 40026 | METER 1 READ FAULT COUNTER |
| 40027 | METER 2 READ FAULT COUNTER |
| 40028 | METER 1 FLOW CALC METHOD |
| 40029 | METER 2 FLOW CALC METHOD |
| 40030 | METER 1 SAMPLE PERIOD (SECS) |
| 40031 | METER 2 SAMPLE PERIOD (SECS) |
| 40032 | METER 1 FLOW TIMEOUT (SECS) |
| 40033 | METER 2 FLOW TIMEOUT (SECS) |
| 40034 | METER 1 POWERUP (MSECS) |
| 40035 | METER 2 POWERUP (MSECS) |
| 40036 | METER 1 PROTOCOL (1=SENSUS,2=NEPTUNE) |
| 40037 | METER 2 PROTOCOL (1=SENSUS,2=NEPTUNE) |
| 40038 | COMPOUNDED METER EXPONENT (COMP EXP) |
| 40039,40040* | METER 1 UPPER TOTAL (ACTUAL / $10^{(COMP\ EXP)}$) |
| 40041,40042* | METER 2 UPPER TOTAL (ACTUAL / $10^{(COMP\ EXP)}$) |
| 40043,40044* | COMPOUND METER UPPER TOTAL (ACTUAL / $10^{(COMP\ EXP)}$) |
| 40045 | METER 1 LOWER TOTAL (ACTUAL % $10^{(COMP\ EXP)}$) |
| 40046 | METER 2 LOWER TOTAL (ACTUAL % $10^{(COMP\ EXP)}$) |
| 40047 | COMPOUND METER LOWER TOTAL (ACTUAL % $10^{(COMP\ EXP)}$) |
| 40048,40049** | COMPOUND FLOW X 1000 |

*DATA OCCUPYING THESE REGISTERS ARE 32-BIT UNSIGNED LONG INTEGERS.
**DATA OCCUPYING THESE REGISTERS ARE 32-BIT SIGNED LONG INTEGERS.
ALL OTHERS ARE 16-BIT SIGNED INTEGERS

FUNCTION: 02(READ)

| INPUTS | DESCRIPTORS |
|---|---|
| 10001 | AUXILIARY DIGITAL I/O 1 |
| 10002 | AUXILIARY DIGITAL I/O 2 |
| 10003 | METER 1 READ FAULT |
| 10004 | METER 2 READ FAULT |
| 10005 | METER 1 FORWARD FLOW (Y/N) |
| 10006 | METER 2 FORWARD FLOW (Y/N) |
| 10007 | METER 1 REVERSE FLOW (Y/N) |
| 10008 | METER 2 REVERSE FLOW (Y/N) |

FUNCTION: 01(READ) / 05(WRITE) / 15(WRITE)

| COILS | DESCRIPTOR |
|---|---|
| 00001 | AUXILIARY DIGITAL OUTPUT 1 |
| 00002 | AUXILIARY DIGITAL OUTPUT 2 |

FIG. 24

Master (Request):
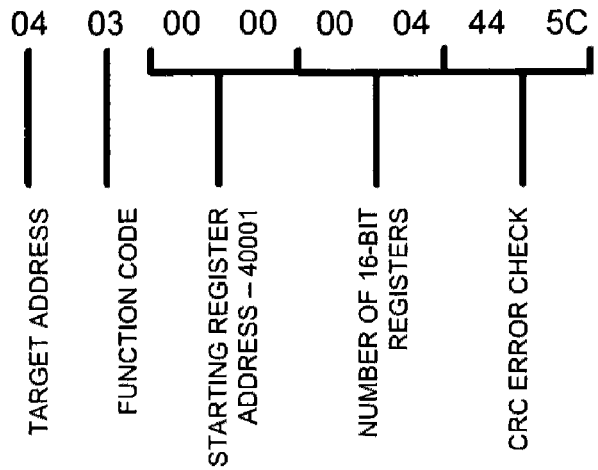
Apparatus (Response):
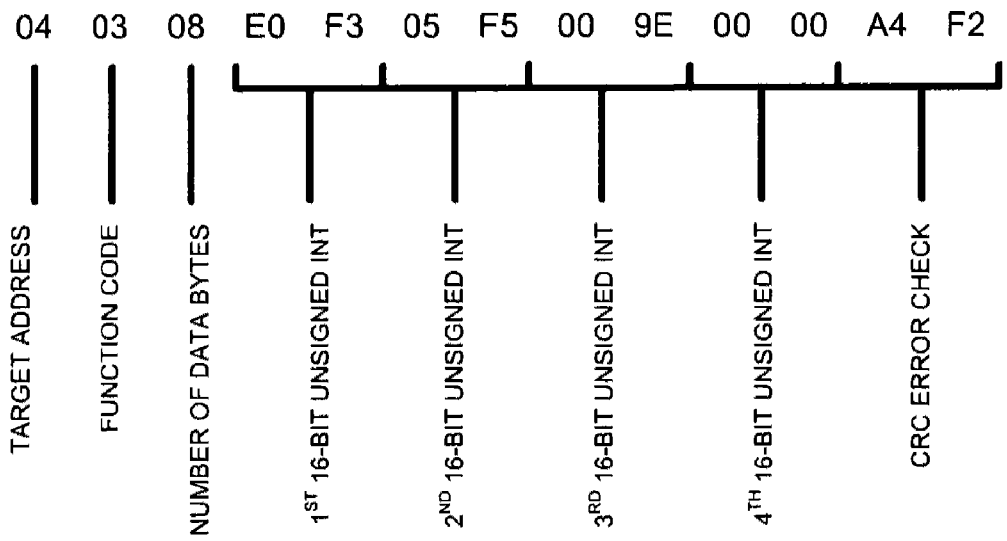
FIG. 25

FUNCTION: #AAn (READ ANALOG INPUTS)*

REGISTERS (Hex) DESCRIPTORS

| | |
|---|---|
| 0 | METER 1 TOTAL (UNSCALED) |
| 1 | METER 2 TOTAL (UNSCALED) |
| 2 | FLOW 1 X 1000 |
| 3 | FLOW 2 X 1000 |
| 4 | ROLLOVERS – METER 1 |
| 5 | ROLLOVERS – METER 2 |
| 6 | AIN 1 (0-10000) |
| 7 | AIN 2 (0-10000) |
| 8 | SUPPLY VOLTS X 10 |
| 9 | AUXILIARY DIGITAL I/O 1 |
| A | AUXILIARY DIGITAL I/O 2 |
| B | METER 1 READ FAULT |
| C | METER 2 READ FAULT |
| D | SYSTEM UPTIME (MINUTES) |
| E | METER 1 nDIGITS |
| F | METER 2 nDIGITS |

AA : HEX DEVICE ADDRESS
n : HEX INPUT CHANNEL (0-F)

FUNCTION: $AA6 (READ DISCRETE INPUTS)*

INPUTS DESCRIPTORS

| | |
|---|---|
| 0 | AUXILIARY DIGITAL I/O 1 |
| 1 | AUXILIARY DIGITAL I/O 2 |
| 2 | METER 1 READ FAULT |
| 3 | METER 2 READ FAULT |
| 4 | METER 1 FORWARD FLOW (Y/N) |
| 5 | METER 2 FORWARD FLOW (Y/N) |
| 6 | METER 1 REVERSE FLOW (Y/N) |
| 7 | METER 2 REVERSE FLOW (Y/N) |

AA : HEX DEVICE ADDRESS

FUNCTION: #AA100d (WRITE RELAY)*

COILS DESCRIPTOR

| | |
|---|---|
| 0 | AUXILIARY DIGITAL OUTPUT 1 |
| 1 | AUXILIARY DIGITAL OUTPUT 2 |

AA : HEX DEVICE ADDRESS
d : 0 (RELAY OFF), 1 (RELAY ON)

FUNCTION: $AAM (READ DEVICE ID)*

RESPONSE: !AAETHERMETER<CR>

* AA : HEX DEVICE ADDRESS

FIG. 26

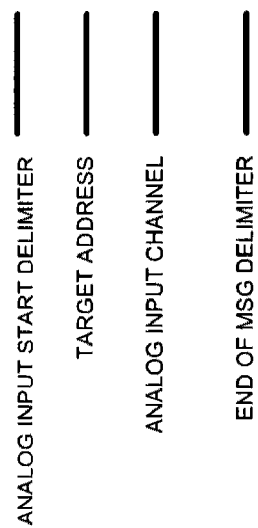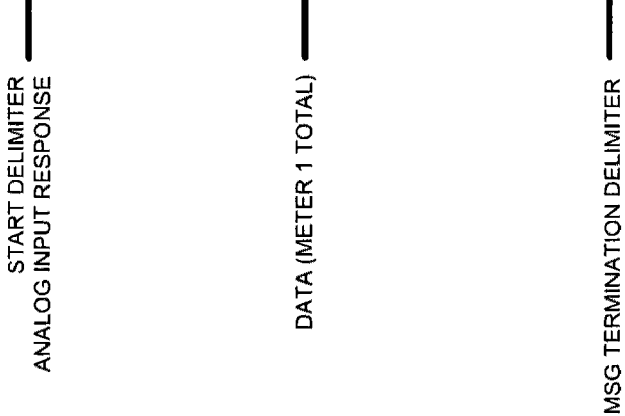
FIG. 27

PROTECTED TYPED LOGICAL READ/WRITE WITH 3 ADDRESS FIELDS

[CMD,FNC,FILE#,FILETYPE] = [0F,A2,07,89]  (READ N7 REGISTERS)

| REGISTERS | DESCRIPTORS |
|---|---|
| N7:0-1* | METER 1 TOTAL (UNSCALED) |
| N7:2-3* | METER 2 TOTAL (UNSCALED) |
| N7:4-5** | FLOW 1 X 1000 |
| N7:6-7** | FLOW 2 X 1000 |
| N7:8 | ROLLOVERS – METER 1 |
| N7:9 | ROLLOVERS – METER 2 |
| N7:10 | AIN 1 (0-10000) |
| N7:11 | AIN 2 (0-10000) |
| N7:12 | SUPPLY VOLTS X 10 |
| N7:13 | AUXILIARY DIGITAL I/O 1 |
| N7:14 | AUXILIARY DIGITAL I/O 2 |
| N7:15 | METER 1 READ FAULT |
| N7:16 | METER 2 READ FAULT |
| N7:17-18* | SYSTEM UPTIME (MINUTES) |
| N7:19 | METER 1 nDIGITS |
| N7:20 | METER 2 nDIGITS |
| N7:21 | METER 1 EXPONENT |
| N7:22 | METER 2 EXPONENT |
| N7:23 | METER 1 UNITS |
| N7:24 | METER 2 UNITS |
| N7:25 | METER 1 READ FAULT COUNTER |
| N7:26 | METER 2 READ FAULT COUNTER |
| N7:27 | METER 1 FLOW CALC METHOD |
| N7:28 | METER 2 FLOW CALC METHOD |
| N7:29 | METER 1 SAMPLE PERIOD (SECS) |
| N7:30 | METER 2 SAMPLE PERIOD (SECS) |
| N7:31 | METER 1 FLOW TIMEOUT (SECS) |
| N7:32 | METER 2 FLOW TIMEOUT (SECS) |
| N7:33 | METER 1 POWERUP (MSECS) |
| N7:34 | METER 2 POWERUP (MSECS) |
| N7:35 | METER 1 PROTOCOL (1=SENSUS,2=NEPTUNE) |
| N7:36 | METER 2 PROTOCOL (1=SENSUS,2=NEPTUNE) |
| N7:37 | COMPOUNDED METER EXPONENT (COMP EXP) |
| N7:38-39* | METER 1 UPPER TOTAL (ACTUAL / $10^{(COMP\ EXP)}$) |
| N7:40-41* | METER 2 UPPER TOTAL (ACTUAL / $10^{(COMP\ EXP)}$) |
| N7:42-43* | COMPOUND METER UPPER TOTAL (ACTUAL / $10^{(COMP\ EXP)}$) |
| N7:44 | METER 1 LOWER TOTAL (ACTUAL % $10^{(COMP\ EXP)}$) |
| N7:45 | METER 2 LOWER TOTAL (ACTUAL % $10^{(COMP\ EXP)}$) |
| N7:46 | COMPOUND METER LOWER TOTAL (ACTUAL % $10^{(COMP\ EXP)}$) |
| N7:47-48** | COMPOUND FLOW X 1000 |

*DATA OCCUPYING THESE REGISTERS ARE 32-BIT UNSIGNED LONG INTEGERS.
**DATA OCCUPYING THESE REGISTERS ARE 32-BIT SIGNED LONG INTEGERS.
ALL OTHERS ARE 16-BIT SIGNED INTEGERS

[CMD,FNC,FILE#,FILETYPE] = [0F,A2,FA,85]  (READ B250 REGISTERS)

| INPUTS | DESCRIPTORS |
|---|---|
| B250:0/0 | AUXILIARY DIGITAL I/O 1 |
| B250:0/1 | AUXILIARY DIGITAL I/O 2 |
| B250:0/2 | METER 1 READ FAULT |
| B250:0/3 | METER 2 READ FAULT |
| B250:0/4 | METER 1 FORWARD FLOW (Y/N) |
| B250:0/5 | METER 2 FORWARD FLOW (Y/N) |
| B250:0/6 | METER 1 REVERSE FLOW (Y/N) |
| B250:0/7 | METER 2 REVERSE FLOW (Y/N) |

[CMD,FNC,FILE#,FILETYPE] = [0F,AA,0A,85]  (WRITE B10 REGISTERS)

| COILS | DESCRIPTORS |
|---|---|
| B10:0/0 | AUXILIARY DIGITAL OUTPUT 1 |
| B10:0/1 | AUXILIARY DIGITAL OUTPUT 2 |

FIG. 27A

Master (Request):
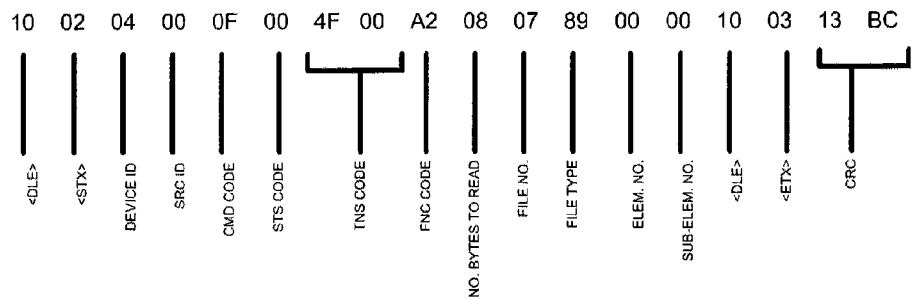
Apparatus (Response):
FIG. 27B

Client Request:
"Register Session":
28 Bytes:

```
[65 00]             [04 00]                         [00 00 00 00]  [00 00 00 00] [44 69 67 69 45 00 00 00]
[REGISTER SESSION]  [LEN OF DATA ATTACHED TO HEADER][SESSION HANDLE][STATUS]     [CONTEXT]

[00 00 00 00]     [01 00]                     [00 00]
[HEADER OPTIONS]  [REGISTER PROTOCOL VERSION] [REGISTER OPTIONS]
```

Server (Apparatus) Response:
"Register Session Response"
28 Bytes:

```
[65 00]             [04 00]                         [04 00 00 00]    [00 00 00 00] [44 69 67 69 45 00 00 00]
[REGISTER SESSION]  [LEN OF DATA ATTACHED TO HEADER][SET SESSION HANDLE][STATUS]   [CONTEXT]

[00 00 00 00]     [01 00]                     [00 00]
[HEADER OPTIONS]  [REGISTER PROTOCOL VERSION] [REGISTER OPTIONS]
```

Client Request:
"Execute PCCC Service" Request, Unconnected Read, Encapsulated PCCC.
Client Requests Registers N7:0-3.
Totalization From Meter 1 and Meter 2.
63 Bytes:

```
[6F 00]            [27 00]                          [04 00 00 00]   [00 00 00 00] [44 69 67 69 45 00 00 00]
[PCCC OBJECT CODE] [LEN OF DATA ATTACHED TO HEADER] [SESSION HANDLE][STATUS]      [CONTEXT]

[00 00 00 00]    [00 00 00 00]        [0A 00]   [02 00]     [00 00 00 00]  [B2 00]
[HEADER OPTIONS] [INTERFACE HANDLE]   [TIMEOUT] [MULTIPLIER][CPF ADDR ITEM][UCMM]

[17 00]              [4B]           [02]         [20 67]    [24 01] [07]          [25 03]        [97 81 3B 9D]
[CPF DATA ITEM LEN]  [EXEC PCC SVC] [PATH SIZE]  [REQ PATH        ] [REQ ID LEN]  [VEND ID]      [4 LSB'S OF MAC ID]]

[0F                                [00]  [02 00] [A2]  [08]         [07]          [39]             [00]        [00]
[CMD:TYPED LOGICAL READ W/ 3 ADDR] [STS] [TNS]   [FNC] [N. BYTES REQ][FILE NO.]   [INTEGER TYPE]   [ELEM.NO.]  [SUB-ELEM.NO.]
<------- [PCCC COMMAND] ---------------------------------------------------------------------------------------------------->
```

Server (Apparatus) Response:
"Execute PCCC Service" Response, Unconnected Read, Encapsulated PCCC.
Response Contains Registers N7:0-3.
Totalization From Meter 1 (2519) and Meter 2 (123476).
63 Bytes:

```
[6F 00]            [27 00]                          [04 00 00 00]   [00 00 00 00] [44 69 67 69 45 00 00 00]
[PCCC OBJECT CODE] [LEN OF DATA ATTACHED TO HEADER] [SESSION HANDLE][STATUS]      [CONTEXT]

[00 00 00 00]    [00 00 00 00]        [0A 00]   [02 00]     [00 00 00 00]  [B2 00]
[HEADER OPTIONS] [INTERFACE HANDLE]   [TIMEOUT] [MULTIPLIER][CPF ADDR ITEM][UCMM]

[17 00]              [CB]             [00]      [00]         [00]           [07]          [00 00]       [00 00 00 C8]
[CPF DATA ITEM LEN]  [EXEC PCC REPLY] [RESERV]  [GEN STATUS] [ADDL STATUS SIZE][REQ ID LEN][VEND ID]    [4 LSB'S OF MAC ID]

[4F]                               [00]  [02 00] [D7 09 00 00 54 E2 01 00]
[CMD:TYPED LOGICAL READ W/ 3 ADDR] [STS] [TNS]   [DATA PAYLOAD]
<------- [PCCC COMMAND] -------------------------------------->
```

FIG. 27C

```
Page 1/9 - Meter Setup

FirmVers: 1.090228.2255

Meter 1:                                    Meter 2:
--------                                    --------
Unit1:    GAL                               Unit2:    GAL
Exp1:     0                                 Exp2:     0
Roll1:    0                                 Roll2:    0
Fcalc1:   DTIME                             Fcalc2:   DTIME
Samp1:    30                                Samp2:    30
Timeout1: 300                               Timeout2: 300
Pwr1:     500                               Pwr2:     500

<TAB> = Next Page

CMD>_
```

FIG. 28

```
Com6-9600 - HyperTerminal
File Edit View Call Transfer Help

Page 4/9 - Auxiliary I/O Setup

Digital Out:                      Analog In:            <TAB> = Next Page

Aux1:      DOUT                   AIN1:    MA
Aux2:      DOUT                   AIN2:    MA
OnTime:    60                     ADCON:   990
OffTime:   21240                  EXPC:    3
Failsafe:  NONE
Failtime:  60

CMD>

Connected 0:04:10  ANSI  9600 8-N-1  SCROLL  CAPS  NUM  Capture  Print echo
```

FIG. 31

```
Page 6/9 - Register Display 1              <TAB> = Next Page
=<MODBUS REG>     <AB REG>
  40001-02        N7:0-1      Meter1(Unscaled)  :      2519
  40003-04        N7:2-3      Meter2(Unscaled)  :  99999976
  40005-06        N7:4-5      Flow1x1K          :        +0
  40007-08        N7:6-7      Flow2x1K          :        +0
  40009           N7:8        Rollovers 1       :        +0
  40010           N7:9        Rollovers 2       :        +0
  40011           N7:10       AIN 1(0-10K)      :      5262
  40012           N7:11       AIN 2(0-10K)      :       117
  40013           N7:12       Pwr - Volts x10   :         1
  40014           N7:13       Aux DIO 1         :         1
  40015           N7:14       Aux DIO 2         :         0
  40016           N7:15       Meter1 Fault      :         0
  40017           N7:16       Meter2 Fault      :         0
  40018-19        N7:17-18    Sys Uptime (min)  :        37
  40020           N7:19       Meter1-nDigits    :         8
  40021           N7:20       Meter2-nDigits    :         8
  40022           N7:21       Meter1-Expon      :        +0
  40023           N7:22       Meter2-Expon      :        +0
  40024           N7:23       Meter1-Units      :         0
  40025           N7:24       Meter2-Units      :         0
  40026           N7:25       Meter1-FaultCnt   :         0
  40027           N7:26       Meter2-FaultCnt   :         0
```

FIG. 33

```
Page 7/9 - Register Display 2                      <TAB> = Next Page
-<MODBUS REG>-----<AB REG>----
 40028            N7:27      FCalc1        : 1
 40029            N7:28      FCalc2        : 1
 40030            N7:29      Samp1         : 30
 40031            N7:30      Samp2         : 30
 40032            N7:31      Timeout1      : 300
 40033            N7:32      Timeout2      : 300
 40034            N7:33      Pwr1          : 500
 40035            N7:34      Pwr2          : 500
 40036            N7:35      Protoc1       : 1
 40037            N7:36      Protoc2       : 1
 40038            N7:37      Comp Exp      : 3
 40039-40         N7:38-39   Meter1 Upper  : 2
 40041-42         N7:40-41   Meter2 Upper  : 123
 40043-44         N7:42-43   Comp Upper    : 125
 40045            N7:44      Meter1 Lower  : 519
 40046            N7:45      Meter2 Lower  : 475
 40047            N7:46      Comp Lower    : 994
 40048-49         N7:47-48   FlowCompx1K   : +0_
```

FIG. 34

```
Page 9/9 - Meter Diagnostics          <TAB> = Next Page

Meter Chan  : 1
Byte Count  : 25
Raw Data    : V;RB00002519;IBL0T030115<CR>
Brand       : Sensus-Compatible, 8 Digits
Extracted Digits (Unscaled) : 00002519
D-Time (x 4 msecs) : 7500
D-Total (Unscaled) : 0
Flow x 1000 : 0

Meter Chan  : 2
Byte Count  : 34
Raw Data    : <STX>200SW<ETB>999999<ETB>9278061376<ETB>x<ETB>76@<ETB>BB<ETX>
Brand       : Neptune-Compatible, 8 Digits
Extracted Digits (Unscaled) : 99999976
D-Time (x 4 msecs) : 7500
D-Total (Unscaled) : 0
Flow x 1000 : 0
```

FIG. 34B

| METER SETUP | SELECTIONS | DEFAULTS |
|---|---|---|
| SET UNIT1 | GAL, L, FT3, M3 | GAL |
| SET UNIT2 | GAL, L, FT3, M3 | GAL |
| SET EXP1 | -8, -7, -6, -5, -4, -3, -2, -1, 0, 1, 2, 3, 4, 5, 6, 7, 8 | 0 |
| SET EXP2 | -8, -7, -6, -5, -4, -3, -2, -1, 0, 1, 2, 3, 4, 5, 6, 7, 8 | 0 |
| SET ROLL1 | -100...-5, -4, -3, -2, -1, 0, 1, 2, 3, 4, 5...100 | 0 |
| SET ROLL2 | -100...-5, -4, -3, -2, -1, 0, 1, 2, 3, 4, 5...100 | 0 |
| SET FCALC1 | DTIME (Fixed dTime), DTOTAL (Fixed dTotal) | DTIME |
| SET FCALC2 | DTIME (Fixed dTime), DTOTAL (Fixed dTotal) | DTIME |
| SET SAMP1 | N (secs) (Meter 1 Sample Period) | 30 |
| SET SAMP2 | N (secs) (Meter 2 Sample Period) | 30 |
| SET TIMEOUT1 | N (secs) (Flow Timeout For Fixed dTotal) | 240 |
| SET TIMEOUT2 | N (secs) (Flow Timeout For Fixed dTotal) | 240 |
| SET PWR1 | N (msecs) (Time to power on register) | 500 |
| SET PWR2 | N (msecs) (Time to power on register) | 500 |
| SET SIMULATION | OFF, ON | OFF |
| SERIAL PORT SETUP | SELECTIONS | DEFAULTS |
| SET ADDRESS | N (decimal) (Protocol-Specific) | 4 (decimal) |
| SET PROTOCOL | MB-RTU, MB-ASCII, DF1-FD, DF1-RM, ASCII, ADAM, DISPLAY | MB-RTU |
| SET BAUD | N (bps) | 9600 |
| SET SERIALPARAMS | 8N1, 7E1, 7O1, 7N2 | 8N1 |
| SET FLOW-CTRL | FIXEDRTS, NULLMODEM, HANDSHAKE, NONE | FIXEDRTS |
| SET RESP-DELAY-US | N (usecs) | 0 |
| SET PRE-RTS-US | N (usecs) | 834 |
| SET POST-RTS-US | N (usecs) | 0 |
| SET COLL-AVOID-US | N (usecs) | 0 |
| SET NHALFBYTES | N (halfbytes) | 3 |
| MODBUS® SETUP | SELECTIONS | DEFAULTS |
| SET END16 | BIG-ENDIAN, LITTLE-ENDIAN | BIG-ENDIAN |
| SET END32 | BIG-ENDIAN, LITTLE-ENDIAN | BIG-ENDIAN |
| DF1 SETUP | SELECTIONS | DEFAULTS |
| SET DF1CHK | CRC, BCC | CRC |
| ADAM-4000 SETUP | SELECTIONS | DEFAULTS |
| SET ADMCHK | OFF, ON | OFF |
| NETWORK SETUP | SELECTIONS | DEFAULTS |
| SET DHCP | OFF, ON | OFF |
| SET IP | nnn.nnn.nnn.nnn | 192.168.1.140 |
| SET GATEWAY | nnn.nnn.nnn.nnn | 192.168.1.1 |
| SET NETMASK | nnn.nnn.nnn.nnn | 255.255.255.0 |
| SET NBNS | OFF, ON | ON |
| SET PASSWORD | AAAAAAAA | EMETER |
| SET PORT HTTP | 1 – 65535 | 80 |
| SET PORT MBTCP | 1 – 65535 | 502 |
| SET PORT ETHIP | 1 – 65535 | 44818 |

FIG. 35A

| AUX I/O SETUP | SELECTIONS | DEFAULTS |
|---|---|---|
| SET AUX1 | DOUT, PWRSAVHI, PWRSAVLO | DOUT |
| SET AUX2 | DOUT, DIN | DOUT |
| SET ONTIME | N (secs) | 60 (1 min) |
| SET OFFTIME | N (secs) | 21240 (5 hrs,54min) |
| SET FAILSAFE | NONE, ON, OFF | NONE |
| SET FAILTIME | N (secs) | 60 |
| SET AIN1 | MA, V | MA |
| SET AIN2 | MA, V | MA |
| SET ADCONST | A/D CONVERTER CONSTANT | 990 |
| SET EXPC | 0, 1, 2, 3, 4 | 3 |
| AUX I/O SETUP | SELECTIONS | DEFAULTS |
| SET LCD01 | AUTO, ON, OFF | AUTO |
| SET LCD02 | AUTO, ON, OFF | AUTO |
| SET LCD03 | AUTO, ON, OFF | AUTO |
| SET LCD04 | AUTO, ON, OFF | AUTO |
| SET LCD05 | ON, OFF | OFF |
| SET LCD06 | ON, OFF | OFF |
| SET LCD07 | ON, OFF | OFF |
| SET LCD08 | ON, OFF | OFF |
| SET LCD09 | ON, OFF | OFF |
| SET LCD10 | ON, OFF | OFF |
| SET LCD11 | ON, OFF | OFF |
| SET LCD12 | ON, OFF | OFF |
| SET LCD13 | ON, OFF | OFF |
| SET LCD14 | AUTO, ON, OFF | AUTO |
| SET DESCR1 | TEXT DESCRIPTION FOR METER ATTACHED TO CH. 1 (1 TO 4 CHARS) | 1 |
| SET DESCR2 | TEXT DESCRIPTION FOR METER ATTACHED TO CH. 2 (1 TO 4 CHARS). | 2 |
| SET BANNER | TEXT DESCRIPTION FOR THE DEVICE'S LOCATION (1 TO 32 CHARS). | <BLANK> |

FIG. 35B

| METER SETUP | SELECTIONS | DEFAULTS |
|---|---|---|
| SET UNIT1 | GAL, L, FT3, M3<br><br>(SELF EXPLANATORY) | GAL |
| SET UNIT2 | GAL, L, FT3, M3 | GAL |
| SET EXP1 | -8, -7, -6, -5,-4,-3,-2,-1,0,1,2,3,4,5,6,7,8<br><br>SPECIFIES THE PLACEMENT OF THE DECIMAL POINT FOR METER 1. '0' CORRESPONDS TO NOT MOVING THE DECIMAL POINT... '-1' CORRESPONDS TO MOVING THE DECIMAL POINT ONE DIGIT TO THE LEFT... '+1' CORRESPONDS TO MOVING THE DECIMAL POINT ONE DIGIT TO THE RIGHT, ETC... NOTE THAT THIS SETTING SCALES THE TOTAL AND FLOW AS DISPLAYED ON THE 2X16 LCD DISPLAY AND WEB PAGE. HOWEVER, THIS SETTING DOES NOT SCALE THE REPORTED TOTALS IN MODBUS REGISTERS 40001-40004 AND DF1 REGISTERS N7:0-3. | 0 |
| SET EXP2 | -8, -7, -6, -5,-4,-3,-2,-1,0,1,2,3,4,5,6,7,8 | 0 |
| SET ROLL1 | -100...-5,-4,-3,-2,-1,0,1,2,3,4,5...100<br><br>DEVICE WILL COUNT METER ROLLOVERS. USER MAY PRE-LOAD THESE REGISTERS. | 0 |
| SET ROLL2 | -100...-5,-4,-3,-2,-1,0,1,2,3,4,5...100 | 0 |
| SET FCALC1 | DTIME (Fixed dTime), DTOTAL (Fixed dTotal)<br><br>SPECIFIES THE FLOW RATE CALCULATION METHOD:<br><br>DTIME:<br>• FIXED DELTA TIME (EG. 30 SECS)<br>• BEST FOR REGISTER WITH 8 WHEELS<br>• FLOW = DTOTAL / DTIME (FIXED).<br>• FLOW RATE IS RE-CALCULATED AFTER EACH SAMPLE. (SEE SAMPLERATE1)<br><br>DTOTAL:<br>• FIXED DELTA TOTAL (EG. 1000 GAL)<br>• BEST FOR REGISTERS WITH 6 OR FEWER WHEELS<br>• FLOW = DTOTAL (FIXED) / DTIME<br>• FLOW RATE IS RE-CALCULATED WHEN THE REGISTER REPORTS A NEW TOTAL, UNLESS TIMEOUT1 HAS ELAPSED. | DTIME |
| SET FCALC2 | DTIME (Fixed dTime), DTOTAL (Fixed dTotal) | DTIME |
| SET SAMP1 | N (secs) (Meter 1 Sample Period)<br><br>TIME (SECS) BETWEEN METER READS<br>IF FLOWCALCn=DTIME, SET SAMPLERATEn TO 30-180 SECS (TYPICAL).<br>IF FLOWCALCn=DTOTAL, SET SAMPLERATEn TO 3-15 SECS (TYPICAL). | 30 |
| SET SAMP2 | N (secs) (Meter 2 Sample Period) | 30 |
| SET TIMEOUT1 | N (secs) (Flow Timeout For Fixed dTotal)<br><br>IF USING FIXED DTOTAL FLOW CALC METHOD, AND METER HAS NOT INCREASED, AND TIMEOUT HAS ELAPSED, DISPLAY AND REPORT FLOW RATE AS ZERO. | 240 |
| SET TIMEOUT2 | N (secs) (Flow Timeout For Fixed dTotal) | 240 |
| SET PWR1 | N (msecs) (Time to power on register)<br><br>INCREASING THIS TIME CAN SOMETIMES HELP OVERCOME HIGH CABLE CAPACITANCE DUE TO LONG METER CABLE RUNS.<br>CAN USE 55 MSEC FOR NEPTUNE E-CODER REGISTERS.<br>FOR ADVANCED USERS ONLY. | 500 |
| SET PWR2 | N (msecs) (Time to power on register) | 500 |
| SET SIMULATION | OFF, ON<br><br>• ON: APPARATUS REPORTS METER1 REGISTER AS 12345678, AND FLOW1 REGISTER TO -12345678. USEFUL FOR OFFLINE TESTING. NOTE: SIMULATION MODE IS ALWAYS CLEARED AFTER REBOOT.<br><br>• OFF: APPARATUS REPORTS ACTUAL REGISTER CONTENTS.<br><br>• WHEN SIMULATION=ON, THE SETUP MENU PROMPT IS: SIMUL><br>  WHEN SIMULATION=OFF, THE SETUP MENU PROMPT IS: CMD> | OFF |

FIG. 35C

| SERIAL PORT SETUP | SELECTIONS | DEFAULTS |
|---|---|---|
| SET ADDRESS | N (decimal) (Protocol-Specific)<br><br>DEVICE ADDRESS FOR MODBUS, DF1, AND ADAM-4000 PROTOCOLS. | 4 (decimal) |
| SET PROTOCOL | MB-RTU, MB-ASCII, DF1-FD, DF1-RM, ASCII, DISPLAY, ADAM<br><br>(SELF EXPLANATORY) | MB-RTU |
| SET BAUD | N (bps)<br><br>NOTE: DEVICE CAPABLE OF NON-STANDARD BAUD RATES. | 9600 |
| SET SERIALPARAMS | 8N1, 7E1, 7O1, 7N2<br><br>8N1 (8 Data Bits, No Parity, 1 Stop Bit)<br>7E1 (7 Data Bits, Even Parity, 1 Stop Bit)<br>7O1 (7 Data Bits, Odd Parity, 1 Stop Bit)<br>7N2 (7 Data Bits, No Parity, 2 Stop Bits) | 8N1 |
| SET FLOW-CTRL | FIXEDRTS, NULLMODEM, HANDSHAKE, NONE<br><br>FIXEDRTS (USE FOR CERTAIN "DUMB" MODEMS & RS-485):<br>• DELAY BEFORE RESPONSE FOR FIXED TIME,<br>• THEN RAISE RTS FOR FIXED TIME,<br>• TRANSMIT DATA<br>• HOLD RTS HIGH FOR FIXED TIME<br><br>NULL-MODEM:<br>• TRANSMITS IF/WHILE CTS IS HIGH.<br>• LOWERS RTS IF/WHILE RCV BUFFER FULL.<br><br>HANDSHAKE (USE FOR CERTAIN "SMART" MODEMS):<br>• RAISE RTS WHEN DATA IS READY TO TRANSMIT.<br>• BUT WAIT FOR CTS RCV'D FROM MASTER BEFORE XMT.<br><br>NONE (USE FOR CERTAIN "SMART" MODEMS):<br>• NO HARDWARE FLOW CONTROL<br>• ACTIVE WIRES: TXD, RXD, AND GND<br><br>NOTE: SOFTWARE FLOW CONTROL IS NOT SUPPORTED. | FIXEDRTS |
| SET RESP-DELAY-US | N (usecs)<br><br>• USED WITH "FIXEDRTS" FLOW CONTROL ONLY.<br>• TIME DELAY BEFORE RESPONDING TO A REQUEST BY A MASTER.<br>• USEFUL FOR TUNING RS-485 OR RADIO-MODEM TIMING.<br>• IMPLEMENTED IN MULTIPLES OF 834 MICROSECONDS. | 0 |
| SET PRE-RTS-US | N (usecs)<br><br>• USED WITH "FIXEDRTS" FLOW CONTROL ONLY.<br>• AFTER RESP-DELAY-US, THIS IS THE TIME DELAY WHILE HOLDING RTS HIGH.<br>• USEFUL FOR TUNING RS-485 OR RADIO-MODEM TIMING.<br>• IMPLEMENTED IN MULTIPLES OF 834 MICROSECONDS. | 834 |
| SET POST-RTS-US | N (usecs)<br><br>• USED WITH "FIXEDRTS" FLOW CONTROL ONLY.<br>• AFTER DATA IS COMPLETELY TRANSMITTED, THIS IS THE TIME DELAY FOR HOLDING RTS HIGH.<br>• USEFUL FOR TUNING RS-485 OR RADIO-MODEM TIMING.<br>• IMPLEMENTED IN MULTIPLES OF 834 MICROSECONDS. | 0 |
| SET COLL-AVOID-US | N (usecs)<br><br>• USED WITH "FIXEDRTS" FLOW CONTROL ONLY.<br>• IF NON-ZERO, TRANSMITTER WILL WAIT UP TO N MICROSECONDS FOR DCD TO GO LOW BEFORE TRANSMITTING.<br>• USEFUL FOR IMPLEMENTING COLLISION-AVOIDANCE WITH "DUMB" RADIO-MODEMS.<br>• IMPLEMENTED IN MULTIPLES OF 834 MICROSECONDS. | 0 |
| SET NHALFBYTES | N (halfbytes)<br><br>• MODIFIES MODBUS/RTU AND DF1 SERIAL RECEPTION BEHAVIOR. DURING DATA PACKET RECEPTION, AFTER "N" HALF-BYTE TIME PERIODS HAVE ELAPSED WITH NO FURTHER DATA RECEIVED, THEN END-OF-PACKET IS ASSUMED. DOES NOT AFFECT MODBUS/ASCII OR ADAM-4000 RECEPTION BEHAVIOR.<br><br>• MODIFYING THIS SETTING MAY IMPROVE RECEPTION RELIABILITY WHEN USING AN UNCONDITIONED (EG. BELL-202) RADIO-MODEM. | 3<br><br>( MODBUS/RTU DEFAULT ) |

FIG. 35D

| MODBUS SETUP | SELECTIONS | DEFAULTS |
|---|---|---|
| SET END16 | BIG-ENDIAN, LITTLE-ENDIAN<br>• BIG-ENDIAN – MS (MOST SIGNIFICANT) BYTE TRANSMITTED FIRST<br>• LITTLE-ENDIAN – LS (LEAST SIGNIFICANT) BYTE TRANSMITTED FIRST | BIG-ENDIAN |
| SET END32 | BIG-ENDIAN, LITTLE-ENDIAN<br>• BIG-ENDIAN – MS (MOST SIGNIFICANT) WORD TRANSMITTED FIRST<br>• LITTLE-ENDIAN – LS (LEAST SIGNIFICANT) WORD TRANSMITTED FIRST | BIG-ENDIAN |
| DF1 SETUP | SELECTIONS | DEFAULTS |
| SET DF1CHK | CRC, BCC<br>• CRC (DEFAULT) – USE 16-BIT CRC ERROR CHECKING<br>• BCC – USE 8-BIT CHECKSUM | CRC |
| ADAM-4000 SETUP | SELECTIONS | DEFAULTS |
| SET ADMCHK | OFF, ON<br>• OFF (ADAM-4000 DEFAULT) – TURN OFF CHECKSUM ERROR CHECKING<br>• ON – TURN ON CHECKSUM ERROR CHECKING | OFF |
| NETWORK SETUP | SELECTIONS | DEFAULTS |
| SET DHCP | OFF, ON<br>• OFF (DEFAULT) – USE DEFAULT IP ADDRESS, GATEWAY ADDRESS, AND NETMASK.<br>• ON – USE DHCP TO FETCH IP ADDRESS, GATEWAY ADDRESS, AND NETMASK. | OFF |
| SET IP | nnn.nnn.nnn.nnn<br>• DEFAULT IP ADDRESS<br>• IGNORED WHEN DHCP IS ON | 192.168.1.140 |
| SET GATEWAY | nnn.nnn.nnn.nnn<br>• DEFAULT GATEWAY ADDRESS<br>• IGNORED WHEN DHCP IS ON | 192.168.1.1 |
| SET NETMASK | nnn.nnn.nnn.nnn<br>• DEFAULT NETMASK<br>• IGNORED WHEN DHCP IS ON | 255.255.255.0 |
| SET NBNS | OFF, ON<br>• OFF=DISABLE NETBIOS NAME SERVICE (CONSERVES NETWORK BANDWIDTH) | ON |
| SET PASSWORD | AAAAAAAA<br>• TELNET PASSWORD (CASE INSENSITIVE, 8 CHARS MAX)<br>• TELNET USERNAME IS FIXED AS: EMETER | EMETER |
| SET PORT HTTP | 1 – 65535<br>TCP PORT FOR WEB SERVER | 80 |
| SET PORT MBTCP | 1 – 65535<br>TCP PORT FOR MODBUS/TCP,<br>UDP PORT FOR MODBUS/UDP | 502 |
| SET PORT ETHIP | 1 – 65535<br>TCP PORT FOR ETHERNET/IP | 44818 |

FIG. 35E

| AUX I/O SETUP | SELECTIONS | DEFAULTS |
|---|---|---|
| SET AUX1 | DOUT, PWRSAVHI, PWRSAVLO<br><br>DOUT:<br>• DIGITAL OUTPUT – FOLLOWS COMMANDS FROM MODBUS OR DF1 (OR ADAM) MASTER<br><br>PWRSAVHI:<br>• DIGITAL OUTPUT GOES "HI" (5V) TO TURN ON CONNECTED RADIO OR MODEM.<br><br>PWRSAVLO:<br>• DIGITAL OUTPUT GOES "LO" (0V) TO TURN ON CONNECTED RADIO OR MODEM.<br><br>( FOR PWRSAVLO AND PWRSAVHI TIMING DIAGRAMS, SEE SECTION 9, RADIO INTERFACE.) | DOUT |
| SET AUX2 | DOUT, DIN<br><br>DOUT:<br>• DIGITAL OUTPUT – FOLLOWS COMMANDS FROM MODBUS, DF1, ETHERNET/IP, OR ADAM MASTER<br><br>DIN:<br>• DIGITAL INPUT – MAY BE MONITORED BY INTERROGATION FROM MODBUS, DF1, ETHERNET/IP, OR ADAM MASTER | DOUT |
| SET ONTIME | N (secs)<br><br>• USED WHEN DOUT1=PWRSAVHI OR PWRSAVLO<br>• TIME TO LEAVE RADIO ON AFTER THE RECEIPT OF A POLL REQUEST ADDRESSED TO THIS DEVICE.<br>• FOR TIMING DIAGRAM, SEE SECTION 9, RADIO INTERFACE. | 60<br>(1 min) |
| SET OFFTIME | N (secs)<br><br>• AFTER RECEIPT OF POLL REQUEST AND AFTER ONTIME ELAPSED, TIME TO LEAVE RADIO OFF.<br>• AFTER OFFTIME ELAPSES, RADIO WILL BE TURNED OFF AND DEVICE WILL WAIT FOR NEXT POLL REQUEST.<br>• FOR TIMING DIAGRAM, SEE SECTION 9, RADIO INTERFACE. | 21240<br>(5 hrs.54min) |
| SET FAILSAFE | NONE, ON, OFF<br><br>ON:<br>• WHEN POLL NOT RECEIVED FOR FAILTIME (SECS), TURN DIGITAL OUTPUT(S) ON.<br><br>OFF:<br>• WHEN POLL NOT RECEIVED FOR FAILTIME (SECS), TURN DIGITAL OUTPUT(S) OFF.<br><br>NONE:<br>• IGNORE FAILTIME.<br><br>('FAILSAFE' SETTING ONLY AFFECTS DIGITAL OUTPUT 1 WHEN DOUT1=AUTO.) | NONE |
| SET FAILTIME | N (secs)<br><br>WHEN POLL NOT RECEIVED AFTER FAILTIME (SECS) HAS ELAPSED, DIGITAL OUTPUT(S) PUT INTO FAILSAFE STATE<br><br>('FAILSAFE' SETTING ONLY AFFECTS DIGITAL OUTPUT 1 WHEN DOUT1=AUTO.) | 60 |
| SET AIN1 | MA, V<br><br>MA:<br>0 (0%) → 4 MA<br>10000 (100%) → 20 MA<br><br>V:<br>0 (0%) → 0 V<br>10000 (100%) → 5 V<br><br>(NOTE: FOR 0-5V INPUT, REMOVE JP1) | MA |

FIG. 35F

| | | |
|---|---|---|
| SET AIN2 | MA, V<br><br>MA:<br>0 (0%) → 4 MA<br>10000 (100%) → 20 MA<br><br>V:<br>0 (0%) → 0 V<br>10000 (100%) → 5 V<br><br>(NOTE: FOR 0-5V INPUT, REMOVE JP2) | MA |
| SET ADCONST | A/D CONVERTER CONSTANT - FACTORY USE ONLY | 990 |
| SET EXPC | 0, 1, 2, 3, 4<br><br>SPECIFIES THE EXPONENTIAL MULTIPLIER FOR THE REGISTERS CONTAINING THE COMPOUND METER TOTAL AND METER 1 AND 2 SCALED TOTALS.<br><br>USE CAUTION WHEN MODIFYING THIS PARAMETER. INTEGER OVERFLOW IS POSSIBLE IF AN ILL-CHOSEN PARAMETER IS USED. | 3 |
| AUX I/O SETUP | SELECTIONS | DEFAULTS |
| SET LCD01 | AUTO, ON, OFF<br><br>CONTROLS LCD DISPLAY OF METER #1 TOTALIZATION.<br><br>AUTO:<br>DISPLAY ACTIVE WHEN METER #1 DETECTED.<br><br>ON:<br>DISPLAY ACTIVE, REGARDLESS OF WHETHER METER 1 DETECTED.<br><br>OFF:<br>SUPPRESSES DISPLAY.<br><br>NOTE: FOR CONVENIENCE, ALL LCD SCREENS ARE SEQUENTIALLY DISPLAYED RIGHT AFTER POWERUP AND RIGHT AFTER SWITCHING FROM SETUP MODE TO RUN MODE (DIP SWITCH #1). | AUTO |
| SET LCD02 | AUTO, ON, OFF<br><br>CONTROLS LCD DISPLAY OF METER #2 TOTALIZATION.<br><br>AUTO:<br>DISPLAY ACTIVE WHEN METER #2 DETECTED.<br><br>ON:<br>DISPLAY ACTIVE, REGARDLESS OF WHETHER METER #2 DETECTED.<br><br>OFF:<br>SUPPRESSES DISPLAY. | AUTO |
| SET LCD03 | AUTO, ON, OFF<br><br>CONTROLS LCD DISPLAY OF METER #1 FLOW RATE.<br><br>AUTO:<br>DISPLAY ACTIVE WHEN METER #1 DETECTED.<br><br>ON:<br>DISPLAY ACTIVE, REGARDLESS OF WHETHER METER #1 DETECTED.<br><br>OFF:<br>SUPPRESSES DISPLAY. | AUTO |
| SET LCD04 | AUTO, ON, OFF<br><br>CONTROLS LCD DISPLAY OF METER #2 FLOW RATE.<br><br>AUTO:<br>DISPLAY ACTIVE WHEN METER #2 DETECTED.<br><br>ON:<br>DISPLAY ACTIVE, REGARDLESS OF WHETHER METER #2 DETECTED.<br><br>OFF:<br>SUPPRESSES DISPLAY. | AUTO |

FIG. 35G

| | ON, OFF | |
|---|---|---|
| SET LCD05 | CONTROLS LCD DISPLAY OF POWER SUPPLY VOLTAGE.<br><br>ON:<br>DISPLAY ACTIVE.<br><br>OFF:<br>SUPPRESSES DISPLAY. | OFF |
| SET LCD06 | ON, OFF<br><br>CONTROLS LCD DISPLAY OF ANALOG INPUT #1.<br><br>ON:<br>DISPLAY ACTIVE.<br><br>OFF:<br>SUPPRESSES DISPLAY. | OFF |
| SET LCD07 | ON, OFF<br><br>CONTROLS LCD DISPLAY OF ANALOG INPUT #2.<br><br>ON:<br>DISPLAY ACTIVE.<br><br>OFF:<br>SUPPRESSES DISPLAY. | OFF |
| SET LCD08 | ON, OFF<br><br>CONTROLS LCD DISPLAY OF AUX DIGITAL I/O #1.<br><br>ON:<br>DISPLAY ACTIVE.<br><br>OFF:<br>SUPPRESSES DISPLAY. | OFF |
| SET LCD09 | ON, OFF<br><br>CONTROLS LCD DISPLAY OF AUX DIGITAL I/O #2.<br><br>ON:<br>DISPLAY ACTIVE.<br><br>OFF:<br>SUPPRESSES DISPLAY. | OFF |
| SET LCD10 | ON, OFF<br><br>CONTROLS LCD DISPLAY OF ACTIVE SERIAL PROTOCOL.<br><br>ON:<br>DISPLAY ACTIVE.<br><br>OFF:<br>SUPPRESSES DISPLAY. | OFF |
| SET LCD11 | ON, OFF<br><br>CONTROLS LCD DISPLAY OF DEVICE (SERIAL) ADDRESS.<br><br>ON:<br>DISPLAY ACTIVE.<br><br>OFF:<br>SUPPRESSES DISPLAY. | OFF |
| SET LCD12 | ON, OFF<br><br>CONTROLS LCD DISPLAY OF DEVICE UPTIME (MINUTES).<br><br>ON:<br>DISPLAY ACTIVE.<br><br>OFF:<br>SUPPRESSES DISPLAY. | OFF |
| SET LCD13 | ON, OFF<br><br>CONTROLS LCD DISPLAY OF FIRMWARE VERSION.<br><br>ON:<br>DISPLAY ACTIVE.<br><br>OFF:<br>SUPPRESSES DISPLAY. | OFF |

FIG. 35H

| | AUTO, ON, OFF | |
|---|---|---|
| SET LCD14 | CONTROLS LCD DISPLAY OF BANNER TEXT.<br><br>AUTO:<br>DISPLAYS WHEN BANNER TEXT EXISTS (WHEN BANNER TEXT HAS BEEN ENTERED BY THE USER).<br><br>ON:<br>DISPLAY ACTIVE.<br><br>OFF:<br>SUPPRESSES DISPLAY. | AUTO |
| SET DESCR1 | TEXT DESCRIPTION FOR THE METER ATTACHED TO CHANNEL 1 (1 TO 4 CHARACTERS, NO SPACES). | 1 |
| SET DESCR2 | TEXT DESCRIPTION FOR THE METER ATTACHED TO CHANNEL 2 (1 TO 4 CHARACTERS, NO SPACES). | 2 |
| SET BANNER | TEXT DESCRIPTION FOR THE APPARATUS' LOCATION/PURPOSE/ETC... (1 TO 32 CHARACTERS).<br><br>NOTE 1: THE BANNER TEXT ENTERED SHOULD NOT CONTAIN ANY SPACES. UNDERSCORES SHOULD BE ENTERED IN LIEU OF SPACES WHEREVER NEEDED. THE APPARATUS WILL AUTOMATICALLY REPLACE THE UNDERSCORES WITH SPACES ON THE LCD DISPLAY, WEB PAGE, AND SETUP MENU.<br><br>NOTE 2: TO CLEAR THE BANNER TEXT, TYPE: "SET BANNER<ENTER>" | <BLANK> |
| MISCELLANEOUS | DESCRIPTION | |
| REBOOT | THE APPARATUS EXECUTES A SOFT RESTART WHEN "REBOOT" IS ENTERED AT THE COMMAND PROMPT | N/A |
| FACTORYRESET | THE FACTORY DEFAULT SETTINGS ARE RESTORED WHEN "FACTORYRESET" IS ENTERED AT THE COMMAND PROMPT. | N/A |

FIG. 35I

```
<html><head><title></title>
<meta name="expires" content="Sat, 1 Jan 2000 00:00:00 GMT"></head>
<body bgcolor="#ffcc99" link="blue" vlink="blue">
<table bgcolor="#669999" border=1 font face="Terminal" size="0">
<tr align=center><td colspan=2><b> METER1:E-CODER  METER2:OMNI-T2 </b></td></tr>
<tr valign="middle" bgcolor="#CCCCCC"><td valign="middle" colspan=2>
<font face="Verdana" size="-1"><b><a href="/b.html">Refresh</a><br>
<br>Digital Out 1 : <a href="/o.html">OFF</a> | <a href="/c.html">ON</a>
<br>Digital Out 2 : <a href="/O.html">OFF</a> | <a href="/C.html">ON</a><br>
</b></font></td></tr>
<tr><td colspan=2 align=center><b>DEVICE STATUS</b></td></tr>
<tr><td>Meter 1 Total</td><td> 00000092 </td></tr>
<tr><td>Meter 1 Flow</td><td> 0.000 </td></tr>
<tr><td>Meter 1 Rollovers</td><td> 0 </td></tr>
<tr><td>Meter 2 Total</td><td> 00000039 </td></tr>
<tr><td>Meter 2 Flow</td><td> 0.000 </td></tr>
<tr><td>Meter 2 Rollovers</td><td> 0 </td></tr>
<tr><td>Analog Input 1 (0-10000)</td><td> 2603 </td></tr>
<tr><td>Analog Input 2 (0-10000)</td><td> 0 </td></tr>
<tr><td>Power Supply (V)</td><td> 14.8 </td></tr>
<tr><td>Aux Digital I/O 1 (Output) </td><td> ON </td></tr>
<tr><td>Aux Digital I/O 2 (Output) </td><td> ON </td></tr>
<tr><td>Meter 1 Fault</td><td> NO </td></tr>
<tr><td>Meter 2 Fault</td><td> NO </td></tr>
<tr><td>Device Uptime (min)</td><td> 65139 </td></tr>
<tr><td>Web Hits</td><td> 667 </td></tr>
</table></body></html>
```

FIG. 38

SUPERVISORY CONTROL AND DATA ACQUISITION PROTOCOL CONVERTER

This application claims priority of U.S. Provisional Patent Application No. 61/069,855, filed Mar. 18, 2008, entitled Supervisory Control and Data Acquisition Protocol Converter.

BACKGROUND OF THE INVENTION

The art of the present invention relates to electronic protocol converters in general and more particularly to an electronic protocol converter which allows industrial Supervisory Control and Data Acquisition (hereafter referred to as "SCADA") Systems (also industrial monitoring and control systems) to utilize standard industrial protocols to interrogate viscous fluid or gas meter registers which communicate with Automatic Meter Reading (hereafter referred to as "AMR") protocols. The present art methods of implementation and associated apparatus provide an interface with and allow interrogation of the encoded meter registers which are typically utilized by municipal utilities in residential and commercial applications. (i.e. water utility companies, gas utility companies, sewer utility companies, etc.) The present art allows conventional industrial SCADA systems to read and utilize meters which are substantially less expensive than conventional industrial milliamp or pulse output flow meters and which provide a nonvolatile totalization of flow. Unlike conventional industrial flow meters which simply provide a 4-20 milliamp current or pulse output which represents a rate of flow, the present art allows retrieval of the total absolute value of fluid which has flowed through the meter (i.e. totalization). The present art does not require the SCADA system to continuously retain a prior volume of fluid flow as the totalization is available directly from the encoded meter registers.

For many years, SCADA (Supervisory Control And Data Acquisition) Systems have relied upon archaic pulse-output and milliamp-output meter registers as the primary data sources for totalization and flow even as "encoded" register technology for AMR (Automatic Meter Reading) has advanced in parallel at an astonishing pace. Due to the significant communication barrier, SCADA integrators have not utilized encoded registers for their systems. That is, encoded registers are designed to transmit their meter readings using AMR protocols, whereas SCADA systems utilize industrial protocols, such as MODBUS® over Ethernet and serial ports. The present art erases this communication barrier and allows SCADA Integrators to collect precise meter readings within water plants, pumping stations, well fields, master meters, and other locations where flow information is required without the undesirable totalization errors that plague pulse technology.

The present art provides industrial SCADA Systems with an improved ability to electronically interrogate the registers of AMR viscous fluid or gas meters, and as a result to provide the SCADA systems with meter readings or totalizations that agree exactly with the reading that is displayed on the meter's physical register. The present art enables each AMR meter to respond as a slave node on an industrial network which communicates with standard industrial protocols such as the MODBUS®, DF1, or ADAM-4000 derived protocols and Raw ASCII protocols. The present art also provides a method and apparatus for differentiating between zero flow conditions and a malfunctioning electronic meter register. The present art further provides a method and apparatus for detecting reverse (backward) flows through a meter. Prior art industrial meters often register a flow output as a milliamp current or pulse output which does not distinguish between forward or backward flows.

In recent years, electronic meter interrogation technology has become divided into approximately two major and distinct categories. The first category (residential and commercial) represents the class of meters which are utilized in residential and commercial facilities for utility company billing purposes. These include end-user water, gas, and electric meters which are interrogated electronically and are used for accounting and billing purposes. The second category (industrial) represents a class of meters which are utilized in industrial process control and monitoring such as pumping station meters, master meters, water plant meters, oil and gas pipeline meters, and well station meters, to name a few. As expected, the first category of meters are produced in very high volumes and are thereby substantially less expensive than the second category. Unfortunately, the electronic communication protocol which the first category residential and commercial meters utilize has heretofore been obscure in publication, difficult to reverse engineer, or non-standardized between various manufactures.

For accounting and billing purposes, residential and commercial electronic meter interrogation technology utilizes both proprietary and non-proprietary AMR (Automatic Meter Reading) protocols to read the meter registers. (hereafter referred to as "encoded registers") A common physical communication configuration uses three (3) wires: a generally synchronous input clock signal wire, a signal common wire, and an output signal "encoded data" wire. A popular 3-wire encoding protocol is found with the products manufactured by Sensus Metering Systems, Inc. The Sensus® 3-wire protocol is also utilized with the meter registers of several other meter manufacturers, including Badger Meter, Inc., Hersey Meters Company, Inc., Actaris, Inc., Master Meter, Inc., and Metron-Farnier, LLC. An alternate 3-wire protocol has been established by the Neptune Technology Group, Inc. FIG. 1 shows a prior art block form example of residential and commercial meter interrogation for accounting and billing purposes.

For industrial process control and monitoring purposes, electronic meter interrogation technology mainly relies upon pulse or contact per-volume signaling (e.g. one (1) emitted voltage or current pulse per gallon) and current-per-flow signaling (e.g. 4 milliamps=0 gallons per minute, 20 milliamps=500 gallons per minute). The aforementioned register types will hereafter be referred to as "pulse-output" and "milliamp-output" registers, respectively. The reading and monitoring of analog current signals, such as 4-20 milliamp signals, as well as the counting of pulses, is common in industrial controls. An example of a prior art milliamp-output register connected to a SCADA System is shown in FIG. 2; and an example of a prior art pulse-output register connected to a SCADA System is shown in FIG. 3. When rate-of-flow information is desired by a process control system, the use of milliamp-output registers is generally the predominant data acquisition method; whereas, pulse-output registers are the predominant data acquisition method when meter totalization information is desired. Totalization may also be obtained by performing an integral computation of the flow signal with respect to time, but a totalization error of some tangible magnitude would normally occur due to digital integration noise.

Within the industrial monitoring and control arts, prior art meter reading technology that depends upon pulse-output and current-output registers faces significant and inherent challenges in obtaining accurate meter totalizations, especially over long periods of time. For example, to monitor totalization from a pulse-output meter, first the installing technician/ engineer must connect the output terminals of the meter to the interrogating control system, which is typically a programmable logic controller (PLC) or remote terminal unit (RTU). Then the technician must program the present reading from the mechanical register into the PLC or RTU. This process is sometimes referred to as "synchronizing the PLC/RTU with the meter". Theoretically, the PLC/RTU should be able to maintain an accurate count of the pulses, and therefore of the meter reading itself, from this point in time forward. However, in practice, problems often arise. For example, if the PLC/RTU is shut off for any reason while water is flowing through the meter (eg. power outages, equipment failure, broken cable/connector), the PLC/RTU will not be able to count those pulses. This results in the reading on the meter's mechanical register advancing beyond that which is stored within the PLC/RTU. Furthermore, some PLC/RTU equipment does not store the running totalization in non-volatile memory, so upon re-start from a shutdown, the PLC/RTU will erroneously begin its count from zero.

The prior art is further limited in its ability to differentiate the fluid flow direction. If fluid flows in the backward direction, many pulse-output registers will emit pulses with no differentiation for the direction. The same holds true for many milliamp-output registers, as they can emit a positive signal regardless of flow direction. Therefore, the RTU/PLC will interpret these outputs as "forward flow", and accumulate the totalization count in the wrong (positive) direction. Occasionally, some pulse-output registers emit noise, which can be interpreted by the PLC/RTU as valid pulses, and therefore the accumulated total in the PLC/RTU will be erroneously high.

Over long periods of time, one or more of the aforementioned prior art issues can cause the totalization obtained from the pulse-counting and flow-integrating methods to differ so greatly from the true reading on the internal mechanical register of the meter that it becomes almost unusable. At such times, a technician must be dispatched to re-synchronize the PLC/RTU with the meter. This increases the maintenance, environmental, and other overall costs of the Industrial Control System.

Encoded meter registers (encoded registers) were developed within the past two decades to address the shortcomings of the aforesaid pulse or milliamp output registers. Many encoded registers, such as the E-Coder™ Register by Neptune Technology Group or the ICE™ Register by Sensus Metering Systems, provide a 3-wire interface through which connected equipment may interrogate the register for the exact totalization at any time. Usually, no battery is required within the register, as it only requires power during the meter interrogation process, and it derives all necessary power from the interrogation signal.

Encoded registers electronically communicate meter totalization readings with an accuracy which is far superior to that available from pulse-output and milliamp-output registers. Presently, encoded registers are in wide use as the preferred register type for electronically communicating meter data to residential or commercial utility billing and/or accounting systems. Nevertheless, the aforesaid billing and/or accounting applications collect meter data from the encoded registers through the use of proprietary data collection devices that are tailored for filling billing and accounting databases. None of the aforesaid billing and/or accounting applications utilize, convert to, or format the AMR meter data into generally accepted industrial protocols as does the present art nor do they allow communication with said industrial protocols.

Although industrial control and monitoring systems could also benefit from the superior accuracy of encoded registers, prior to the present art, no devices have existed that were capable of performing the necessary protocol translation between encoded registers and the industrial control and monitoring systems. The present art provides the capability to convert the aforesaid proprietary protocol to that which is utilized within the SCADA framework.

Accordingly, it is an object of the present invention to provide a supervisory control and data acquisition protocol converter capable of reading conventional AMR type encoded registers transmitting Sensus®, Neptune® or other protocols and convert the exact flow and totalization information into a format which is readily accepted by and communicated with industrial monitoring and control systems such as SCADA (Supervisory Control And Data Acquisition) Systems, including but not limited to MODBUS®, ADAM 4000, EtherNet/IP™ and DF1 formats.

Another object of the present invention is to provide a supervisory control and data acquisition protocol converter which is able to sense flow direction information from the encoded registers and provide the SCADA System with properly formatted information regarding amounts and directions of flow.

A further object of the present invention is to provide a supervisory control and data acquisition protocol converter having one or more Electronic Industry Association (EIA) or other serial standards such as RS-232 and RS-485, or Ethernet, or controller-area-network (CAN) industrial monitoring and control system interfaces.

A yet further object of the present invention is to provide a supervisory control and data acquisition protocol converter which is able to mathematically differentiate the encoded registers total value with respect to time in order to provide flow rate information.

A yet further object of the present invention is to provide a supervisory control and data acquisition protocol converter which is capable of accepting conventional pulse and 4-20 milliamp outputs from flow meters and other types of sensors and provide the sensed information in a generally accepted SCADA format.

A yet further object of the present invention is to provide a supervisory control and data acquisition protocol converter which is able to serve a hypertext markup language (html) web page and/or provide a TELNET (telecommunication network) server whereby sensor data information is remotely available via TCP/IP (transmission control protocol/internet protocol) or UDP (universal datagram protocol) links.

A yet further object of the present invention is to provide a supervisory control and data acquisition protocol converter which eliminates the requirement for periodic corrections or synchronizations.

A yet further object of the present invention is to provide a supervisory control and data acquisition protocol converter which promotes energy conservation via the relatively low energy consumption of the apparatus and the absence of previously required physical technician visits for re-synchronization of the meter totalization.

A yet further object of the present invention is to provide a supervisory control and data acquisition protocol converter which assists in the detection of pipeline leaks.

SUMMARY OF THE INVENTION

In accordance with the present invention, the preferred embodiment represents a supervisory control and data acquisition protocol converter which is able to read and analyze the flow totalizations within non-volatile memory of encoded register meters via a proprietary protocol link (such as SEN- SUS®, NEPTUNE®, and others) therewith and present the totalizations along with flow rates to a SCADA (supervisory control and data acquisition) system in a format which has traditionally been utilized with pulse output and 4-20 milliamp sensors. The formats include but are not limited to MODBUS®, ADAM-4000, EtherNet/IP™ and DF1 protocols. The present art further allows traditional pulse output and 4-20 milliamp sensors to be read and transmitted within the aforesaid protocols.

In its preferred form, the present art accepts as an interface the AMR three wire encoded register transmit/clock signal (TxD-Clock), Receive (RxD), and common. The present art provides the necessary interrogation to the encoded register over the TxD-Clock line and receives the meter totalization information in a proprietary form from the RxD line. Since the meters store the aforesaid totalization information internally, the present art is immune from errors due to power failures or accumulated errors as found within the prior art milliamp or pulse output meters.

As the information is received with the present art device, it is immediately available for transmission in industrially accepted protocols including but not limited to MODBUS®, ADAM-4000, EtherNet/IP™, DF1 as well as ASCII and HTML formats. The present art allows industrial automation systems to utilize traditional industrial protocols to monitor encoded meter registers and obtain totalization as well as flow information.

FIG. 4 shows an external view of a preferred embodiment of the present art apparatus. The apparatus bridges the communication gap between encoded meter registers and industrial control systems. The apparatus is understood within the arts as a protocol translator which enables industrial control systems to interrogate encoded registers in their native industrial protocols. The preferred embodiment communicates precise totalization and accurate flow rate information. That is, the apparatus formats totalization data to perform a first derivative with respect to time of the meter totalization. For the preferred embodiment, the derivative is performed or placed in a format as a finite-difference of the meter totalization with respect to time (delta volume per delta time). That is:

$$\frac{d(\text{totalization})}{dt} \approx \frac{\Delta(\text{totalization})}{\Delta t} \approx FlowRate$$

FIGS. 40-42 show block form examples of the present art apparatus as interfaced with AMR encoded register meters. FIG. 40 represents a serial communications interface with a programmable logic controller (PLC), FIG. 41 represents an Ethernet communications interface with a PLC, and FIG. 42 represents a use of the present art as a remote terminal unit (RTU). The present art may further be utilized as an RTU endpoint within a SCADA network at locations where extensive I/O is not required beyond reading the encoded meter register.

For the preferred embodiment, the apparatus is powered by an external DC voltage source, preferably between 9 and 36V. Alternative embodiments may utilize AC, DC, or combined power source of a plurality of values. Also in the preferred embodiment, a rectifier diode protects the circuit from accidental reverse hookup of the power supply and a fuse and nine (9) zener diodes protect the circuit against transient overvoltages.

MODBUS® is the primary industrial protocol for the apparatus, as it has become the de facto standard of industrial communication protocols. It was first introduced by Modicon (now Schneider Electric®) in 1979, and today is the most common means of connecting industrial electronic devices. It is openly published, royalty-free, and forms a relatively easy-to-deploy industrial network.

DF1 was selected as a complementary industrial protocol for the apparatus as it offers a complementary compatibility with the popular Allen Bradley® brand PLC's and Allen Bradley® compatible PLC's and RTU's. DF1 is a creation of Rockwell Automation® and is an openly published protocol.

For the preferred embodiment, the Ethernet port is 10BaseT compatible; and the port features electronic and protocol compatibility with the MODBUS®/TCP and MODBUS®/UDP industrial protocols which were created by Schneider Electric® and the EtherNet/IP™ protocol which was created by Rockwell Automation®. Alternative embodiments may utilize other Ethernet variations such as 100BaseT, Gigabit Ethernet, or a fiber optic interface. Also, for the preferred embodiment the Ethernet port also transmits meter totalization and flow via the HTTP protocol and serves a web page that displays meter data on a client computer's web browser window.

The preferred embodiment may further be utilized as an RTU (remote terminal unit) endpoint. That is, the apparatus in its preferred form also features two (2) analog inputs (current or voltage), a digital input, and a digital output. In applications where additional inputs and outputs are needed or in applications where local programmable control logic is required, the apparatus may be attached as a slave I/O module to a PLC/RTU that features additional inputs and outputs and/or ladder-logic capability.

To provide visual indication of status, the preferred embodiment features a 2×16 character backlit LCD display. The display, pursuant to a user's selection, rotates through screens displaying meter totalization and flow, auxiliary I/O status, power supply voltage, firmware version, and other operational information.

BRIEF DESCRIPTION OF THE DRAWINGS

Numerous other objects, features and advantages of the invention should now become apparent upon a reading of the following detailed description taken in conjunction with the accompanying drawings, in which:

FIG. 23 shows a brief comparison between the MODBUS®/RTU and MODBUS®/ASCII protocols.

FIG. 24 shows a memory map of the MODBUS® compatible registers as implemented in a preferred embodiment of the present art.

FIG. 25 shows an example of a MODBUS®/RTU interrogation and response as observed in a preferred embodiment of the present art.

FIG. 26 shows a memory map of the ADAM-4000 compatible registers as implemented in a preferred embodiment of the present art.

FIG. 27 shows an example of an ADAM-4000 interrogation and response as observed in a preferred embodiment of the present art.

FIG. 27A shows a memory map of the DF1 compatible registers as implemented in a preferred embodiment of the present art.

FIG. 27B shows an example of a DF1 interrogation and response as observed in a preferred embodiment of the present art.

FIG. 27C shows an example of a EtherNet/IP™ interrogation and response sequence which utilizes the DF1 compatible registers as observed in a preferred embodiment of the present art.

FIGS. 28-34, 34A, & 34B show preferred embodiment screen images of the nine "Setup Mode" screens as viewed with terminal emulation software. The screens display settings and other relevant troubleshooting data as implemented in a preferred embodiment of the present art.

FIGS. 35A and 35B show tables of the general settings available choices, and defaults that are available in a preferred embodiment of the present art.

FIGS. 35C through 35I show tables of the specific settings available choices and defaults that are available in a preferred embodiment of the present art.

FIG. 38 shows an HTML (Hyper-Text Markup Language) listing as transmitted by the web server of a preferred embodiment of the present art. The data values are added on-the-fly after an HTTP request is received.

DETAILED DESCRIPTION

Figure 1:
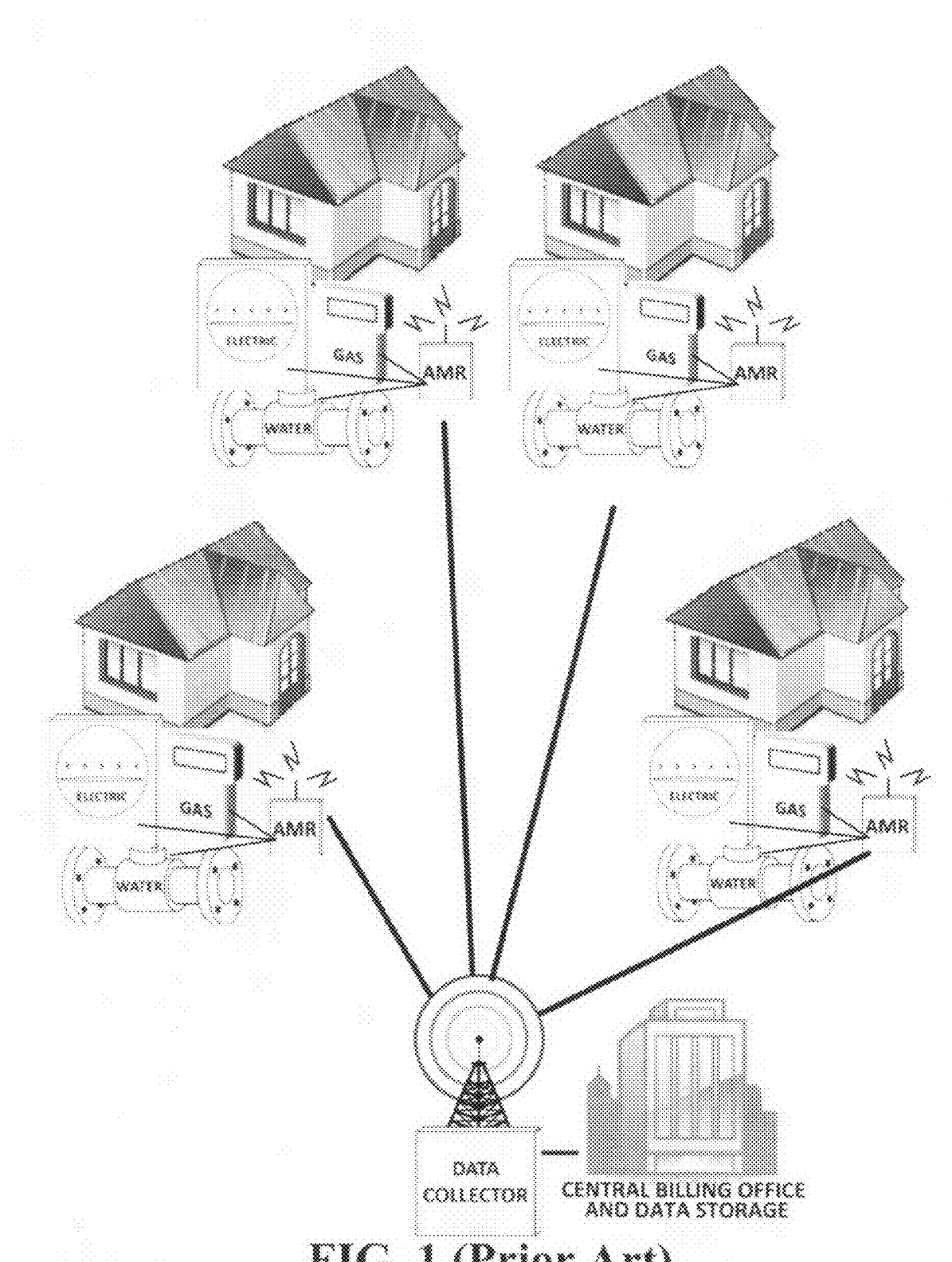
FIG. 1 shows a block form embodiment of a prior art Automatic Meter Reading (AMR) data collection system as used for billing purposes. For this prior art, encoded registers are utilized in conjunction with proprietary data collection equipment in order to insert meter data into a billing database.
Figure 2:
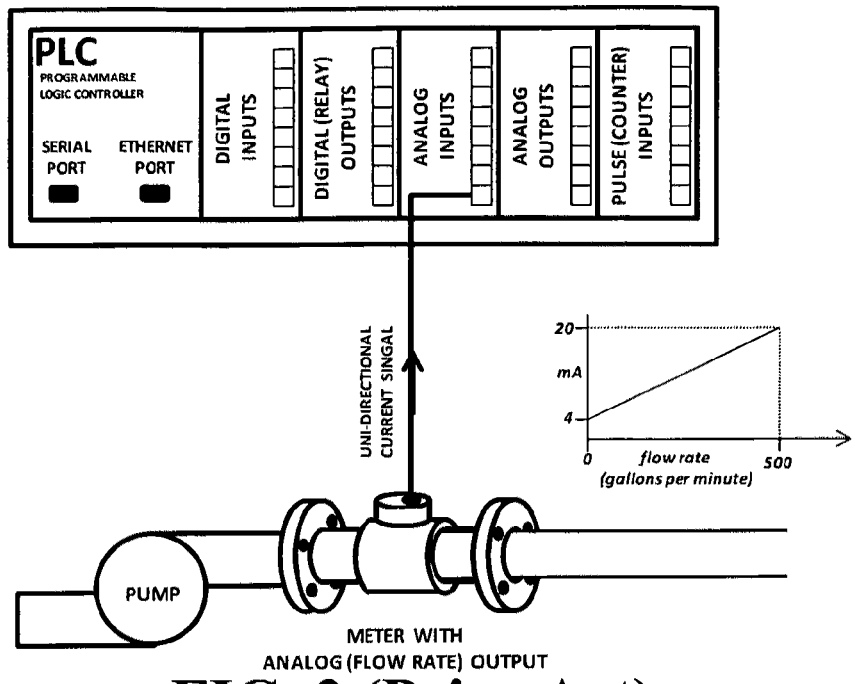
FIG. 2 shows an embodiment of a prior art SCADA system in which a milliamp-output meter register is interconnected with a PLC.
Figure 3:
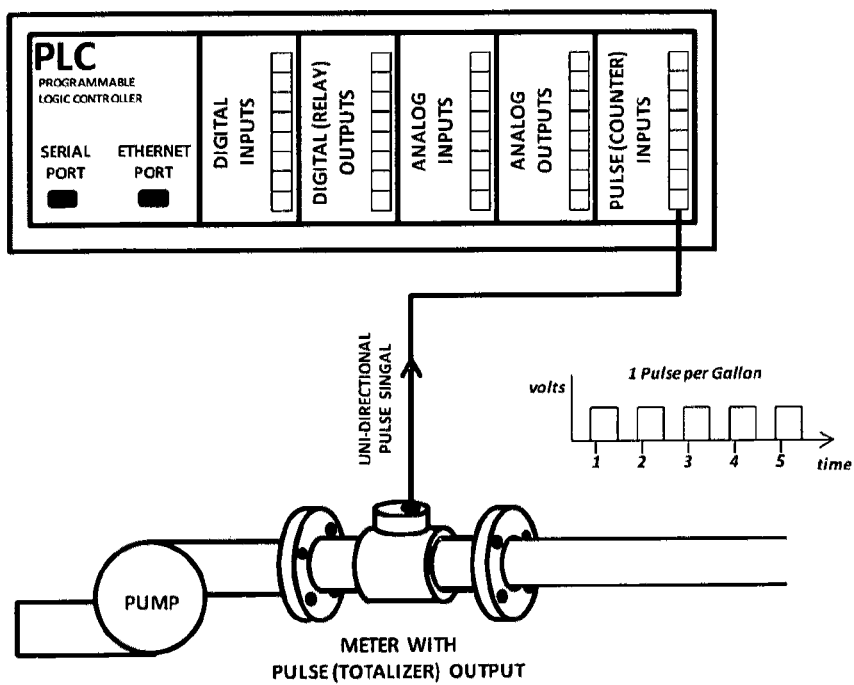
FIG. 3 shows an embodiment of a prior art SCADA system in which a pulse-output meter register is interconnected with a PLC.
Figure 4:
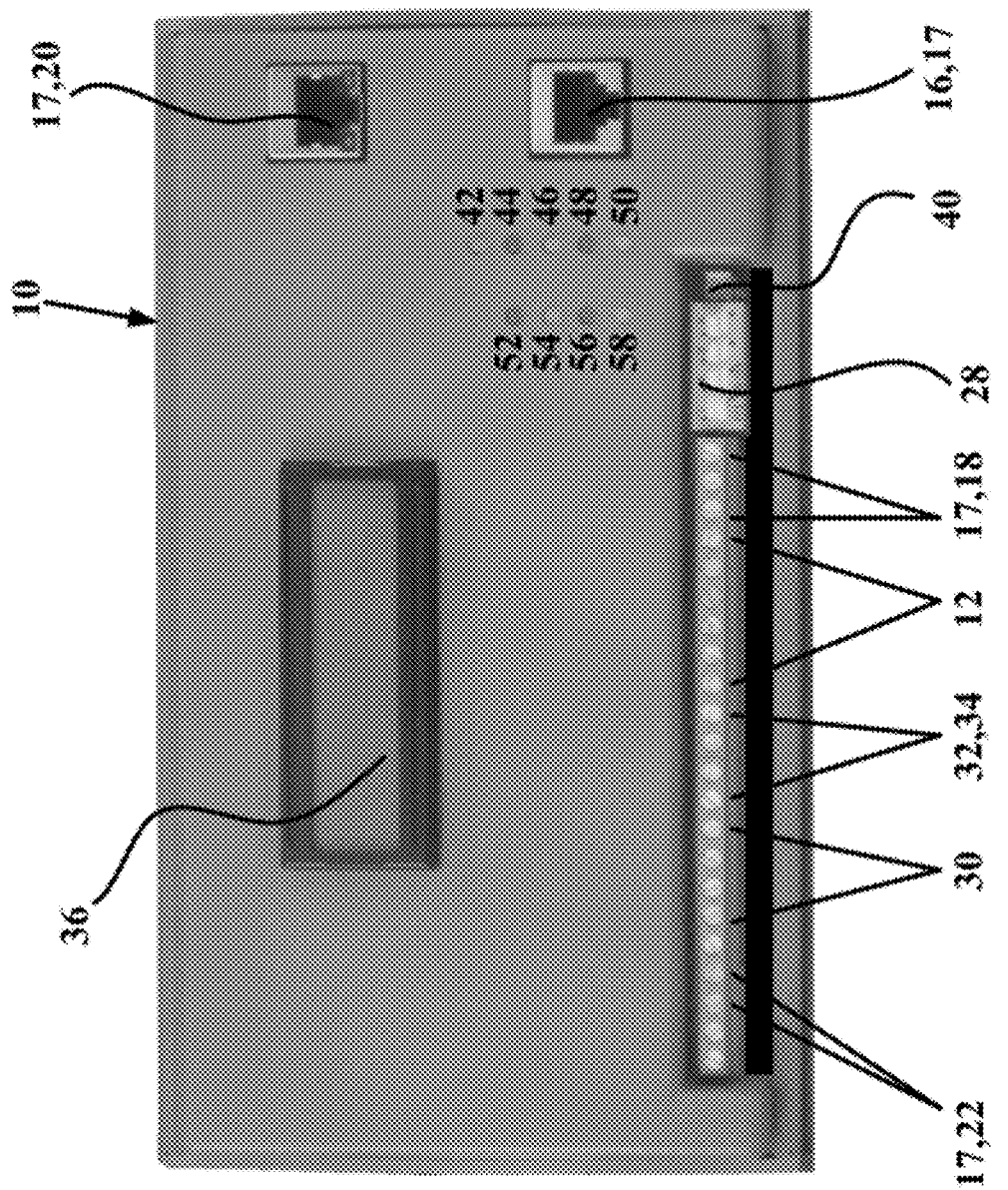
FIG. 4 shows an external photographic view of a preferred embodiment of the present art apparatus as the only practicable medium for illustrating the claimed invention as a whole pursuant to 37 CFR 1.84.

Referring now to the drawings, there is shown in FIGS. 1-3 block representations of the prior art and in FIG. 4 a preferred embodiment of the supervisory control and data acquisition protocol converter 10 and in FIGS. 5-42 associated elements of the preferred embodiment of the supervisory control and data acquisition protocol converter 10. The apparatus 10 in conjunction with an encoded register 15 meter 14 allows an industrial monitoring and control system 88 such as a SCADA (Supervisory Control And Data Acquisition) system to seamlessly interface with the aforesaid encoded registers 15. The present art apparatus 10 has firmware or a program which formats data and information received from the encoded register 15 meter 14 into a format and/or register location which is generally accepted by the SCADA system. The format and/or register location includes but is not limited to totalization information, flow information, and fault information.

The preferred embodiment has two (2) encoded register ports 12 for interfacing meters 14, although more or fewer can be provided in alternative embodiments. The choice of two (2) encoded register ports 12 for the preferred embodiment allows simultaneous measurement of influent and effluent values. That is, many pumping stations are equipped with storage tanks having two (2) installed meters 14, an influent meter 14 and an effluent meter 14. Also, many large compound master meters 14, such as those manufactured by Badger and Neptune®, each contain two (2) registers, one for high-flow and one for low-flow.

The preferred embodiment of the present art also contains industrial monitoring and control system ports 17 comprising: one (1) RS-232C serial port 16 interfaced via an EIA-561 modular jack, one (1) RS-485 serial port 18 interfaced via a Phoenix Contact terminal block receptacle, one (1) Ethernet port 20, and one (1) CAN (Controller Area Network) port 22. Individually or collectively, the aforesaid ports are referred to as the industrial monitoring and control system ports 17 and are interfaced with the microprocessor 24 either directly or via controller or logic electronic chips. The encoded register ports 12 feature electronic signal and protocol compatibility with the Sensus® 3-wire protocol (which is utilized by Sensus® and other meter manufacturers) and the Neptune® 3-wire protocol (which is utilized by Neptune®) and the 3-wire protocol. The meter 14 type (Sensus, Neptune, or others) is sensed automatically by an interrogation algorithm programmed into or in memory separate from the microprocessor/micro-controller 24 of the present art.

The RS-232C and RS-485 serial ports 16, 18 utilize a single universal synchronous/asynchronous receiver transmitter (USART) 26, and therefore the user of the present art apparatus may select either RS-232C or RS-485 via a DIP switch 28. For the preferred embodiment, said selection utilizes DIP switch 28 two as seen in FIG. 4. When using the RS-485 port 18, a 120 ohm network impedance matching termination resistor can be activated with another dip switch 28. Again, for the preferred embodiment, said selection utilizes DIP switch 28 three as seen in FIG. 4. The serial ports 16, 18 feature electronic and protocol compatibility with the MODBUS®-RTU and MODBUS®-ASCII industrial standard protocols, which were created by Modicon (now a division of Schneider Electric®), and with the DF1 industrial standard protocol. The serial ports 16, 18 also feature electronic and protocol compatibility with the ADAM-4000 industrial protocol which was created by Advantech Co., Ltd. A Raw ASCII protocol is also provided through the serial ports 16, 18 in which the apparatus mimics a bar-code reader for additional industrial compatibility.

Figure 5:
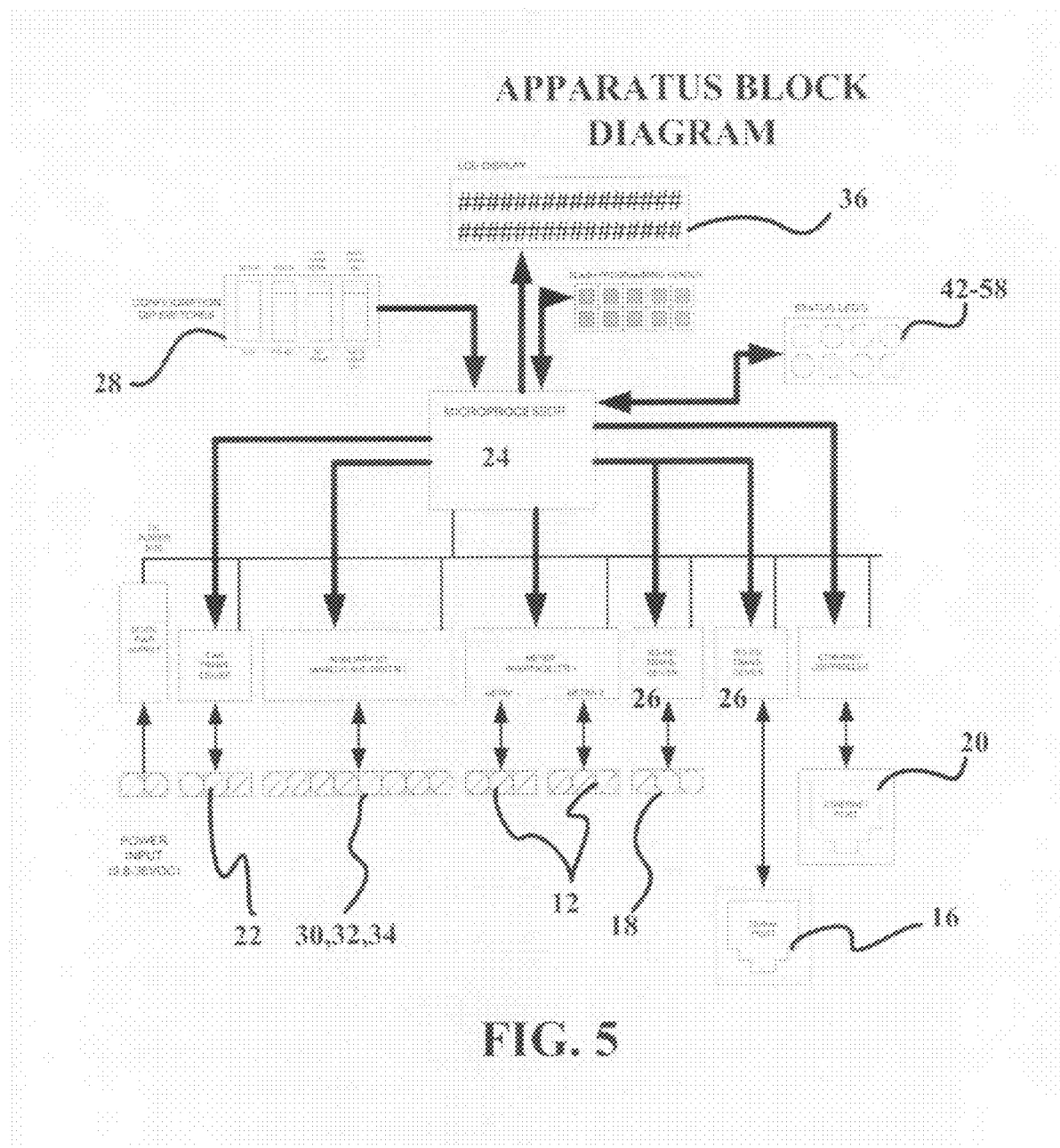
FIG. 5 shows a block diagram of the major components of a preferred embodiment.
Figure 6:
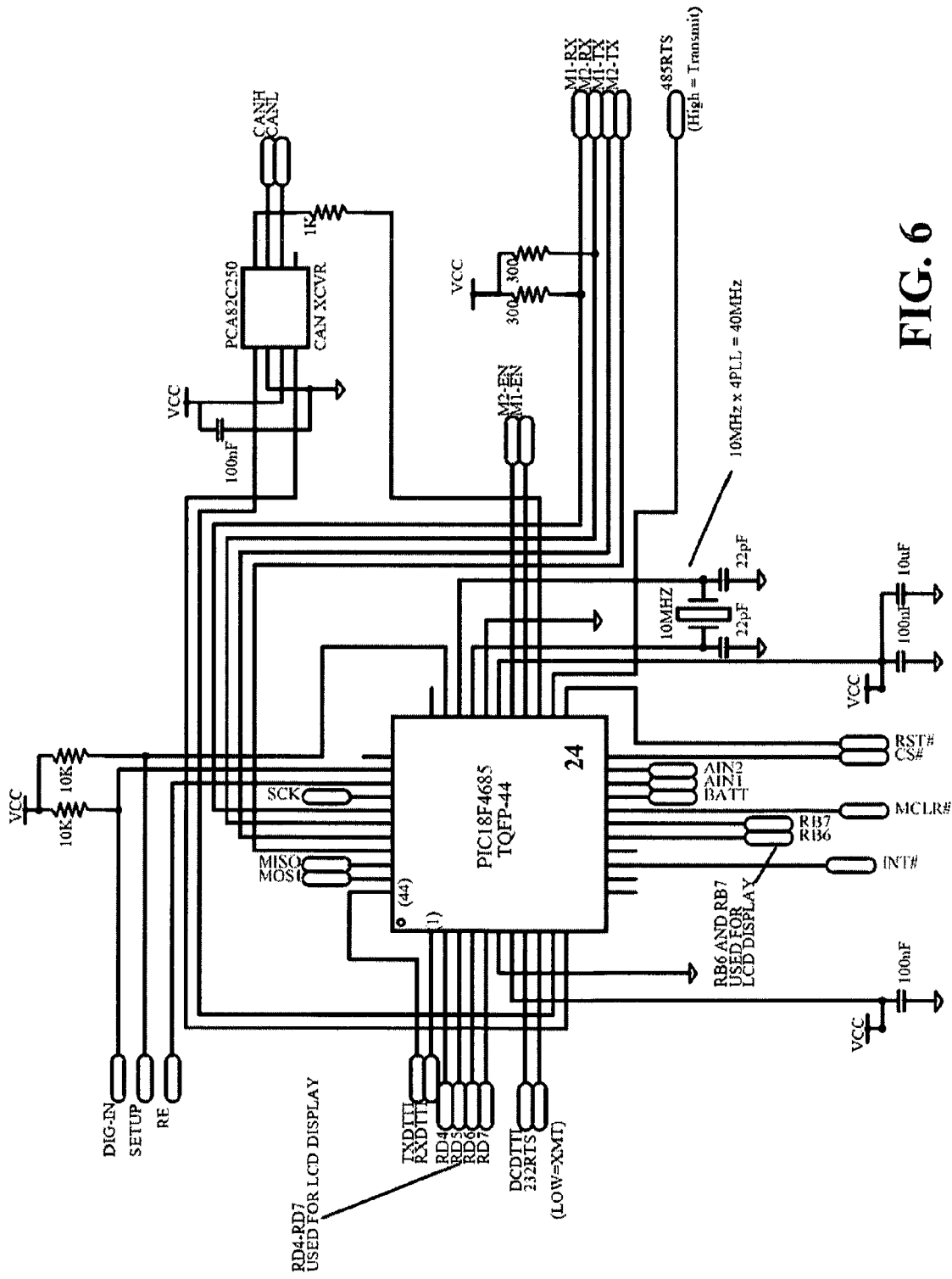
FIGS. 6 through 12 show the circuit schematic of a preferred embodiment of the present art.
Figure 7:
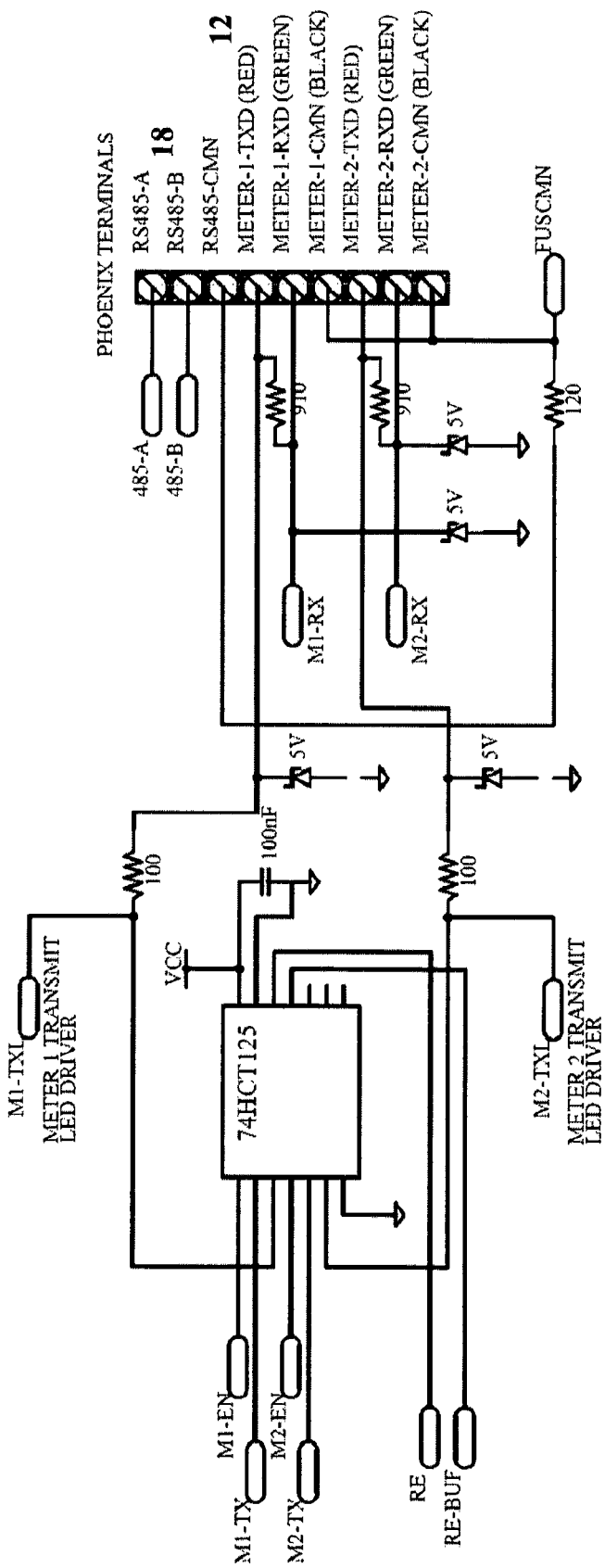
Figure 8:
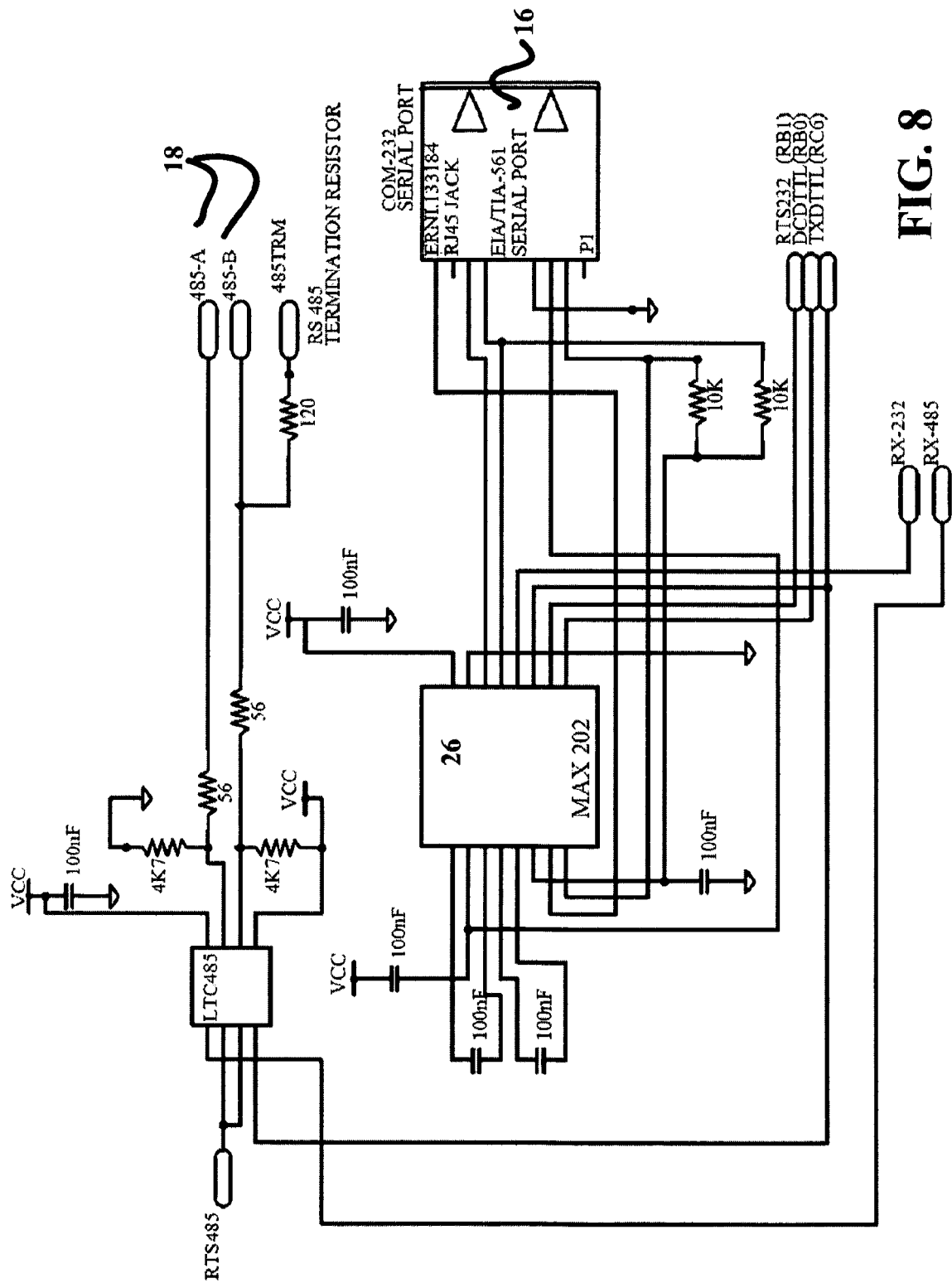
Figure 9:
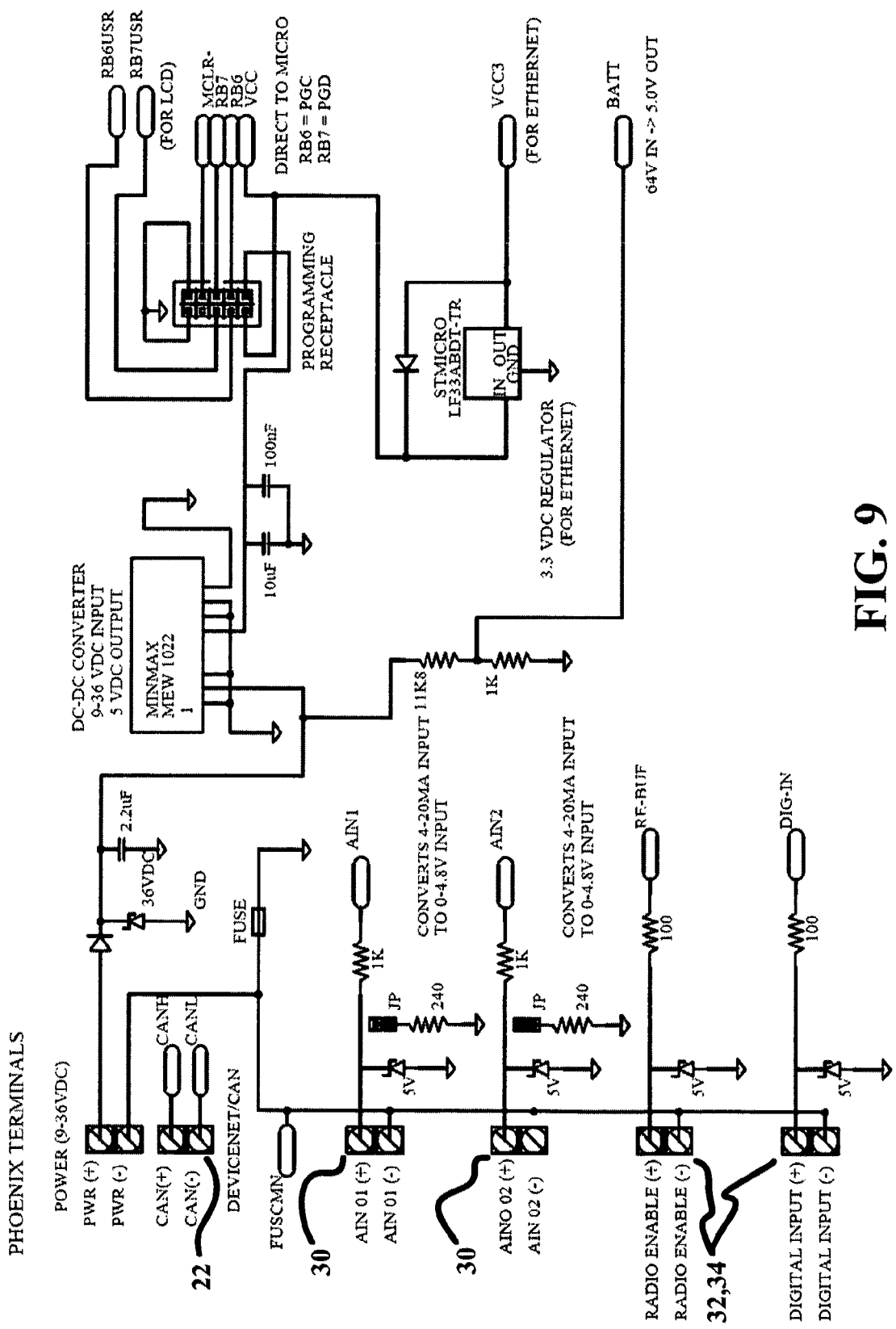
Figure 10:
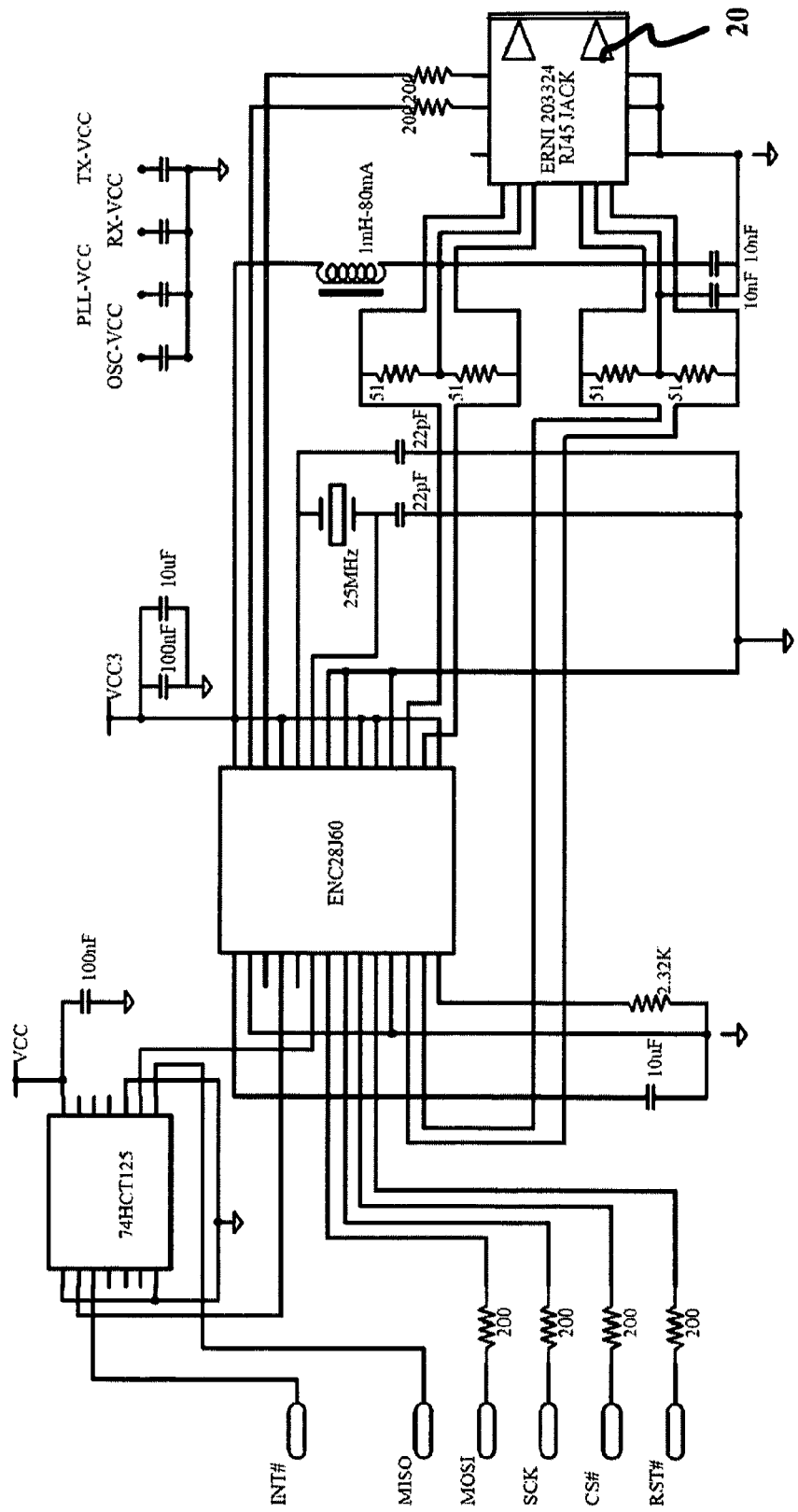
Figure 11:
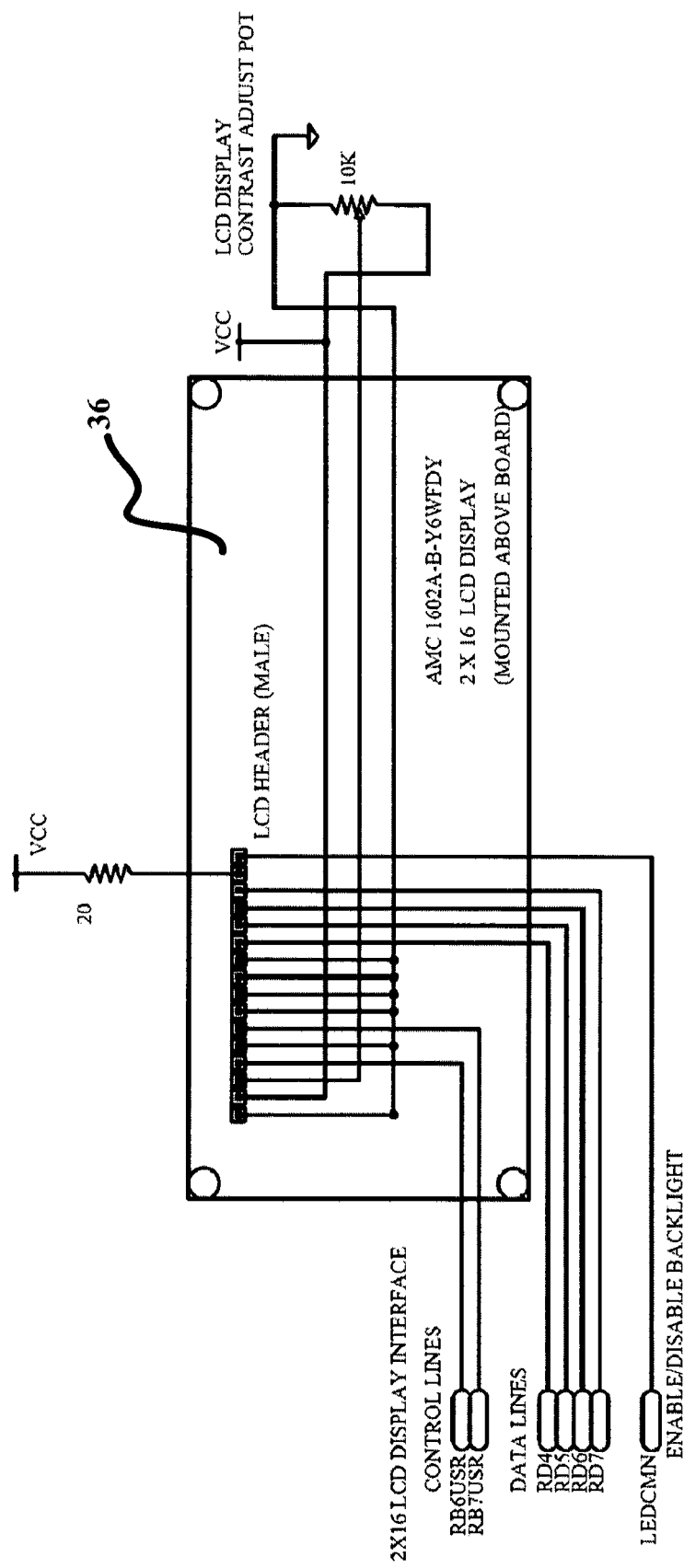
Figure 12:
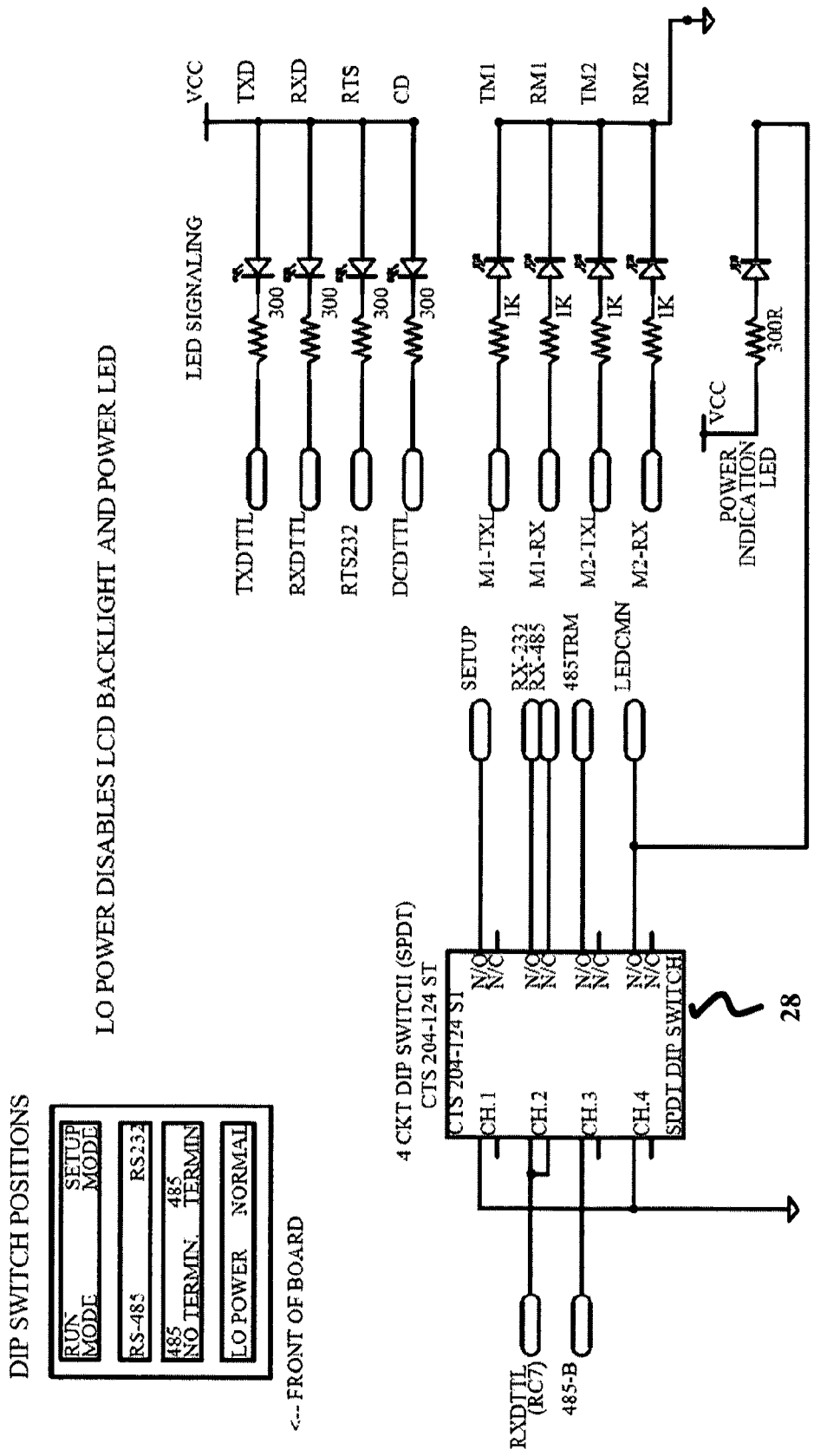
Figure 13:
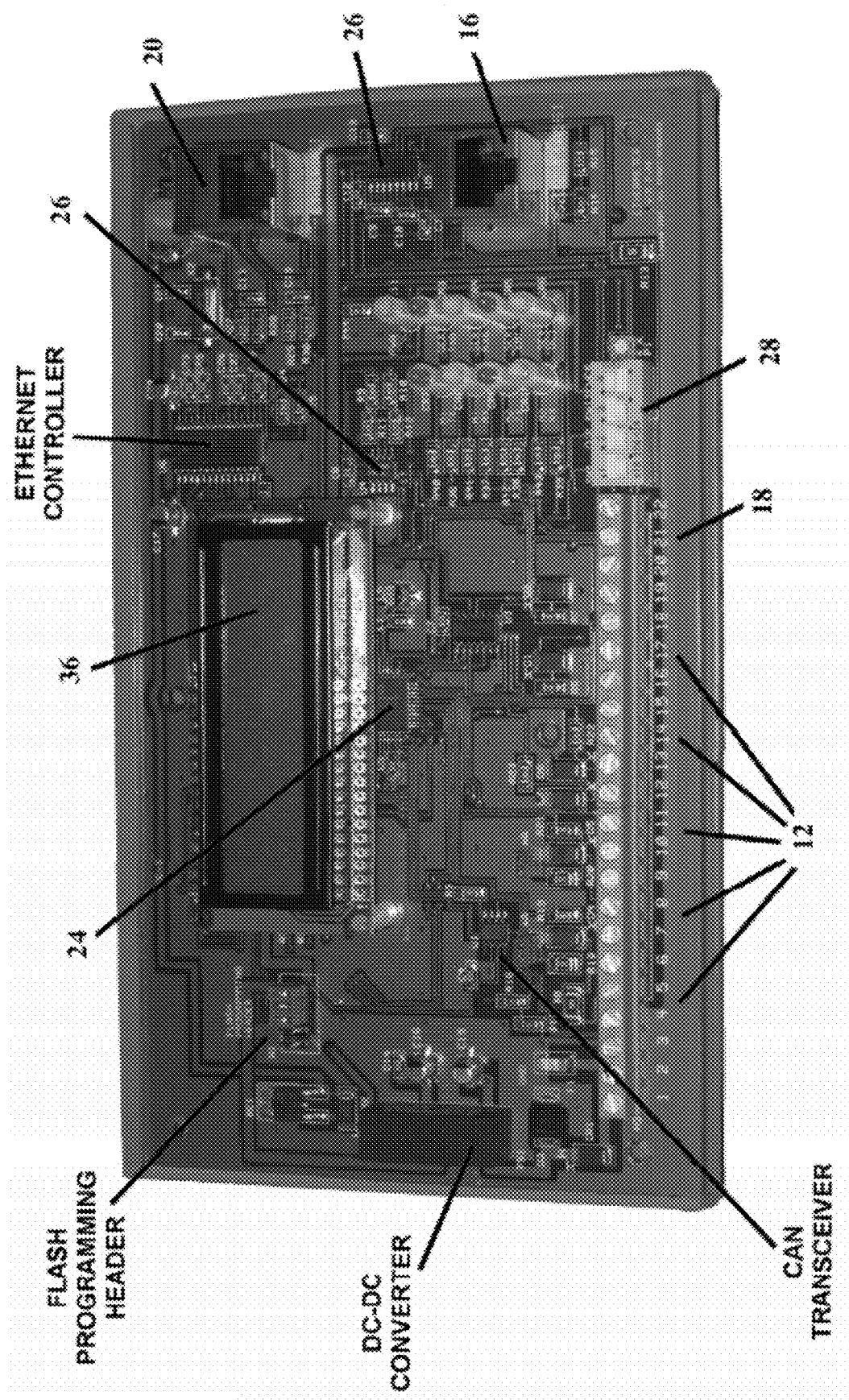
FIG. 13 shows an annotated photographic view of a fully-assembled preferred embodiment of the present art, less the top plastic cover. A photograph is used as the only practicable medium for illustrating the claimed invention as a whole pursuant to 37 CFR 1.84.

In the preferred embodiment, when onboard DIP switch 28 one as seen in FIGS. 4 & 5 is switched to "setup", the industrial protocols on the serial ports 16, 18 are temporarily disabled, and the apparatus 10 is placed in "Setup Mode". In "Setup Mode", the serial ports 16, 18 provide a terminal interface for a technician to set up programmable parameters for the apparatus (e.g. baud rate, protocol, address, scale factors, etc.) A standard terminal emulation program, such as HyperTerminal (by Hilgraeve Corp.) can be used by the technician for this purpose.

In the preferred embodiment, regardless of the position of DIP switch 28 one, "Setup Mode" is always available via Telnet to the apparatus' IP address at TCP logical port 21. A standard Telnet program, such as HyperTerminal (by Hilgraeve Corp) or Microsoft Telnet can be used by the technician for this purpose.

For the preferred embodiment, the Ethernet port 20 is 10BaseT compatible; and the port features electronic and protocol compatibility with the MODBUS®/TCP and MODBUS®/UDP industrial protocols, which were created by Schneider Electric® of Palatine, Ill., and with the EtherNet/IP™ industrial protocol, which was created by Rockwell Automation®. Alternative embodiments may utilize other Ethernet variations such as 100BaseT, Gigabit Ethernet, or a fiber optic interface. Also, for the preferred embodiment the Ethernet port 20 also transmits meter 14 totalization and flow information via the HTTP protocol, serving a web page that displays meter 14 data on a client computer's web browser window. Multiple protocols are simultaneously active on the Ethernet port 20, as each protocol can be identified by a logical TCP or UDP port specific to each protocol. For example, MODBUS®/TCP requests are typically received on TCP logical port 502, and EtherNet/IP™ requests are typically received on TCP logical port 44818, whereas HTTP web page requests are typically received on TCP logical port 80. For the preferred embodiment, the Ethernet port for each apparatus is programmed to identify itself to attached networks with a unique Media Access Control (MAC) address created by a bitwise OR of a unique 24-bit integer with the least significant 24 bits of a 48-bit IEEE® assigned organizationally unique identifier (OUI) 0x00-0x1D-0xC8-0x00-0x00-0x00.

The preferred embodiment may further be utilized as an RTU (remote terminal unit) endpoint. That is, the apparatus in its preferred form also features two (2) analog inputs 30 (current or voltage), a digital input 32, and a digital output 34. In applications where additional inputs and outputs are needed, or in applications where local programmable control logic is required, the apparatus 10 may be attached as a slave I/O module to a PLC/RTU that features additional inputs and outputs and/or ladder-logic capability.

To provide visual indication of status, the preferred embodiment features a 2×16 character backlit LCD display 36 which displays microprocessor 24 formatted data in a user intelligible form. (Alternative embodiments may utilize a plurality of display types and sizes including but not limited to vacuum fluorescent, plasma, cathode ray tube, light emitting diode, or organic light emitting diode.) For the preferred embodiment, the display 36 rotates through screens displaying meter totalization and flow, auxiliary I/O status, power supply voltage, firmware version, and other operational information pursuant to the user's setup. Also in the preferred embodiment, the contrast of the LCD display 36 is adjustable through a PCB-mounted potentiometer 40, and the LCD backlight can be disabled with a dip switch 28 in order to minimize power consumption. The preferred embodiment provides additional status visualization via nine (9) LED's having the configuration:

| | |
|---|---|
| Power Status— | Green 42 |
| Transmit Data— | Red 44 |
| Receive Data— | Yellow 46 |
| RTS (Request To Send)— | Red 48 |
| DCD (Data Carrier Detect)— | Yellow 50 |
| Meter 1 Transmit Data— | Red 52 |
| Meter I Receive Data— | Yellow 54 |
| Meter 2 Transmit Data— | Red 56 |
| Meter 2 Receive Data— | Yellow 58 |

A block diagram of a preferred embodiment of the major components of the apparatus 10 is shown in FIG. 5. The preferred embodiment of the apparatus as shown in said block diagram utilizes a circuit containing both active and passive electronic components, along with interface ports 12, 16-22, 30, 32, 34 and wiring terminals. A physical implementation of the aforesaid utilizes a two sided printed circuit board having a mixture of surface-mount and through-hole components, all of which are lead free in order to ensure environmental conservation and regulatory compliance. As shown in FIG. 4, the preferred embodiment is physically housed within a polyamide-66 base and polycarbonate-PVC cover that guards the components and electrical traces of the apparatus 10 from dust and accidental contact.

Figure 14:
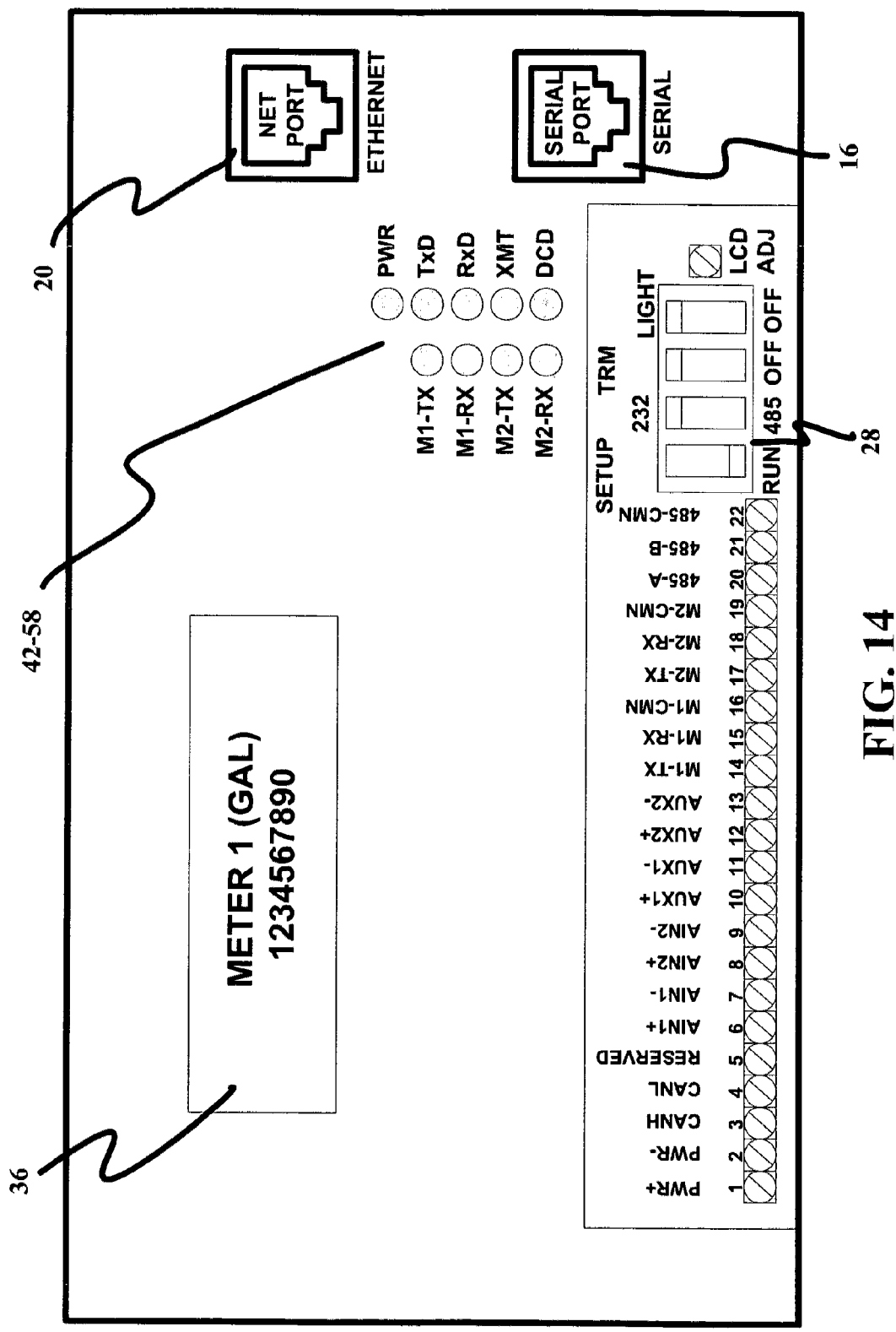
FIG. 14 shows a connection and wiring diagram of a preferred embodiment of the present art.
Figure 14A:
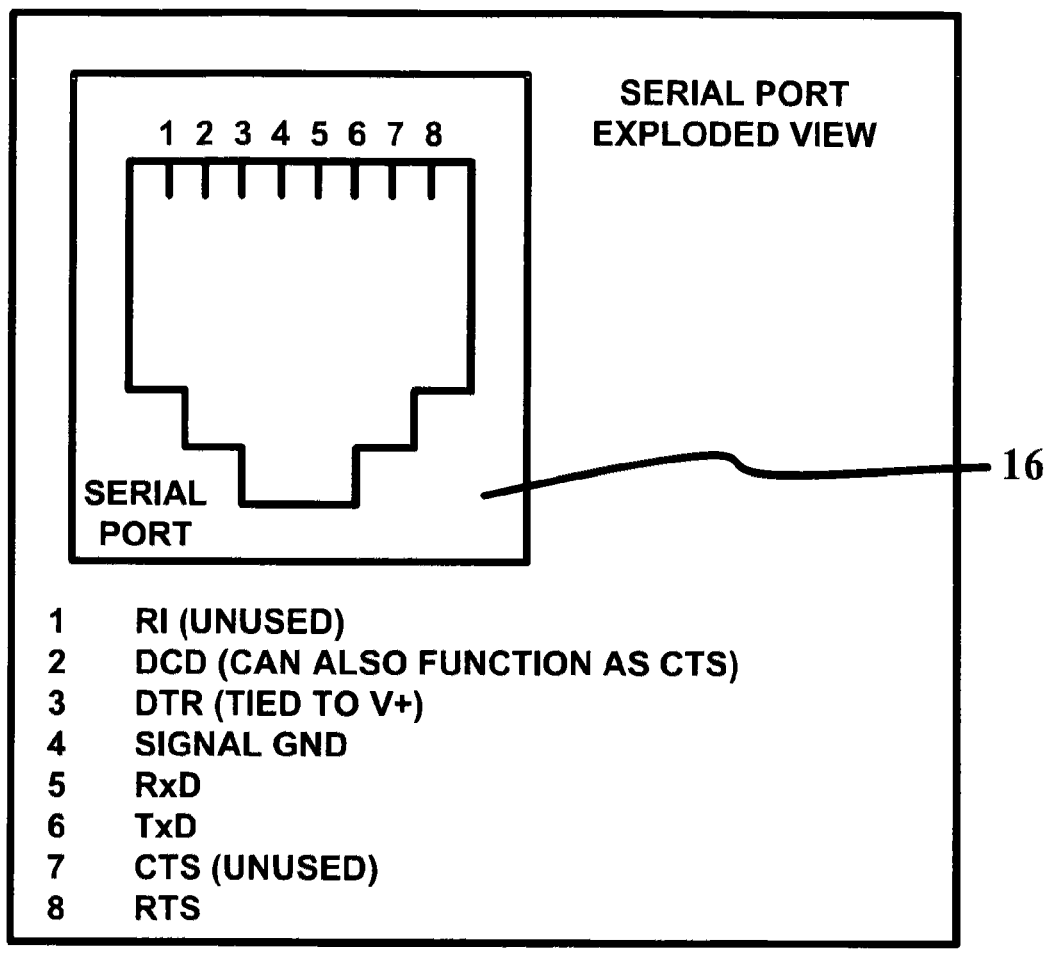
FIG. 14A shows a connection diagram of a preferred embodiment of the RS-232 serial port of the present art.
Figure 15:
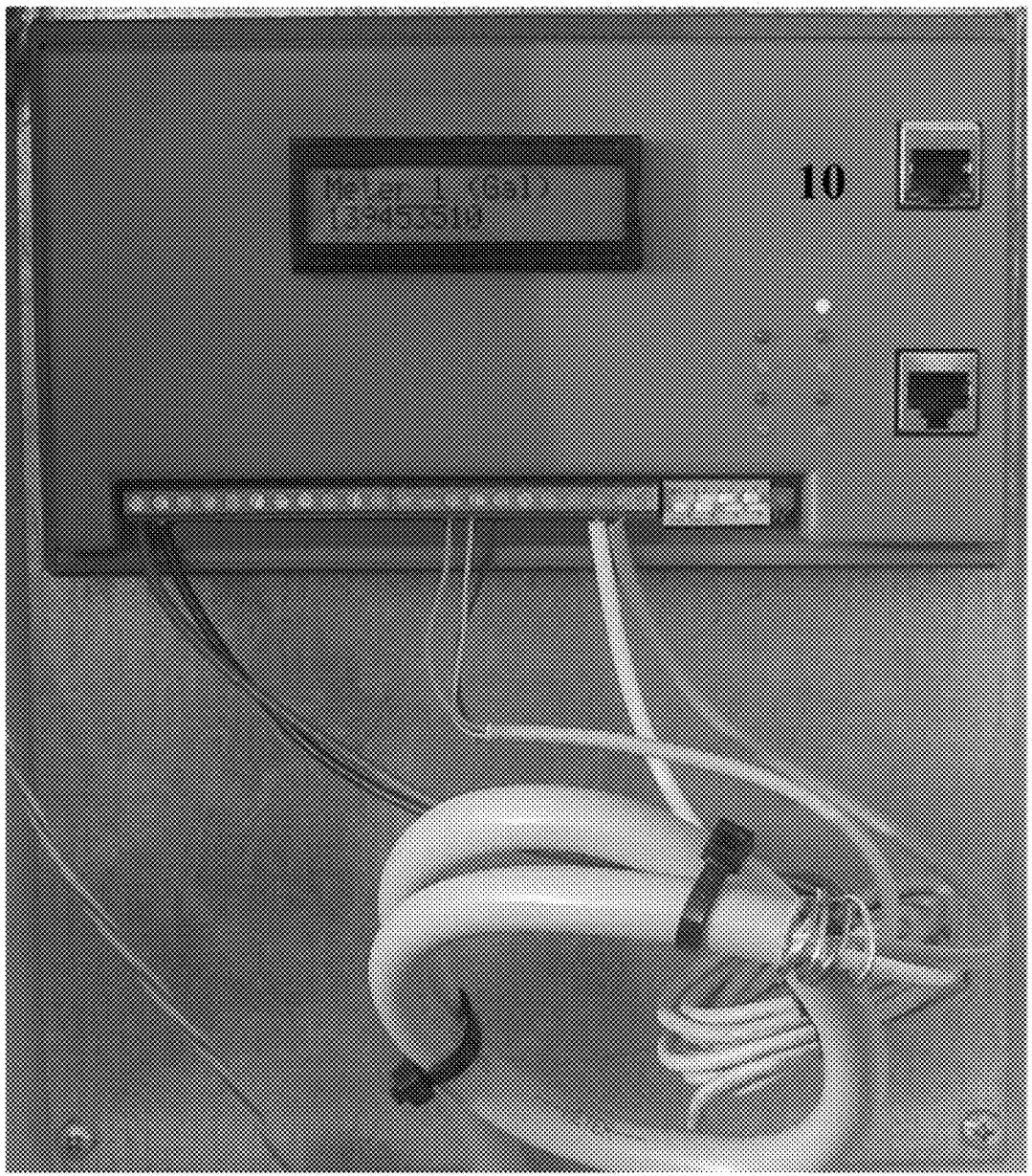
FIG. 15 shows a photograph of a preferred embodiment of the present art, as installed in an actual field application. In this photo, the apparatus is providing protocol translation between a MODBUS®-compatible RTU (installed remotely and not shown) and one (1) Sensus encoded meter register (installed in a below-ground vault and not shown). The industrial communication protocol to the RTU is MODBUS®/RTU via RS-485 serial port. A photograph is used as the only practicable medium for illustrating the claimed invention as a whole pursuant to 37 CFR 1.84.

FIGS. 6-12 show a schematic of the preferred embodiment of the circuit for the apparatus 10. An annotated photograph of the preferred embodiment printed circuit board, as the best mode of showing the component placement, is provided as FIG. 13. FIG. 14 shows the terminal connection and wiring diagram of the preferred embodiment. FIG. 15 shows a photograph of the powered and operating apparatus 10 mounted within a field enclosure, again as the best mode of showing the component placement.

The logical operation of the preferred embodiment utilizes and is coordinated with embedded firmware or a program programmed into an on-board PIC18F4685 microprocessor/micro-controller 24 manufactured by Arizona Microchip Corporation. Alternative embodiments may utilize program and data storage memory outside of the microprocessor 24, including but not limited to RAM, ROM, EPROM, EEPROM, FLASH MEMORY, and mechanical drives. The logical operation is implemented in a combination of the "C" and assembly programming languages utilizing cross-compilers with the necessary and associated function libraries, including a transmission control protocol and internet protocol (TCP/IP) stack. Alternative embodiments may utilize programmable or non-programmable array logic in lieu of said microprocessor/micro-controller 24. The term "microprocessor" shall individually or collectively refer to a microprocessor, a micro-controller, a programmable logic array, or a non-programmable logic array, either in a stand alone configuration or in combination.

Figure 16:
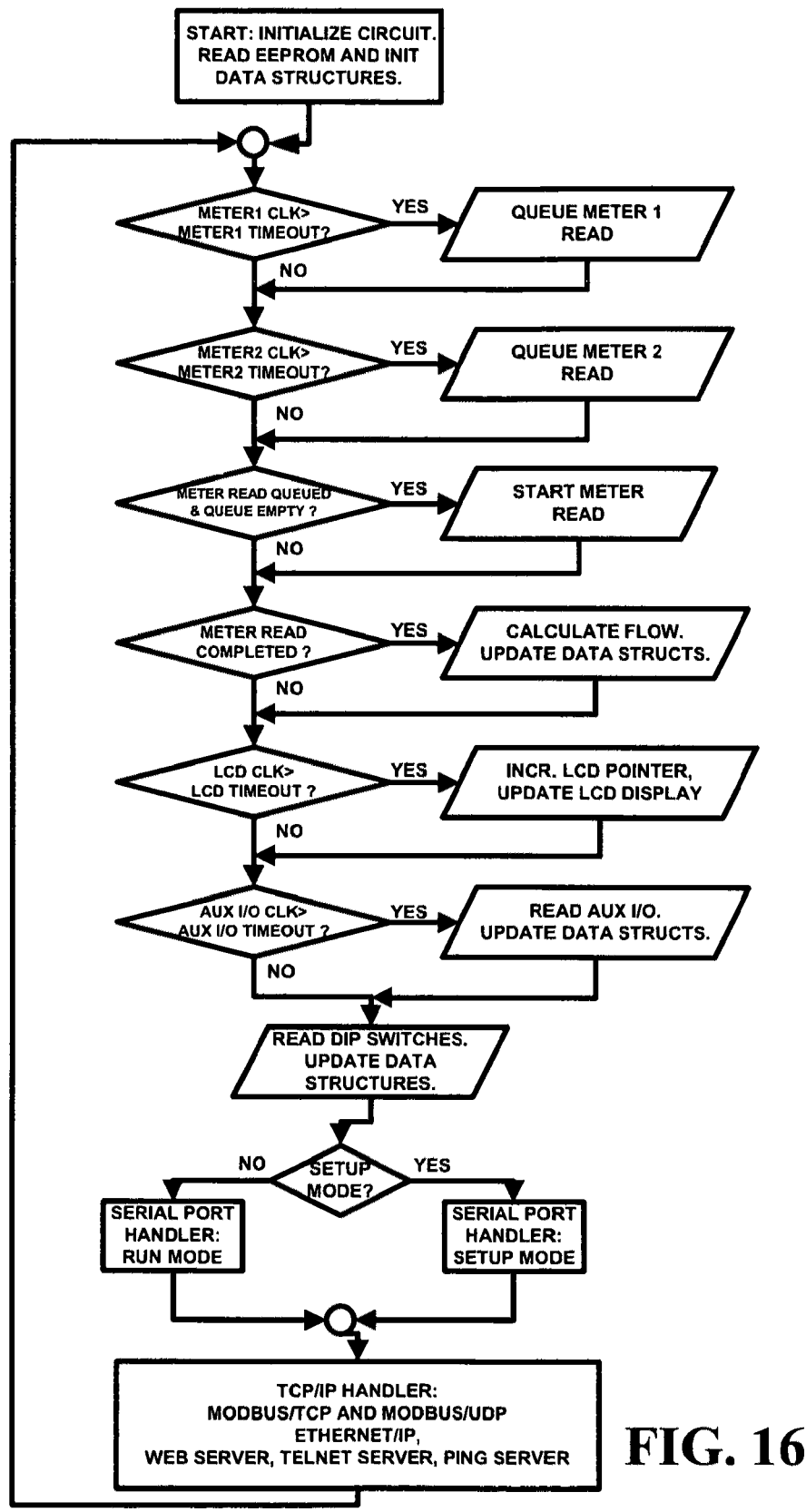
FIG. 16 shows a top-level flow chart that describes the microprocessor firmware as implemented in a preferred embodiment of the present art.

The microprocessor/micro-controller 24, via said firmware, interrogates the encoded AMR meter 14 registers 15, reads and writes the auxiliary I/O 30, 34, 36, communicates with industrial controllers 88 through the serial 16, 18 and/or Ethernet ports 20, drives the LCD display 36, drives the status LEDs 42-58, and performs the troubleshooting communications with technicians through the serial 16, 18 and Ethernet ports 20. The operation and control of the apparatus 10 is largely implemented as a state machine with multi-tasking achieved through the implementation of non-blocking interrupt-driven communications and high speed timer-controlled context-switching. FIG. 16 shows a top-level flow chart which describes a preferred embodiment of the microprocessor 24 firmware operation.

Figure 17A:
FIG. 17A shows an annotated photograph of an ICE™ by Sensus® encoded meter register. A photograph is used as the only practicable medium for illustrating the claimed invention as a whole pursuant to 37 CFR 1.84.
Figure 17B:
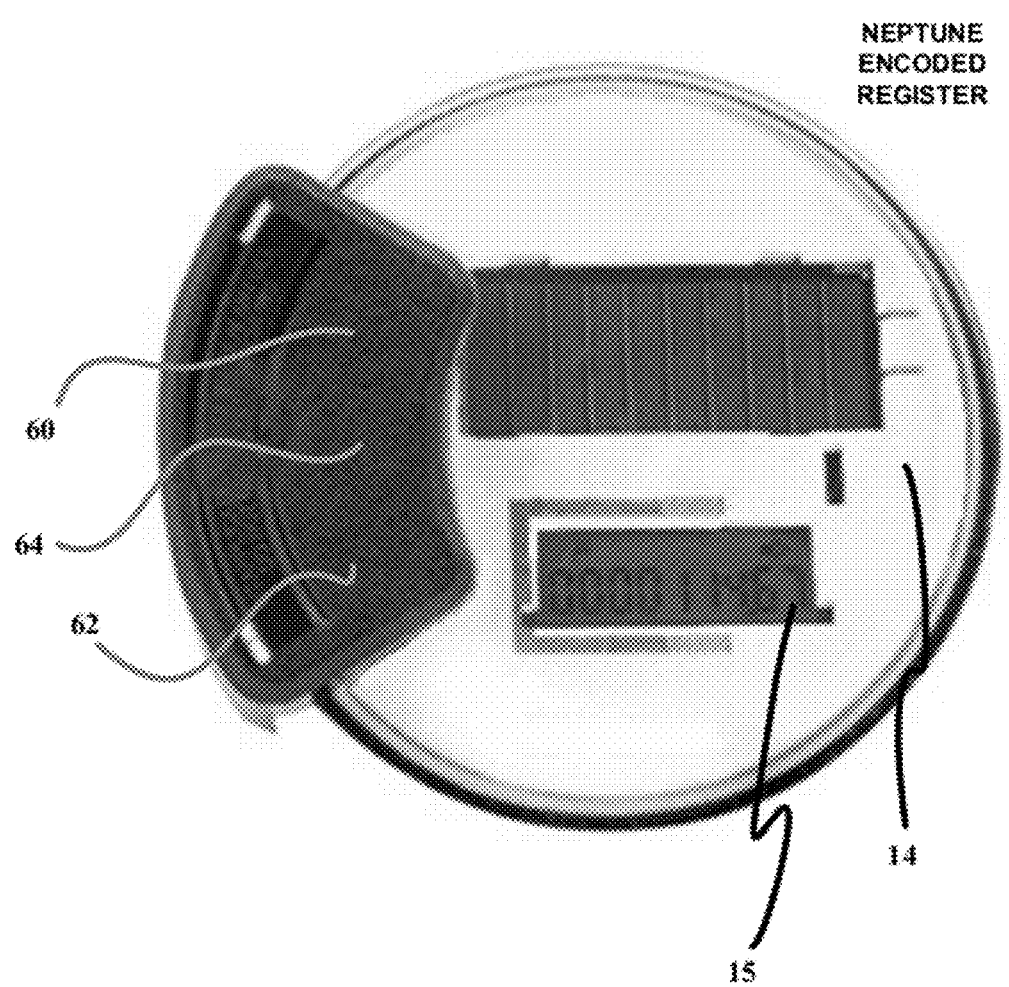
FIG. 17B shows an annotated photograph of an E-Coder by Neptune® encoded meter register. A photograph is used as the only practicable medium for illustrating the claimed invention as a whole pursuant to 37 CFR 1.84.
Figure 18:
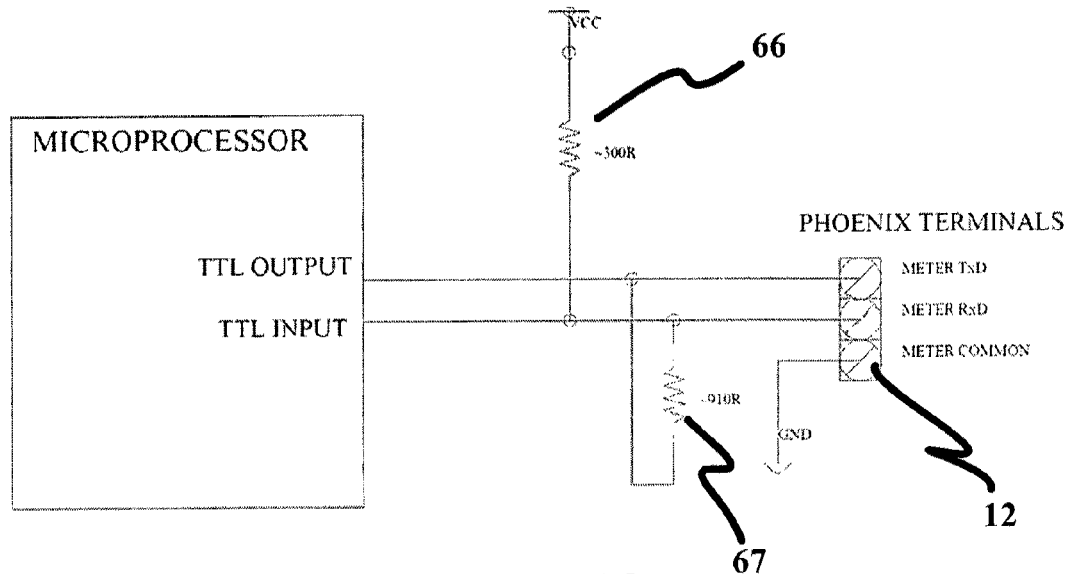
FIG. 18 shows the 3-wire encoded meter register interface schematic, as implemented in a preferred embodiment of the present art.

For the preferred embodiment, each automatic meter reading (AMR) protocol encoded meter 14 register 15 is connected to the apparatus 10 via encoded register ports 12 which include three (3) wires, namely: 1) a transmit data wire 60 (TxD, data transmitted to the meter), i.e. connected to a transmit data portion of the encoded register port 12, 2) a receive data wire 62 (RxD, data received from the meter), i.e. connected to a receive data portion of the of the encoded register port 12, and 3) a signal common wire 64, i.e. connected to a common data portion of the encoded register port 12. FIGS. 17A & 17B shows two example registers, the Sensus ICE™ and Neptune E-Coder with the wire placement locations annotated thereon. The TxD signal line 60 is a transistor-transistor-logic (TTL) output from the microprocessor 24 to the encoded register. The RxD signal 62 line is a TTL input to the microprocessor 24 from the encoded register. For the preferred embodiment, a pull up resistor 66 is attached thereto in order to pull the idle line to a reference or supply voltage, Vcc. Alternative embodiments may further place a line biasing resistor 67 between the TxD signal line 60 and the RxD signal 62 line in conjunction with the pull up resistor 66 or in lieu thereof. FIG. 18 shows a preferred embodiment of the encoded register 15 meter 14 interface circuitry. Although the encoded register 15 interface is described as three separate wires or lines, TxD 60, RxD 62, & common 64, for the preferred embodiment, alternative embodiments may transmit and receive the essential meter 14 signals in a multiplexed form on a single wire or line from the encoded register ports 12 provided the meter 14 or interface thereto is capable of sensing and handshaking over a single wire or line.

The TxD signal 60 of the AMR encoded register 15 functions as both a power source for the meter 14 register 15 and as a synchronous clock signal 68. The meter 14 data 80 as represented by the RxD signal 62 is received by the microprocessor/micro-controller 24 in synchronization to this clock 68 for the Sensus® and Neptune® type meters 14. Some meters 15 predominantly present an asynchronous RxD signal 62 in the absence of or in conjunction with an interrogation by the TxD 60 signal.

Figure 19:
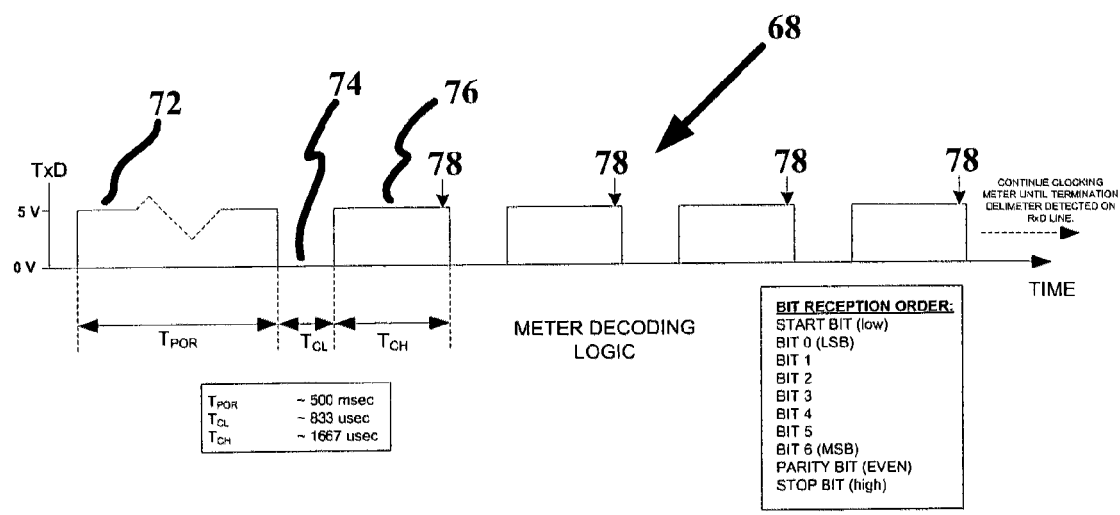
FIG. 19 shows a timing diagram descriptive of the TxD signaling and RxD sampling as implemented between an encoded meter register and a preferred embodiment of the present art. Timing values shown are for enablement purposes only, alternative embodiments may use a plurality of values which are specific to the encoded register configuration.

FIG. 19 shows an example of a TxD 60 power on, $T_{por}$ 72, and clock signal, $T_{cl}$ 74 and $T_{ch}$ 76, along with the RxD 62 synchronous read location 78 relative to the TxD clock 68 signal for the Sensus® and Neptune® type meters 14. The raw received data 80 (RxD line 62) is decoded during the read operation. Referring to FIG. 19, for both the Sensus® and Neptune® protocols, each meter 14 is first read by providing a power on pulse, $T_{por}$ 72, of approximately five volts for a longer duration than the clock pulse high value on the TxD signal 60 line. A clock pulse train, $T_{ch}$ 76, of approximately five volts is then provided on the TxD signal 60 line thereafter and the meter 14 data 80 on the RxD signal 62 line is synchronously read towards the end of the high time of each pulse on the TxD signal 60 line. The duty cycle and frequency of the clock pulse train is not critical as the encoded register 15 simply looks for a clock pulse in order to transmit. The power on pulse, $T_{por}$ 72, duration is also not critical provided it is sufficiently long that the encoded register 15 has sufficient time to receive an amount of energy that allows it to respond completely on the RxD signal 62 line.

Alternative embodiments of the present art interface via other protocols. The other protocols transmit a predominantly asynchronous RxD signal 62. Said predominantly asynchronous transmission occurs in the absence of or in conjunction with a TxD signal 60 interrogation. The RxD signal 62 is read by the receive data portion of the encoded register ports 12 of the apparatus 10 via a continuous or periodic sampling of the RxD signal 62.

If an ASCII <STX> byte is received (0x02) as a start delimiter 82, then the afore stated Neptune® protocol data is expected. Otherwise, Sensus® protocol data is assumed. Neptune® protocol data is terminated with an ASCII <ETX> byte (0x03) termination delimiter 84; and Sensus® protocol data is terminated with an ASCII <CR> byte (0x0D) termination delimiter 84. For both protocols, a preferred embodiment of the apparatus 10 extracts the totalization data 70 from the data packet, and ignores all other fields. A protocol which is recognized as an asynchronous stream may also be sampled and read. Alternative embodiments, may utilize the other data available from the raw received data 80 pursuant to the manufacturer specific protocols.

Figure 20:
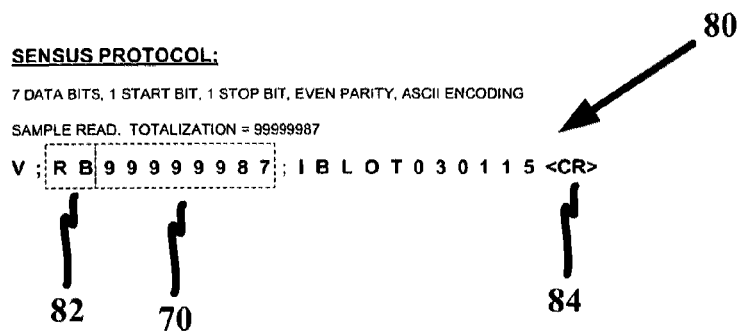
FIG. 20 shows the salient details of the Sensus 3-wire communication protocol.

The Sensus® protocol is extensively documented by Sensus Metering Systems of Raleigh, N.C. FIG. 20 shows a graphical representation of the salient portions of this protocol with start delimiters 82, totalization data 70, and termination delimiters 84 marked. When the present art apparatus 10 detects a Sensus® compatible register, the totalization 70 digits are extracted between the start delimiter (RB) 82 and the totalization 70 termination delimiter <CR> 84, an ASCII carriage return or 0x0D in hexadecimal.

Figure 21:
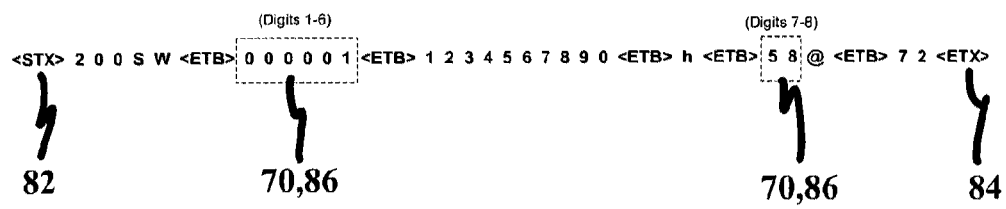
FIG. 21 shows the salient details of the Neptune 3-wire communication protocol.

Although the detailed Neptune® E-Coder register 15 protocol is not as openly available as the Sensus® protocol and therefore generally relies upon reverse engineering, the similarities with the Sensus® protocol can be seen in FIG. 21. FIG. 21 shows a data 80 stream as read from the Neptune® meter 14 when interrogated. The start of each message is delimited by the <STX> ASCII code (0x02) 82, and the end of each message is delimited by the <ETX> ASCII code (0x03) 84. Individual data fields 86 are bracketed by the <ETB> ASCII code (0x17). For the Neptune® protocol, the totalization 70 digits are split into two fields 86. The most significant six (6) digits are extracted from between the $1^{st}$ and $2^{nd}$ <ETB> delimiters with the least significant 2 digits extracted after the $4^{th}$ <ETB> delimiter.

To maximize the accuracy of the collected data, pre-programming of the meter 14 register 15 is necessary in some instances. For example, the Sensus® ICE™ register 15 is capable of transmitting from four (4) to eight (8) digits of totalization, depending upon parameters pre-programmed into the register 15. In order to provide the most accurate totalization 70 and flow rate, it is desirable that each register 15 be pre-programmed to provide as many totalization 70 digits as possible. For the Sensus® ICE™ register, eight (8) digits is the maximum and consequently the preferred setting.

The preferred embodiment of the present art stores or formats meter totalization 70, flow rate, auxiliary I/O 30-32, and other data within random access memory (RAM), preferably within RAM on board the microprocessor/micro-controller 24. The aforesaid data values are held ready for on-demand transmission to the connected industrial monitoring and control system 88. In order to maintain a recent record of the meter's totalization 70 and flow, the present art apparatus 10 interrogates the meter every n seconds, where n is a user-programmable setting. A preferred embodiment default setting for n is 30 seconds. Flow rate is automatically calculated or formatted by the microprocessor/micro-controller 24 by taking the first derivative of the fluid volume versus time, i.e. dV/dt, as a difference function, i.e. delta volume per delta time. If the totalization decreases with time due to negative flow, then the apparatus correctly calculates the flow rate as a negative quantity. The dV/dt format is preferably based upon consecutive meter totalization data 70 reads but may also be based upon the difference with respect to time of any two or more meter totalization data 70 reads.

The preferred embodiment of the present art apparatus 10 can receive industrial protocol requests on either the RS-232C 16 or the RS-485 18 serial port. The active serial port 16, 18 (RS-232C or RS-485) is DIP switch 28 selectable as seen in FIG. 5. The preferred embodiment supports the MODBUS®/RTU, MODBUS®/ASCII, EtherNet/IP™, ADAM-4000, and DF1 industrial serial protocols. When the apparatus is in "Setup Mode", the serial port 16, 18 responds to setup commands entered through an ANSI Terminal Emulation program, which can also be likened to a request/response ASCII protocol.

Figure 22:
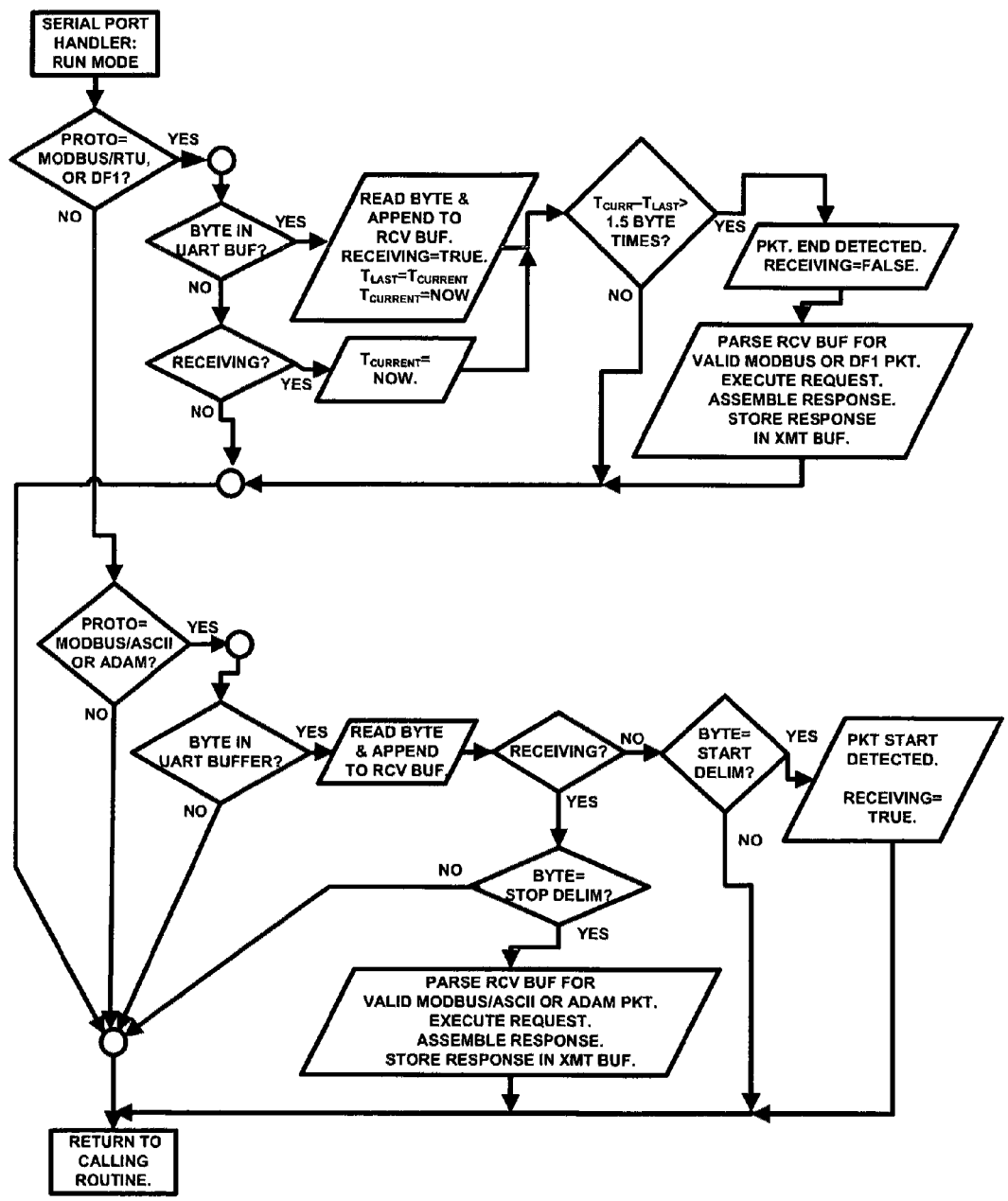
FIG. 22 shows a flow chart that describes the serial port handler logic for "Run Mode" operation of a preferred embodiment of the present art. The handled protocols are MODBUS®/RTU, MODBUS®/ASCII, DF1, and ADAM-4000.
Figure 29:
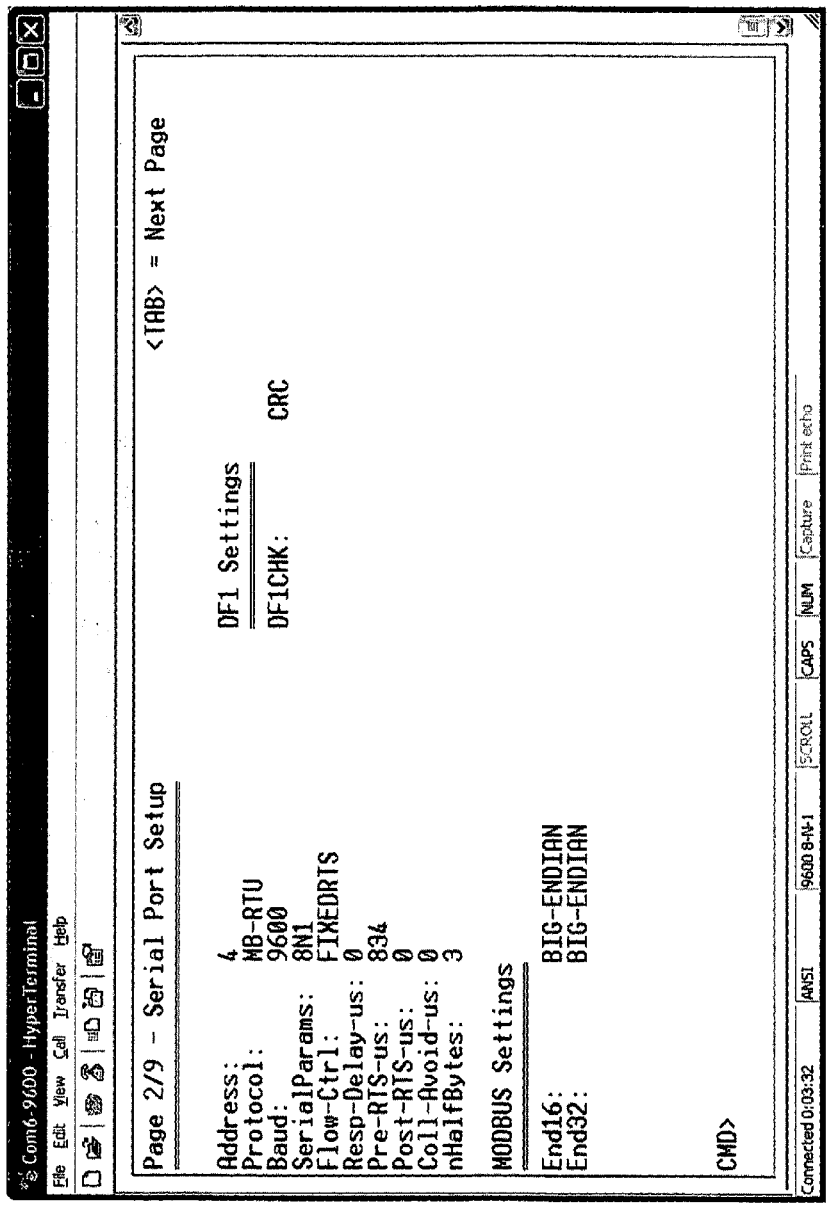
Figure 30:
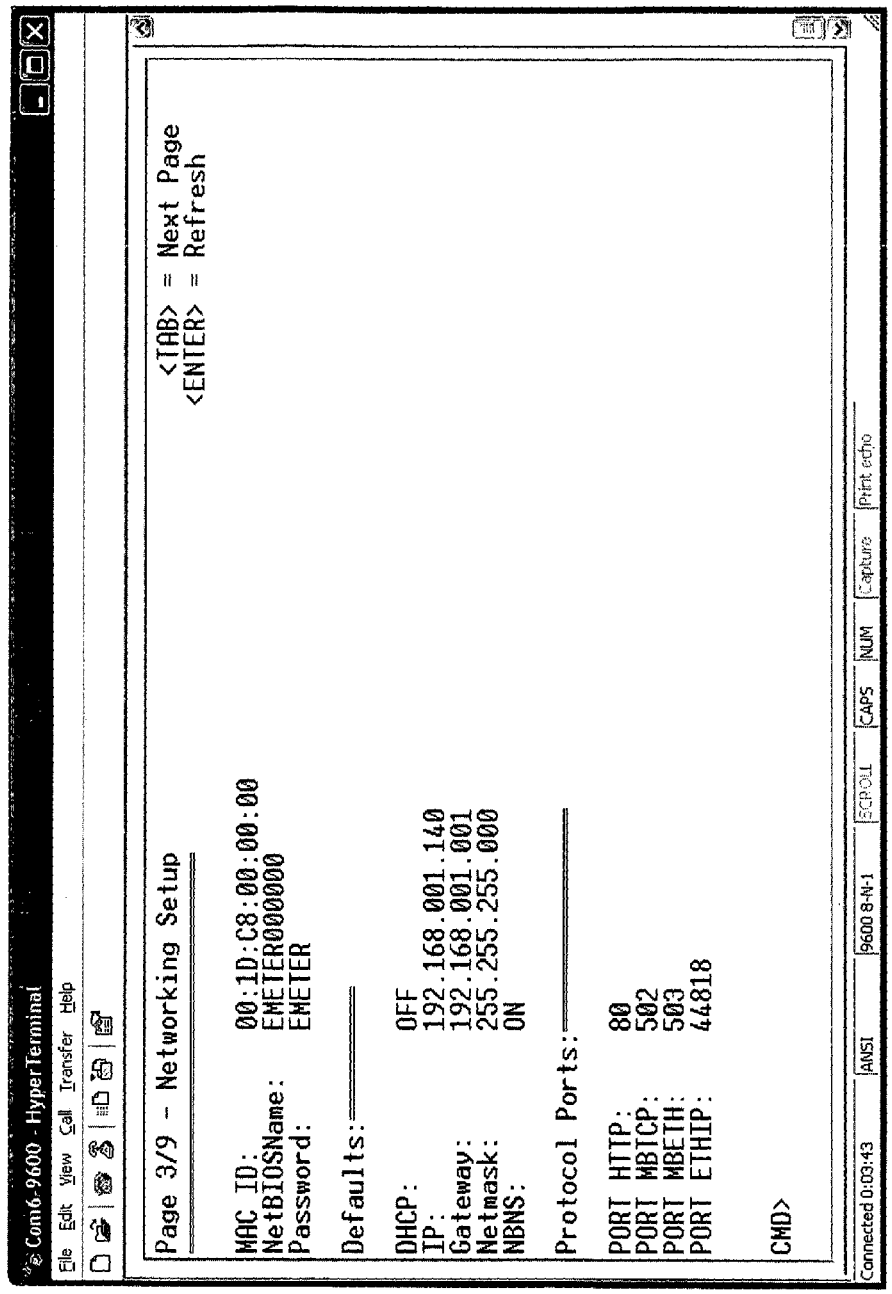
Figure 32:
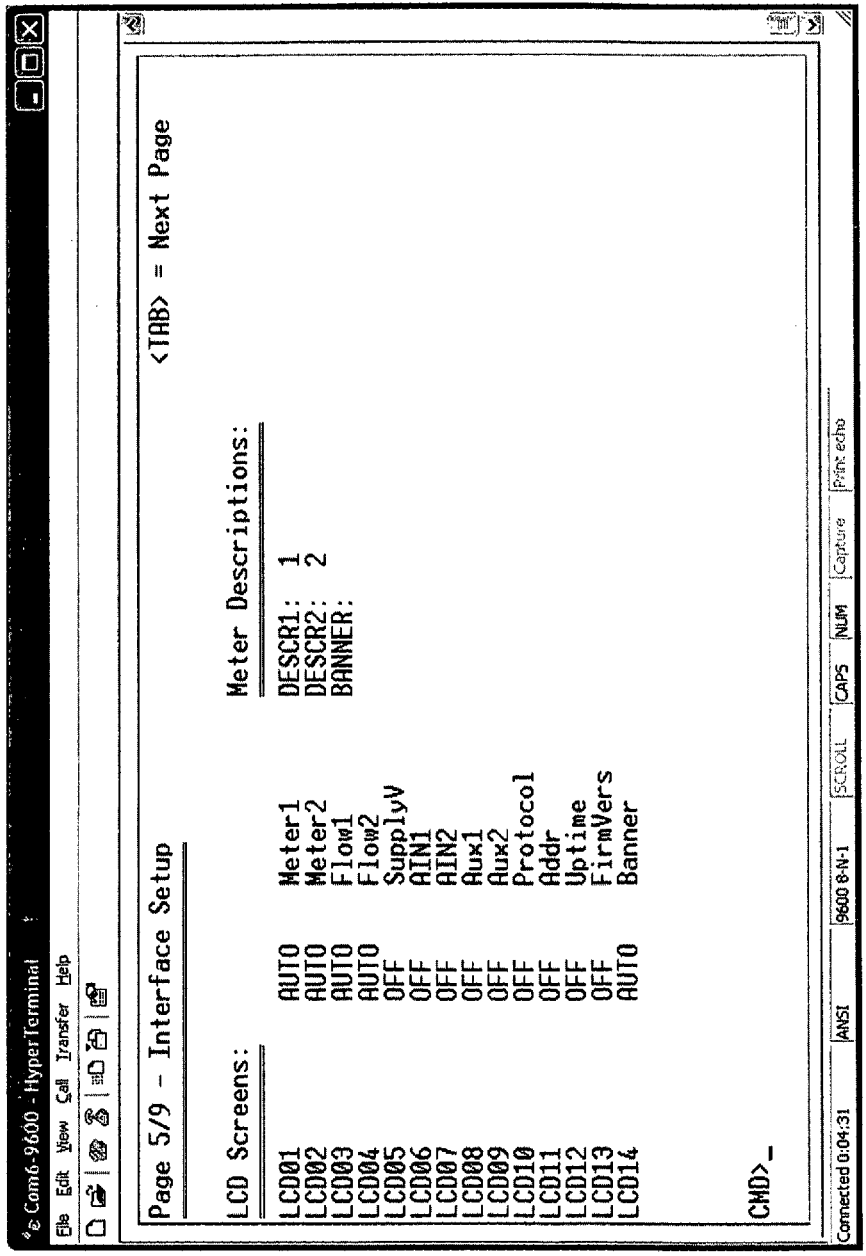
Figure 34A:
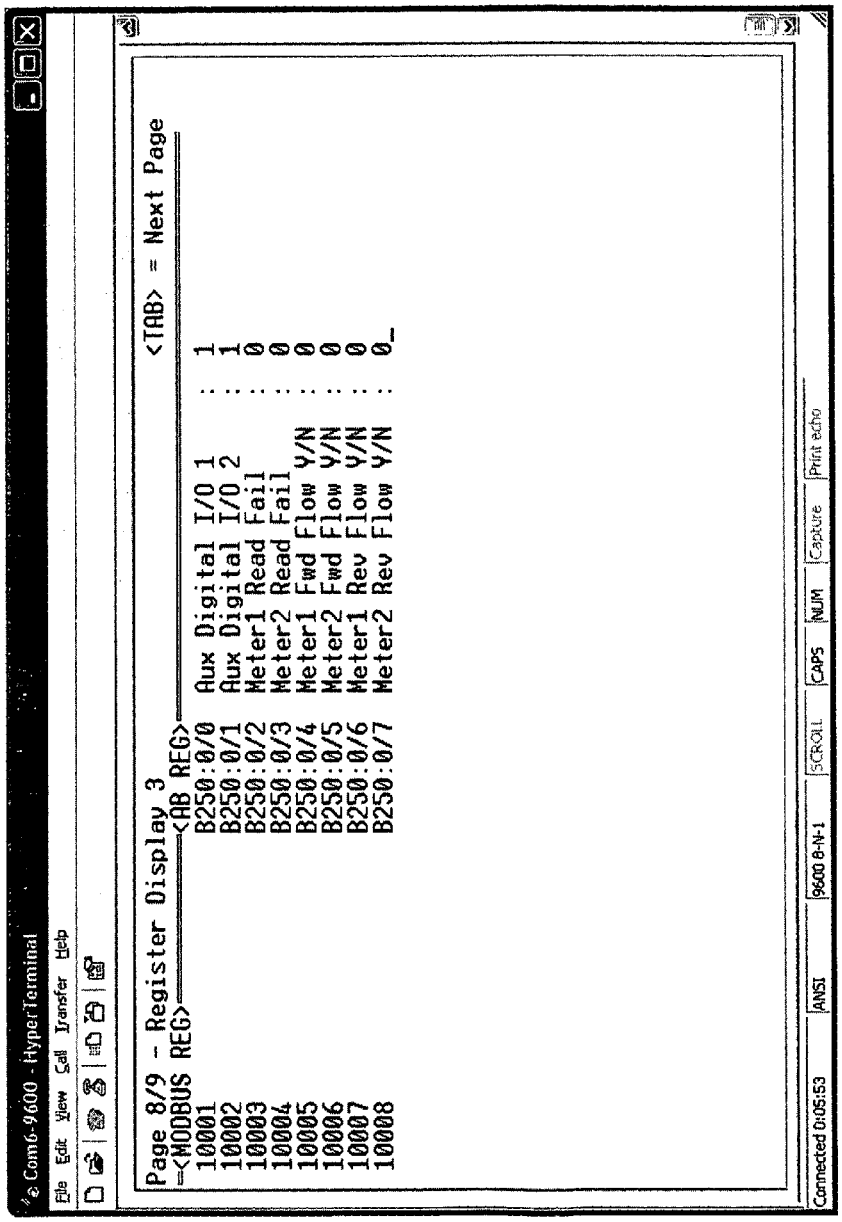

For the preferred embodiment, serial port 16, 18 reception utilizes pause-terminated data packet or delimiter bracketed data packet methods. Pause-terminated data packets are detected by the recognition of a short pause both before and after the packet. MODBUS®/RTU and DF1 are based upon pause-terminated data packets. FIG. 22 shows a flow chart of the preferred serial port 16, 18 stack handler for processing the MODBUS®/RTU's pause-terminated data packets. Delimiter bracketed data packets are detected by the recognition of data after a "start delimiter" byte (or byte sequence) and before a "stop delimiter" byte (or byte sequence). The MODBUS®/ASCII data packets feature a ':' ASCII character, i.e. 0x3A hex, as the "start delimiter" and a carriage return, line feed sequence, <CR><LF>, ASCII character, i.e. ASCII hex values of 0x0D and 0x0A respectively, as the "stop delimiter". The ADAM-4000 protocol features a <CR> ASCII character "stop delimiter" with the "start delimiter" being one of a set of several ASCII characters, including but not limited to the '#', '$', '>', and '?' characters.

When the preferred embodiment of the present art apparatus 10 is in "Setup Mode", the ASCII character <CR> is the "stop delimiter", and the "start delimiter" is any valid ASCII character data. Alternative embodiments may utilize a plurality of start and stop delimiters which include ASCII characters or other binary words outside of the ASCII map. FIG. 22 represents a preferred embodiment of the flow chart that describes the apparatus' serial port 16, 18 handler for the "Run-Mode". "Run Mode" refers to the operational mode when industrial protocols are active on the serial ports 16, 18. Using the method that matches the selected protocol, the apparatus 10 continually seeks out complete serial data packets. After each complete packet is received, the active protocol handler parses the packet, processes the request contained within, and assembles a response.

The MODBUS® protocol is thoroughly described in a Modicon document, titled "Modicon Modbus Protocol Reference Guide, PI-MBUS-300 Rev. J.". This document is available at the Schneider Electric® "Modicon" website, http://www.modicon.com/techpubs/TechPubNew/PI_M-BUS_300.pdf, and is hereby incorporated by reference. The MODBUS® protocol defines a message structure that controllers will recognize and use, regardless of the type of networks over which they communicate. It describes the process a controller uses to request access to another device, how it will respond to requests from the other devices, and how errors will be detected and reported. It establishes a common format for the layout and contents of message fields. The MODBUS® protocol provides the internal standard that the MODBUS®-compatible controllers use for parsing messages. During communications on a MODBUS® network, the protocol determines how each controller will know its device address, recognize a message addressed to it, determine the kind of action to be taken, and extract any data or other information contained in the message. If a reply is required, the controller will construct the reply message and send it using MODBUS® protocol. Some TCP/IP networks embed messages containing the MODBUS® protocol into the frame or packet structure that is used on the network.

The MODBUS® protocol can be transmitted in either RTU-mode or ASCII-mode. FIG. 23 presents a comparison of significant differences between the modes. RTU-mode efficiently encodes each 8-bit byte within a single 8-bit data frame, whereas ASCII-mode encodes each 8-bit byte as two 7-bit hexadecimal digits in ASCII-format. This causes ASCII-mode transmissions to be roughly twice as large as the RTU-mode equivalents. However, the 7-bit encoding and relaxed timings featured in MODBUS®/ASCII provide advantages for use in certain types of telephone and radio modems. To maximize flexibility, both MODBUS®/RTU and MODBUS®/ASCII are supported within the firmware of the preferred embodiment of the present art apparatus 10.

The MODBUS® protocol provides for many features that are not always required for an input/output interface apparatus. The preferred embodiment of the present art utilizes and recognizes the following subset of the MODBUS® protocol:

| Function Code | Function |
| --- | --- |
| 01 | Read Coil Status |
| 02 | Read Input Status |
| 03 | Read Holding Registers |
| 05 | Force Single Coil |
| 06 | Preset Single Register |
| 15 | Force Multiple Coils |

The most utilized MODBUS® function code for the apparatus is 03, "Read Holding Registers", as the apparatus 10 stores the main totalization 70 and flow rate information within the "Holding Registers", i.e. non-volatile memory within the microprocessor/micro-controller 24. A memory map of MODBUS®-compatible registers 15 for the preferred embodiment is shown in FIG. 24. Alternative embodiments of the present art may utilize any or all of the MODBUS® protocol functions.

An example of a MODBUS®/RTU interrogation, i.e. request and response, of two meter totalizations 70 of the present art apparatus 10 is shown in the FIG. 25. For this example, the address of the apparatus 10 is 0x04. The totalization 70 of Meter 1 is 99999987, and the totalization 70 of Meter 2 is 00000158. The Meter 1 totalization is contained in the r and $2^{nd}$ 16-bit unsigned integer registers: 0xE0F3 (57587 decimal) and 0x05F5 (1525 decimal). The conversion to an unsigned long integer is calculated as the $2^{nd}$ unsigned integer multiplied by 65536 decimal and then added to the $1^{st}$ unsigned integer, (1525×65536+57587), to give a total of 99999987. The Meter 14 two totalization 70 is contained in the $3^{rd}$ and $4^{th}$ 16-bit unsigned integer registers: 0x009E (158 decimal) and 0x0000 (0 decimal). The conversion to an unsigned long integer is calculated as the $4^{th}$ unsigned integer multiplied by 65535 and then added to the $3^{rd}$ unsigned integer (0x65536+158), to give a total of 158. The CRC Error Check (MODBUS®/RTU) or LRC Error Check (MODBUS®/ASCII) is included with each message in order to assist the receiving device in detecting transmission errors. The calculation of the CRC/LRC is detailed in Appendix C of the MODBUS® Protocol Reference and hereby incorporated by reference.

The ADAM-4000 protocol is completely described in the Advantech document, titled "ADAM 4000, Data Acquisition Modules User's Manual. Edition 10.5". This document is available at Advantech's website, http://taiwan.advantech.com.tw/unzipfunc/Unzip/1-2CYUNZ/ADAM-4000%20manual%20Ed%2010.5.pdf, and is hereby incorporated by reference. The ADAM-4000 protocol defines a message structure for communicating between master controllers and slave I/O modules. The protocol is ASCII-based, and bears a slight resemblance to MODBUS®/ASCII protocol. The protocol establishes a common format for interrogating analog and discrete inputs, and for setting analog and discrete outputs.

The entire ADAM-4000 protocol set offers a large number of commands, although each ADAM-4000 module usually implements only a subset of the commands, generally only those which are relevant to that particular module. The preferred embodiment of the present art utilizes a functional subset of the ADAM-4000 protocol defined as the following function codes:

| Function Code | Function |
| --- | --- |
| #AAn | Read Analog Input |
| $AA6 | Read Discrete Inputs |
| #AA100d | Write Discrete Output |
| $AAM | Read Device ID |

The most utilized ADAM-4000 function code for the apparatus 10 is #AAn, "Read Analog Input", because the apparatus stores the meter totalizations 70 and flow rates as "Analog Inputs". FIG. 26 shows a memory map of the contents and locations of the ADAM-4000-compatible registers for the apparatus 10. Alternative embodiments of the present art may utilize any or all of the ADAM-4000 protocol functions.

An example of an ADAM-4000 interrogation of the Meter 1 totalization 70 for the apparatus 10 is depicted in the FIG. 27. For this example, the address of the apparatus is 0x04; and the totalization 70 for Meter one is 99999987. The totalization 70 of Meter one (99999987) is transmitted in ASCII encoding as shown. An optional one-byte checksum may be included in every transmission (both master and slave) to assist in error detection, although for the preferred embodiment, the ADAM-4000 default setting disables the checksum feature. When the checksum feature is activated, the checksum is inserted just before the <CR> termination delimiter of FIG. 27. The checksum algorithm for the ADAM-4000 is detailed in Appendix F of the ADAM-4000 User's Manual and hereby incorporated by reference. The preferred embodiment of the present art apparatus 10 supports both checksum-enabled and checksum-disabled operation.

The DF1 protocol is thoroughly described in a Rockwell Automation document, titled "DF1 Protocol and Command Set, Publication 1770-6.5.16". This document is available at the Rockwell Automation website, http://literature.rockwellautomation.com/idc/groups/literature/documents/rm/1770-rm516_-en-p.pdf, and is hereby incorporated by reference. The DF1 protocol defines a message structure that controllers will recognize and use, regardless of the type of networks over which they communicate. It describes the process a controller uses to request access to another device, how it will respond to requests from the other devices, and how errors will be detected and reported. It establishes a common format for the layout and contents of message fields. The DF1 protocol provides the internal standard that the DF1-compatible controllers use for parsing messages. During communications on a DF1 network, the protocol determines how each controller will know its device address, recognize a message addressed to it, determine the kind of action to be taken, and extract any data or other information contained in the message. If a reply is required, the controller will construct the reply message and send it using DF1 protocol. Some TCP/IP networks embed messages containing the DF1 protocol into the frame or packet structure that is used on the network.

The DF1 protocol can be transmitted in either Full-Duplex or Radio-Modem mode. Radio-Modem mode is essentially Full-Duplex mode less the ACK and NAK packets. To maximize flexibility, both Full-Duplex and Radio-Modem modes are supported within the firmware of the preferred embodiment of the present art apparatus. The DF1 protocol provides for many features that are not always required for an input/output interface apparatus. The preferred embodiment of the present art apparatus 10 utilizes and recognizes the following subset of the DF1 protocol:

Protected Typed Logical Read With 3 Address Fields
(CMD,FNC=0x0F,0xA2)
Protected Typed Logical Write With 3 Address Fields
(CMD,FNC=0x0F,0xAA)

Within the preferred embodiment of the present art apparatus 10, the most utilized DF1 function code is the "Protected Typed Logical Read With 3 Address Fields" reading 16 bit integer file N7:00-48, as the apparatus stores the main totalization and flow rate information within the "N7" Registers. A memory map of DF1 compatible registers for the preferred embodiment is shown in FIG. 27A. Alternative embodiments of the present art may utilize any or all of the DF1 protocol functions.

An example of a DF1 interrogation, i.e. request and response, of two meter totalizations 70 of the present art apparatus 10 is shown in the FIG. 27B. The address of the apparatus 10 is 0x04. The totalization of Meter one is 2519, and the totalization of Meter two is 123476. The Meter one totalization is contained in the $1^{st}$ and $2^{nd}$ 16-bit unsigned integer registers: 0x000009D7 (2519 decimal). The Meter 2 totalization 70 is contained in the $3^{rd}$ and $4^{th}$ 16-bit unsigned integer registers: 0x0001E254 (123476 decimal). All conversions to unsigned long integers take into account the little-endian nature of the DF1 protocol. A CRC or BCC Error Check is included with each message in order to assist the receiving device detect transmission errors. The DF1 CRC algorithm is identical to that used in MODBUS®/RTU, except that the CRC is initialized to 0x0000 for DF1, whereas the CRC is initialized to 0xFFFF for MODBUS®/RTU. The preferred embodiment of the present art allows the user to select either CRC or BCC error checking, so as to provide compatibility with varied connected equipment.

The preferred embodiment of the present art also provides meter 14 data in a raw ASCII format. As many programmable logic controllers (PLC's) are equipped with extra serial ports that are capable of collecting data from raw ASCII terminal devices such as bar code readers, the preferred embodiment provides a "raw ASCII protocol" output. In raw ASCII mode, the preferred embodiment of the apparatus 10 transmits the following data from the active serial port 16, 18 every 3 seconds:

```
:<TOTAL!>;<TOTAL2>;<FLOW1>;
<FLOW2>;
<ROLLOVERS1>;<ROLLOVERS2>;
<ANALOGIN1>;<ANALOG_IN2>;
<DIGITAL IN>;<DIGITAL OUT>;
<METER FAULT1>;<METER_FAULT2>
<CR> <LF>
```

Each transmission is preceded by an ASCII equivalent character ':' delimiter, and ended with a an ASCII equivalent <CR><LF> delimiter. There are no spaces or carriage returns between the data fields, as each field is separated by an ASCII equivalent ';' delimiter.

In operation, the user first enters the "Setup Mode". "Setup Mode" is the DIP switch 28 activated mode (see FIG. 5) that allows a user to view and modify the user-settings for the apparatus 10. For the preferred embodiment, the microprocessor/micro-controller 24 detects when the first or #1 DIP switch 28 is actuated to the "up" position; and branches the logic to disable the industrial protocols on the serial ports 16, 18. Also during "Setup Mode", the logic halts the data display on the LCD 36, and in its stead the following static informational message is printed on the LCD:

```
Setup Mode...
COM: 9600/8/N/1
```

The aforesaid message is intended to reaffirm to the user that he or she can connect a terminal or a computer running terminal emulation software to either the RS-232C 16 or RS-485 18 serial port of the apparatus 10 for the purpose of initial setup or troubleshooting. The preferred embodiment of the present art apparatus 10 defaults the serial port 16, 18 settings for "Setup Mode" as 9600 bps, 8 data bits, 1 start bit, 1 stop bit, no parity, and no flow control. Alternative embodiments may utilize any serial data rate or format which an attached terminal or computer supports.

During the "Setup Mode", the user-settings are displayed in logical groups across nine (9) setup screens. When the user enters setup mode, the initial screen is "Page 1". The screen is displayed after the user presses the <ENTER> key on the keyboard. The preferred embodiment allows the user to force any given screen to be refreshed (re-drawn) by pressing the <ENTER> key. Switching to the next page occurs when the user presses the <TAB> key. FIGS. 28 through 34B show typical setup screens for the preferred embodiment. For the preferred embodiment, the apparatus 10 detects "Setup Mode" commands by the recognition and buffering of received typewritten data, followed by a <CR> "stop delimiter". However, when a <TAB> byte is detected, the logic clears the receive buffer and advances the display to the next page. If a <CR> is received with no preceding data, then the logic clears the receive buffer and refreshes (re-draws) the current screen.

Figure 36:
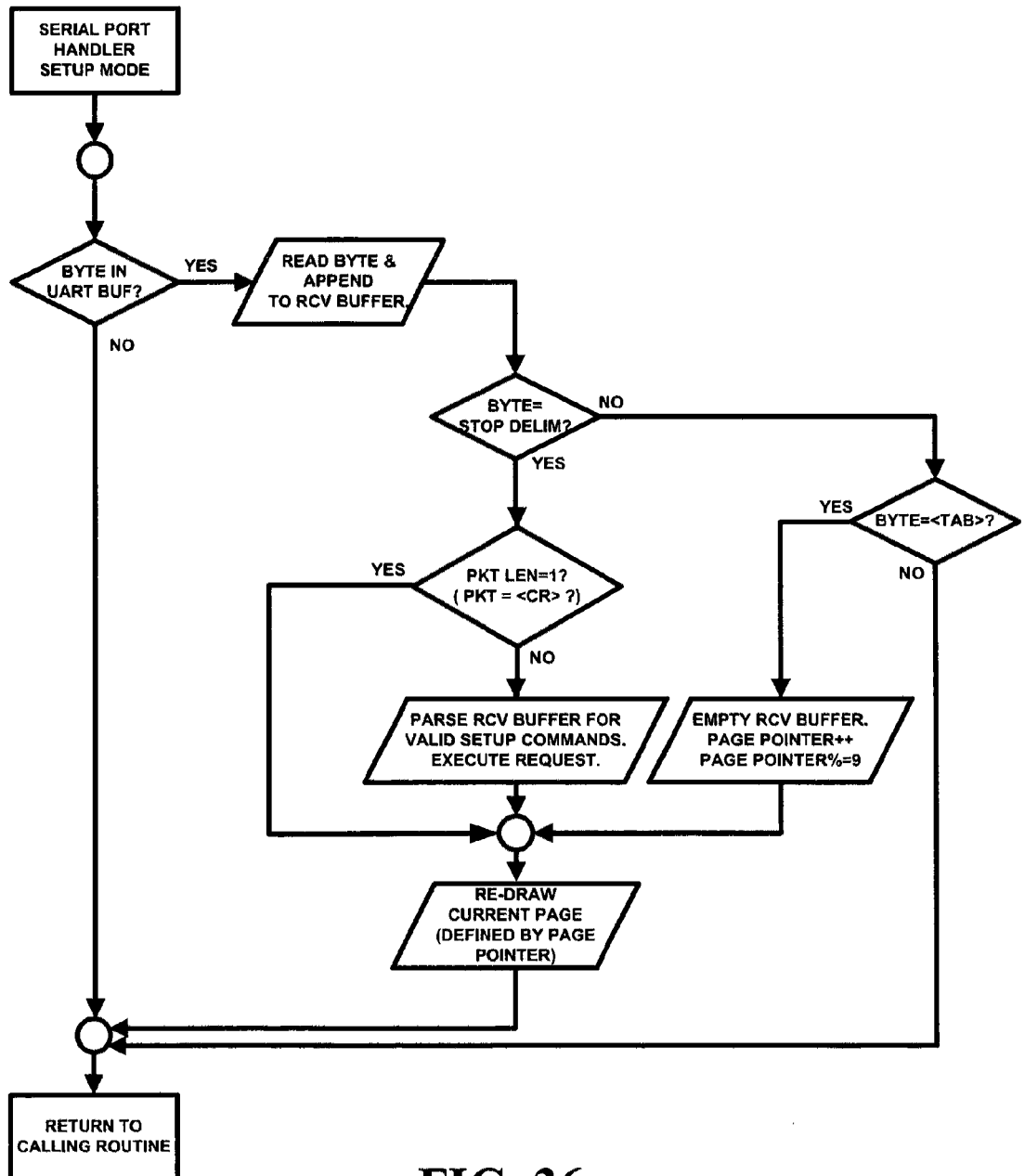
FIG. 36 shows a flow chart that describes the serial port handler logic for "Setup Mode" operation as implemented within a preferred embodiment of the present art.
Figure 36A:
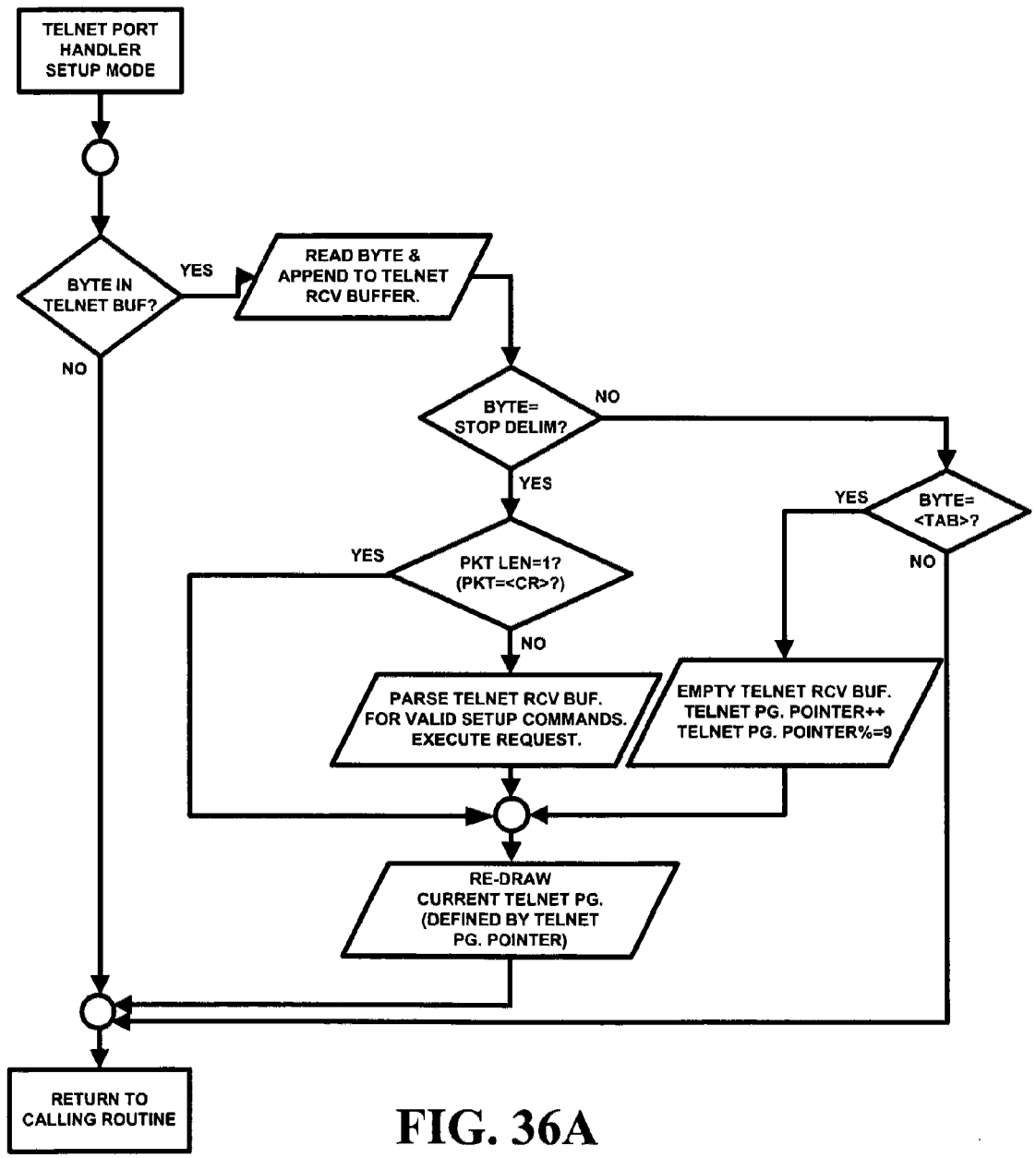
FIG. 36A shows a flow chart that describes the Telnet port handler logic for "Setup Mode" operation as implemented within a preferred embodiment of the present art.

The preferred embodiment of the firmware for the apparatus 10 recognizes a plurality of "SET" commands transmitted by the terminal or computer. FIGS. 35A and 35B represent the preferred embodiment list of "SET" commands. Also for the preferred embodiment, default values may be restored by entering "FACTORYRESET" at the command prompt. FIG. 36 represents a flow chart of the preferred embodiment firmware for the apparatus 10 serial port 16, 18 handler during the "Setup Mode" which processes carriage return <CR> terminated data packets. FIG. 36A represents a flow chart of the preferred embodiment firmware Telnet handler, which is always available via a network username and password login. As shown in FIGS. 35A and 35B, the "Setup Mode" commands are defined in a general table form and in FIGS. 35C through 35I in a specific table form and are hereby incorporated by reference.

The preferred embodiment of the firmware for the apparatus 10 contains a modified version of the Arizona Microchip TCP/IP Stack software for control of data packets through the Ethernet port 20. The Arizona Microchip TCP/IP Stack software is made freely available to product developers that use an Arizona Microchip microprocessor and an Arizona Microchip Ethernet controller at http://ww1.microchip.com/downloads/en/DeviceDoc/TCPIPStack%204.18.zip. The modifications to the TCP/IP Stack software consist of the removal of un-needed portions of the Stack (to conserve ROM resources), the addition of MODBUS®/TCP, MODBUS®/UDP, and EtherNet/IP™ handler subroutines, plus the addition of a HTTP callback subroutine that generates a web page populated with up-to-date meter data, plus the addition of a Telnet-based Setup Menu. The stack software is documented in an application note document, titled "The Microchip TCP/

IP Stack" available at http://ww1.microchip.com/downloads/en/AppNotes/00833b.pdf and hereby incorporated by reference.

Figure 37:
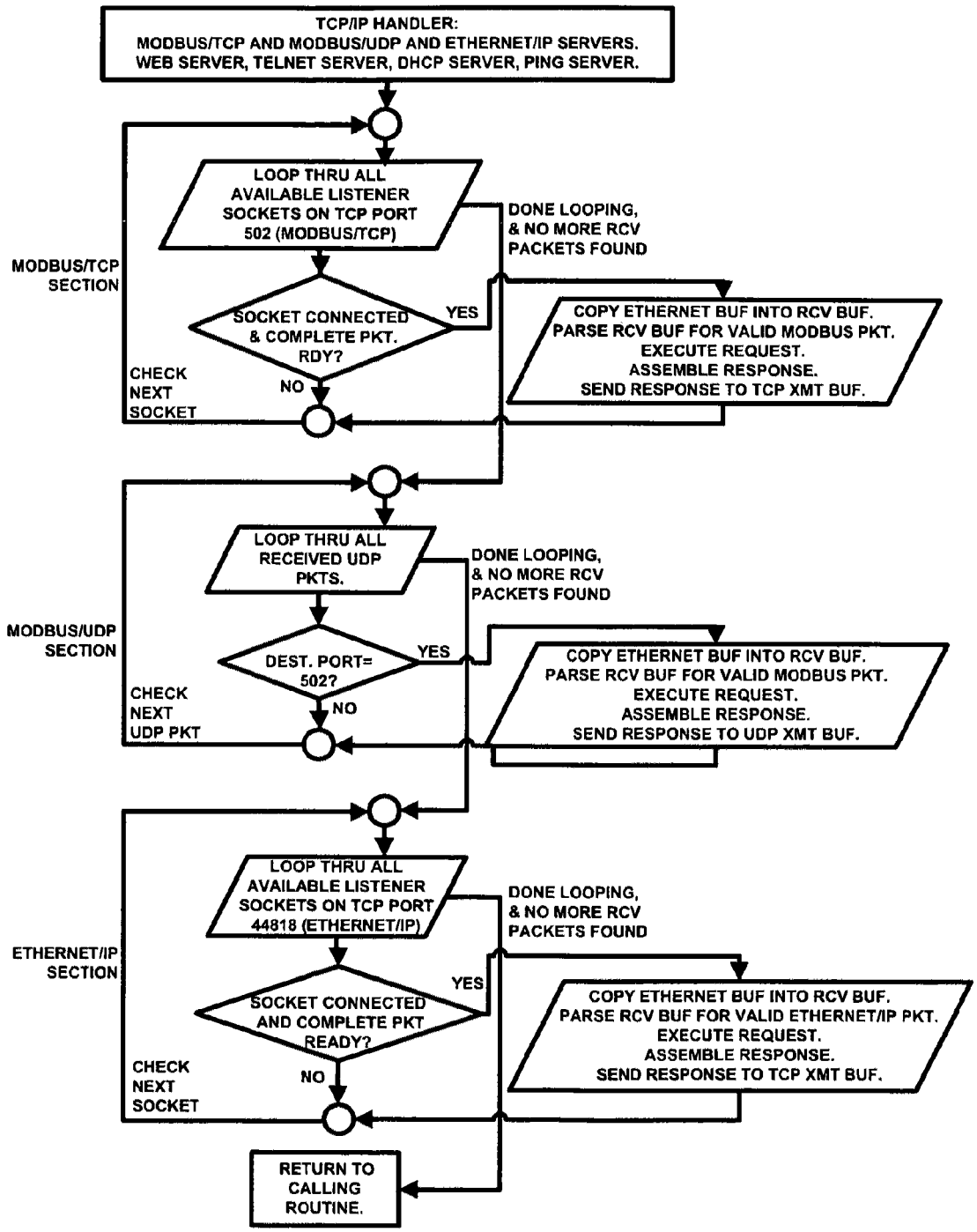
FIG. 37 shows a flow chart that describes the Ethernet port handler logic for the MODBUS®/TCP, MODBUS®/UDP, and EtherNet/IP™ protocols as implemented within a preferred embodiment of the present art.

The target logical network port for MODBUS® communications on the apparatus 10 is TCP 502 for MODBUS®/TCP and UDP 502 for MODBUS®/UDP. The TCP mode is a connection-oriented protocol, with guaranteed message delivery and error detection/correction. The UDP mode is a connectionless protocol, and does not guarantee message delivery nor does it provide error detection/correction. The UDP mode is provided in the preferred embodiment as this protocol variant features fewer bytes exchanged per interrogation. This makes the UDP mode suitable for applications where data transmission is especially costly, such as packet data over cellular phone networks. Except for the addition of a 6-byte network header and the subtraction of the CRC bytes, both of which are described in the Modicon documentation, MODBUS®/TCP and UDP packets are identical to those of the MODBUS®/RTU protocol. For the preferred embodiment, regardless of whether the apparatus is in "Setup Mode" or not, the MODBUS® industrial protocols are always active on the network Ethernet port 20. FIG. 37 is a flow chart that describes the preferred embodiment TCP/IP Handler for MODBUS®/TCP, MODBUS®/UDP, and EtherNet/IP™ packets.

Figure 39:
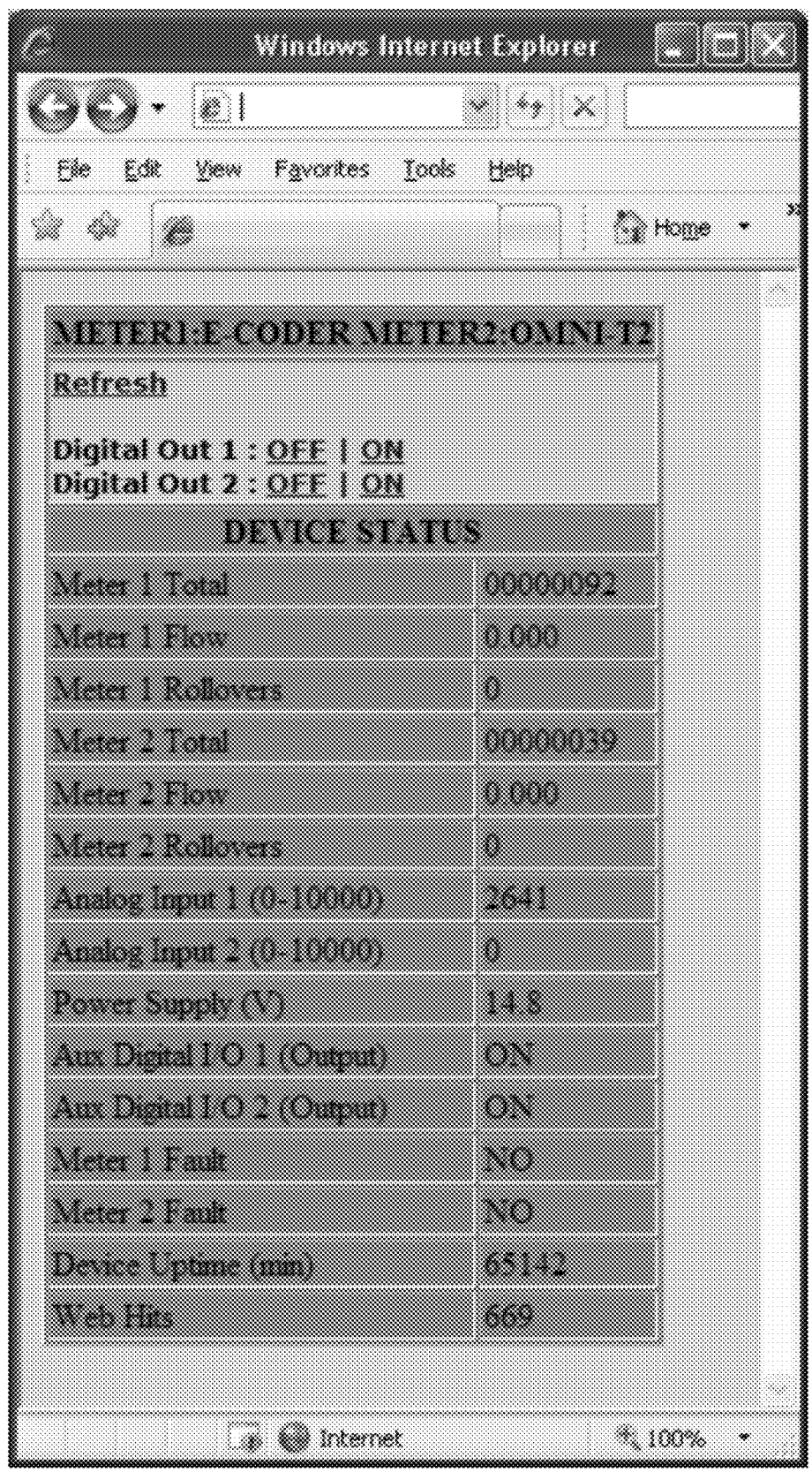
FIG. 39 shows a sample image of a web page that was served by a preferred embodiment of the present art. The client browser shown in the image is Microsoft Internet Explorer 7.
Figure 40:
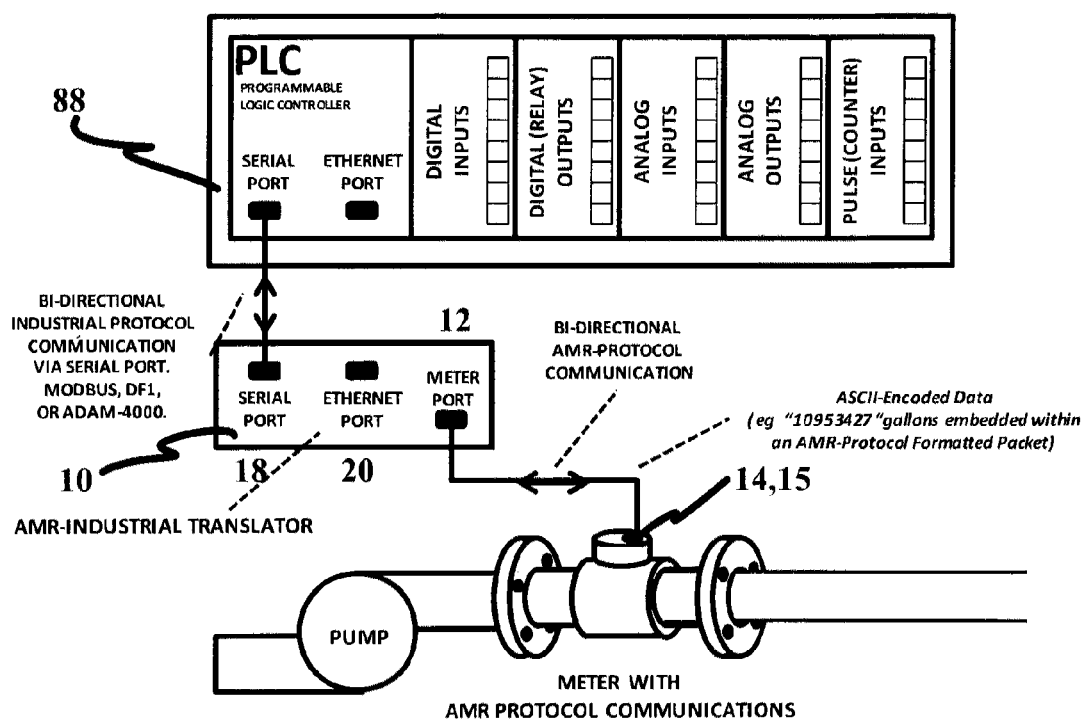
FIG. 40 shows an example application of a preferred embodiment of the present art. In this example, the device is providing protocol translation between an encoded meter register and a serial port-equipped PLC.
Figure 41:
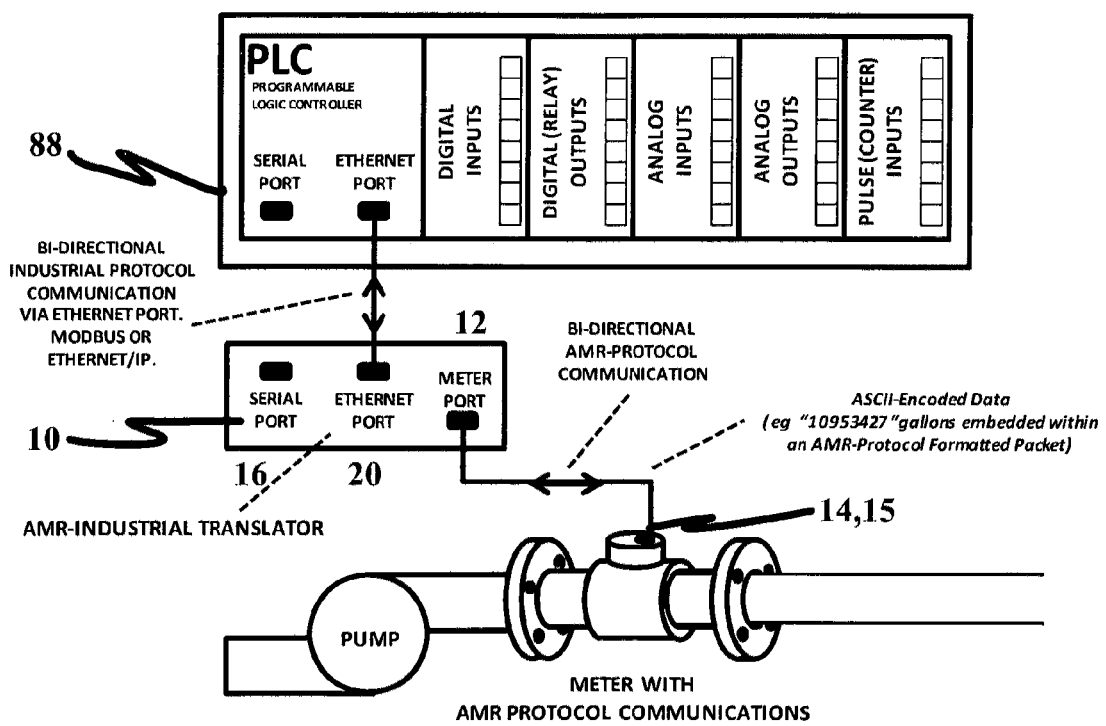
FIG. 41 shows an example application of a preferred embodiment of the present art. In this example, the device is providing protocol translation between an encoded meter register and an Ethernet port-equipped PLC.
Figure 42:
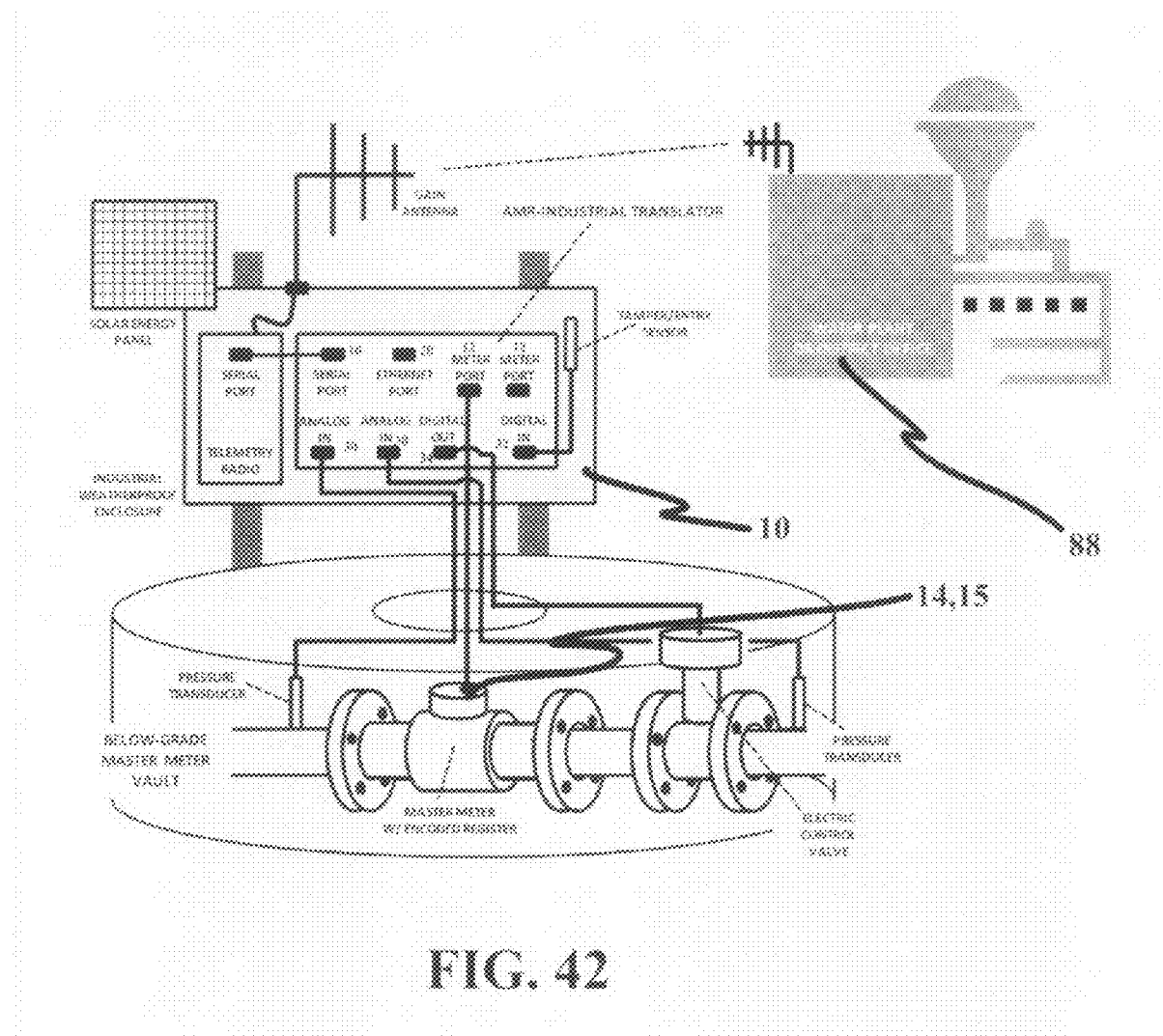
FIG. 42 shows an example application of a preferred embodiment of the present art. In this example, the device is functioning as an RTU endpoint at a master meter location. The device is transmitting meter and sensor data to a water utility's SCADA System, and receiving valve control commands from the SCADA System.

In addition to supporting the MODBUS®/TCP, MODBUS®/UDP, and EtherNet/IP™ protocols, when the preferred embodiment apparatus 10 is staged in a location where an internet or intranet connection is available, it also serves a web page that displays meter 14 status (totalization 70 and flow rates), auxiliary I/O status 30-34, and other relevant status information. When a client computer requests the default web page from the server root directory ("/"), the apparatus 10 responds with a web page populated with up-to-date meter 14 and auxiliary I/O data 30-34. Each data item, along with its descriptor, is assembled into an HTML-formatted web page. A table format is used so as to increase the readability of the page. FIG. 38 represents a preferred embodiment HTML source code for the aforesaid sample web page with FIG. 39 representing the image of the interpreted source code as viewed by a browser such as the Microsoft Internet Explorer or the Mozilla Firefox. As understood within the arts, alternative embodiments of the HTML source code may take a plurality of forms in order to display the relevant data.

From the foregoing description, a plurality of benefits and objects are realized from the present art. The preferred embodiment of the present art provides exact meter totalizations 70 to industrial monitoring and control systems 88. That is, the present art enables easy and reliable integration of encoded AMR meter 14 registers 15 into new and existing industrial SCADA networks that communicate using the MODBUS®/RTU, MODBUS®/ASCII, DF1, MODBUS®/TCP, MODBUS®/UDP, EtherNet/IP™, ADAM-4000, and Raw ASCII industrial protocols. Due to the wide availability of industrial SCADA hardware and software that communicates using these protocols, coupled with the wide availability of encoded AMR meter 14 registers 15, the present art bridges a necessary communication gap between state-of-the-art SCADA Systems and state-of-the-art meter 14 registers 15. This present art apparatus effectively expands the reach of Industrial SCADA Systems into large meter monitoring.

The present art further eliminates the requirement for periodic corrections or synchronizations. That is, unlike the prior art, the present art does not require technicians to perform manual synchronization of the industrial SCADA System with the meter 14 register 15 or to perform periodic corrections, as is often required for pulse-per-volume and other meter registers. Another object and benefit of the present art is the immunity to pulse-per-volume errors.

The present art allows industrial SCADA systems to recover the correct meter 14 register 15 totalization 70 even after a brief or prolonged signal loss, such as that due to a power or battery failure or a cut signal wire. Electronic noise may adversely affect totalization 70 in pulse-per-volume meters as each is often interpreted as pulses. The present art detects signal corruption with a parity check on each received byte when available from the meter 14 register 15. The present art further eliminates the deleterious error effects to a totalization 70 which is caused by mechanical contact bounce. That is, each contact bounce may be interpreted by the prior art as several pulses which will skew the totalization 70. The present art interfaces directly with the AMR solid-state registers 15 that do not require the interrogator to account for contact bounces.

A further object and benefit of the present art is the promotion of energy conservation via the relatively low energy consumption of the apparatus 10 and the absence of multiple required physical technician visits for re-synchronization of the meter 14 totalization 70. The present art provides energy savings to the industrial SCADA System, as compared to pulse-per-volume meter-interrogation devices. That is, less power is required, due to the fact that power must be supplied to the meter 14 register 15 only when the register 15 is to be interrogated, and a single interrogation requires less than one second. For example, 96 meter 14 interrogations per day (every 15 minutes) would require that each meter 14 be powered for less than a total of 2 minutes per day. A pulse-per-volume register, on the other hand, would normally need to be powered for the full 24 hours per day. As many meters 14 are located on sites that are not served by electric utilities, the present art apparatus 10 allows for solar-powering during remote monitoring.

A still further object and benefit of the present art is the ability of the apparatus 10 to detect reverse flows. Unlike many of the prior art pulse-per-volume registers which often emit pulses with no discernment for forward or reverse flow, the present art reads the absolute value of the meter 14 totalization 70 which is then transmitted to the SCADA equipment. Reverse flows are reflected within the totalization 70 and are not erroneously interpreted by the connected SCADA equipment as forward flows whereby the SCADA System's pulse counter accumulates in the wrong direction. Because the present art acquires the actual register 15 totalization 70, reverse flows can be detected when the newest interrogated totalization 70 is less than a prior totalization 70. Since reverse flows are often the result of an equipment fault (such as a failed check valve), detection and/or alarm triggering of this condition is highly desirable.

A yet further object and benefit of the present art is the ability to coexist with AMR billing systems. That is, the present art enables an industrial SCADA System to read a meter 14 register 15 while the meter 14 register 15 is simultaneously connected to a 2-wire AMR protocol billing system. Since the 2-wire billing protocol systems typically communicate at a carrier frequency of approximately 18 kHz, the present art can communicate at a lower carrier frequency of approximately 600 Hz. A series capacitor can be used to isolate the inductive AMR System from the present art device. The series capacitor provides signal pass-through for the AMR system, but at the same time prevents the AMR System's inductive coil from effectively shorting the TxD signal line from apparatus 10 to a signal ground or common.

A yet further object and benefit of the present art is the assistance provided for detection of pipeline leaks which can be integrated into automatic leak detection systems. Many potable water distribution systems require that personnel are dispatched in order to read meters 14 on a regular and frequent basis whereby water main leaks may be identified. Since the present art can be interfaced to most major production and distribution meters and the apparatus 10 integrates the meter 14 data into the industrial control and monitoring process, the detection of leaks and usage anomalies can be automated. This process can lead to savings in reduced fuel, reduced payroll, and reduced water loss.

The physical elements as described are of an electronic nature and may be manufactured from a plurality of materials associated with electronics. The case and mounting structure is preferably manufactured from a lightweight polymer material such as polyvinylchloride with alternative embodiments utilizing a plurality of materials including but not limited to metals and alloys thereof, woods, composites, plastics of all types, laminates, or ceramics.

From the foregoing description, those skilled in the art will appreciate that a supervisory control and data acquisition protocol converter and method of use has been shown and described. The present art allows utilization of AMR encoded register meters with industrial SCADA systems which heretofore has not been available. The present art further eliminates the time and energy consuming process of synchronizing actual meter totalization with the accumulated totalizations.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. A supervisory control and data acquisition protocol converter comprising:
    a microprocessor interfaced with one or more encoded register ports and one or more industrial monitoring and control system ports; and
    said encoded register port having a transmit data portion capable of connection with an automatic meter reading protocol residential or commercial type encoded meter register having a three wire protocol which indicates to said encoded meter register to turn on and begin transmitting a fluid or gas totalization; and
    said encoded register port having a receive data portion capable of connection with said encoded meter register and capable of receiving a totalization data from said encoded meter register; and
    said microprocessor having a program or firmware capable of receiving said totalization data and formatting said totalization data into one or more formats; and
    said industrial monitoring and control system port capable of receiving one or more interrogations from a supervisory control and data acquisition system utilizing at least a portion of one or more industrial protocols as an endpoint; and
    said program or firmware capable of interpreting said interrogation and transmitting one or more responses in said industrial protocol through said industrial monitoring and control system port, said responses including one or more of said formats of said totalization data.

2. The supervisory control and data acquisition protocol converter as set forth in claim 1, whereby:
    said one or more industrial protocols are selected from one or more of the following, a MODBUS protocol, an ADAM-4000 protocol, a DF1 protocol, or an EtherNet/IP protocol.

3. The supervisory control and data acquisition protocol converter as set forth in claim 2, whereby:
    said one or more formats include a flow rate calculated by said program or firmware from said totalization via a difference function represented by $$\frac{\Delta(\text{totalization})}{\Delta t}.$$

4. The supervisory control and data acquisition protocol converter as set forth in claim 1, whereby:
    said transmit data portion of said encoded register port having a transmit data line capable of providing a power on first pulse and a clock signal following said power on first pulse; and
    said receive data portion of said encoded register port having a receive data line capable of synchronously receiving a received data from said encoded meter register synchronously with said clock signal.

5. The supervisory control and data acquisition protocol converter as set forth in claim 3, whereby:
    said transmit data portion of said encoded register port having a transmit data line capable of providing a power on first pulse and a clock signal following said power on first pulse; and
    said receive data portion of said encoded register port having a receive data line capable of synchronously receiving a received data from said encoded meter register synchronously with said clock signal.

6. The supervisory control and data acquisition protocol converter as set forth in claim 2, further comprising:
    one or more displays interfaced with said microprocessor and capable of displaying one or more of said formats of said totalization data in a user intelligible form.

7. The supervisory control and data acquisition protocol converter as set forth in claim 1, whereby:
    said industrial monitoring and control system ports support and are selected from one or more of the following, an RS-232 port, an RS-485 port, an Ethernet port, or a CAN port.

8. The supervisory control and data acquisition protocol converter as set forth in claim 1, further comprising:
    one or more analog inputs interfaced with said microprocessor; and
    said program or firmware capable of receiving a value of said analog input and formatting said value into one or more of said industrial protocols, and
    said program capable of transmitting said analog input value in said industrial protocol pursuant to said interrogation.

9. The supervisory control and data acquisition protocol converter as set forth in claim 1, further comprising:
    one or more digital inputs or one or more digital outputs separate from said industrial monitoring and control system port interfaced with said microprocessor; and
    said program or firmware capable of receiving said digital input and formatting said digital input into one or more of said industrial protocols; and said program or firmware capable of transmitting said digital input format in said industrial protocol pursuant to said interrogation; and said program or firmware capable of transmitting said digital output pursuant to a request from said program or firmware or in response to said interrogation.

10. The supervisory control and data acquisition protocol converter as set forth in claim 1, whereby:

said automatic meter reading protocol encoded meter register selected from one or more of the following, a SENSUS encoded meter register or a NEPTUNE encoded meter register.

11. The supervisory control and data acquisition protocol converter as set forth in claim 10, whereby:

said one or more industrial protocols are selected from one or more of the following, a MODBUS protocol, an ADAM-4000 protocol, a DF1 protocol, or an EtherNet/IP protocol.

12. The supervisory control and data acquisition protocol converter as set forth in claim 7, whereby:

said program or firmware via said Ethernet port serves a hypertext transfer protocol web page having one or more of said formats displayed.

13. The supervisory control and data acquisition protocol converter as set forth in claim 7, whereby:

said program or firmware has a setup menu and responds to one or more setup commands; and said setup commands capable of affecting one or more of said totalization data formats and one or more of said industrial protocols for said industrial monitoring and control system ports.

14. A supervisory control and data acquisition protocol converter comprising:

an endpoint having one or more encoded register ports capable of interfacing with one or more automatic meter reading protocol encoded meter registers of an encoded fluid or gas type meter; and one or more industrial monitoring and control system ports capable of interfacing with one or more industrial monitoring and control systems; and said industrial monitoring and control system ports utilizing at least a portion of one or more industrial protocols selected from one or more of the following, a MODBUS protocol, an ADAM-4000 protocol, a DF1 protocol, or EtherNet/IP protocol; and a program or firmware capable of interrogating said encoded meter register through said encoded register port and receiving a totalization from said encoded meter register; and one or more registers having a contents of one or more formatted forms of said totalization placed by said program; and said program or firmware providing one or more of said register contents when said industrial monitoring and control system port is interrogated by the industrial monitoring and control system utilizing one or more of said industrial protocols and said program or firmware receives a request from the industrial monitoring and control system for one or more of said register contents; and said program or firmware transmitting a message structure that the industrial monitoring and control system will recognize through one or more of said industrial monitoring and control system ports in response to said request.

15. The supervisory control and data acquisition protocol converter as set forth in claim 14, whereby:

said one or more formatted forms include a flow rate calculated by said program from said totalization via a difference function represented by $$\frac{\Delta(\text{totalization})}{\Delta t}.$$

16. The supervisory control and data acquisition protocol converter as set forth in claim 14 further comprising:

a transmit data portion of said encoded register port having a transmit data line capable of providing a power on first pulse of a value and a duration necessary to power on said encoded meter registers and initiate transmission from said encoded meter register; and a receive data portion of said encoded register port having a receive data line capable of synchronously or asynchronously receiving a received data from said encoded meter register.

17. The supervisory control and data acquisition protocol converter as set forth in claim 14, further comprising:

one or more displays interfaced with said endpoint and capable of displaying one or more of said formatted forms in a user intelligible format.

18. The supervisory control and data acquisition protocol converter as set forth in claim 14, whereby:

said industrial monitoring and control system ports support and are selected from one or more of the following, an RS-232 port, an RS-485 port, an Ethernet port, or a CAN port.

19. The supervisory control and data acquisition protocol converter as set forth in claim 14, further comprising:

one or more analog inputs; and said program or firmware capable of receiving a value of said analog input and formatting said value into one or more of said industrial protocols; and said program or firmware capable of transmitting said analog input value in said industrial protocol pursuant to said interrogation.

20. The supervisory control and data acquisition protocol converter as set forth in claim 14, further comprising:

one or more digital inputs or one or more digital outputs separate from said industrial monitoring and control system port; and said program or firmware capable of receiving said digital input and formatting said digital input into one or more of said industrial protocols; and said program or firmware capable of transmitting said digital input in said industrial protocol pursuant to said interrogation; and said program or firmware capable of transmitting said digital output pursuant to a request from said program or firmware or in response to said request of the industrial monitoring and control system.

* * * * *